US012422976B2

(12) United States Patent
Carrigan et al.

(10) Patent No.: US 12,422,976 B2
(45) Date of Patent: Sep. 23, 2025

(54) USER INTERFACES FOR MANAGING ACCESSORIES

(71) Applicant: Apple Inc., Cupertino, CA (US)

(72) Inventors: Taylor G. Carrigan, San Francisco, CA (US); Kevin M. Lynch, Woodside, CA (US); Jeffrey D. Tanner, Walnut Creek, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/504,001

(22) Filed: Nov. 7, 2023

(65) Prior Publication Data

US 2024/0069711 A1    Feb. 29, 2024

Related U.S. Application Data

(63) Continuation of application No. 17/742,273, filed on May 11, 2022, now abandoned.

(60) Provisional application No. 63/189,078, filed on May 15, 2021.

(51) Int. Cl.
*G06F 3/04847* (2022.01)
*F24F 11/50* (2018.01)
*G06F 3/0362* (2013.01)
*G06F 3/16* (2006.01)
*H04L 9/40* (2022.01)
(Continued)

(52) U.S. Cl.
CPC .......... *G06F 3/04847* (2013.01); *F24F 11/50* (2018.01); *G06F 3/0362* (2013.01); *G06F 3/16* (2013.01); *H04L 63/10* (2013.01); *H04R 3/12* (2013.01); *H04R 27/00* (2013.01); *H04R 2227/003* (2013.01)

(58) Field of Classification Search
CPC ...... G06F 3/04847; G06F 3/0362; G06F 3/16; G06F 2203/04806; G06F 1/163; G06F 1/1671; G06F 1/169; G06F 3/0304; G06F 3/0482; G06F 3/04845; G06F 3/0485; G06F 3/0488; G06F 3/04883; G06F 3/165; G06F 3/167; F24F 11/50; H04L 63/10; H04R 3/12; H04R 27/00; H04R 2227/003; G08B 6/00; H04N 23/60; H04N 23/62; H04N 23/632
See application file for complete search history.

(56) References Cited

U.S. PATENT DOCUMENTS

| 5,086,385 A | 2/1992 | Launey et al. |
| 5,974,235 A | 10/1999 | Nunally et al. |
| 6,140,987 A | 10/2000 | Stein et al. |

(Continued)

FOREIGN PATENT DOCUMENTS

| CN | 1641589 A | 7/2005 |
| CN | 1679019 A | 10/2005 |

(Continued)

OTHER PUBLICATIONS

Corrected Notice of Allowance received for U.S. Appl. No. 18/375,457, mailed on Apr. 11, 2024, 2 pages.

(Continued)

*Primary Examiner* — John T Repsher, III
(74) *Attorney, Agent, or Firm* — DLA Piper LLP (US)

(57) ABSTRACT

A computer system displays images captured via a camera, where the images correspond to event detected by the camera at a time prior to a current time.

27 Claims, 29 Drawing Sheets

(51) Int. Cl.
*H04R 3/12* (2006.01)
*H04R 27/00* (2006.01)

(56) References Cited

U.S. PATENT DOCUMENTS

| | | | |
|---|---|---|---|
| 6,456,306 B1 | 9/2002 | Chin et al. |
| 6,483,986 B1 | 11/2002 | Krapf |
| 6,611,297 B1 | 8/2003 | Akashi et al. |
| 6,901,439 B1 | 5/2005 | Bonasia et al. |
| 6,912,429 B1 | 6/2005 | Bilger |
| 6,931,594 B1 | 8/2005 | Jun |
| 7,092,768 B1 | 8/2006 | Labuda |
| 7,293,280 B1 | 11/2007 | Gupta et al. |
| 7,401,351 B2 | 7/2008 | Boreczky et al. |
| 7,571,014 B1 | 8/2009 | Lambourne et al. |
| 7,730,223 B1 | 6/2010 | Bavor et al. |
| 7,859,571 B1 | 12/2010 | Brown et al. |
| 7,904,814 B2 | 3/2011 | Errico et al. |
| 8,031,230 B2 | 10/2011 | Takada |
| 8,214,494 B1 | 7/2012 | Slavin |
| 8,234,395 B2 | 7/2012 | Millington |
| 8,253,704 B2 | 8/2012 | Jang |
| 8,462,961 B1 | 6/2013 | Bywaters et al. |
| 8,516,374 B2 | 8/2013 | Fleischman et al. |
| 8,745,500 B1 | 6/2014 | Kostello et al. |
| 8,762,844 B2 | 6/2014 | Kim et al. |
| 8,914,752 B1 | 12/2014 | Spiegel |
| 8,954,889 B2 | 2/2015 | Fujibayashi |
| 8,990,861 B2 | 3/2015 | Nishikawa et al. |
| 9,021,526 B1 | 4/2015 | Baron et al. |
| 9,080,736 B1 | 7/2015 | Salzinger et al. |
| 9,082,018 B1 | 7/2015 | Laska et al. |
| 9,158,974 B1 | 10/2015 | Laska et al. |
| 9,170,707 B1 | 10/2015 | Laska et al. |
| 9,185,062 B1 | 11/2015 | Yang et al. |
| 9,247,380 B1 | 1/2016 | Vincent |
| 9,313,556 B1 | 4/2016 | Borel et al. |
| 9,361,011 B1 | 6/2016 | Burns et al. |
| 9,361,521 B1 | 6/2016 | Mclean et al. |
| 9,413,606 B1 | 8/2016 | Roberts |
| 9,433,032 B1 | 8/2016 | Ghadge et al. |
| 9,454,336 B1 | 9/2016 | Rudradevan et al. |
| 9,504,134 B2 | 11/2016 | Aliakseyeu et al. |
| 9,582,178 B2 | 2/2017 | Grant et al. |
| 9,665,242 B2 | 5/2017 | Kim et al. |
| 9,680,982 B2 | 6/2017 | Fiedler |
| 9,699,858 B2 | 7/2017 | Laherty et al. |
| 9,727,346 B2 | 8/2017 | Shao |
| 9,728,230 B2 | 8/2017 | Cudak et al. |
| 9,750,116 B2 | 8/2017 | Witzgall |
| 9,759,917 B2 | 9/2017 | Osterhout et al. |
| 9,784,417 B1 | 10/2017 | Springer |
| 9,858,739 B1 | 1/2018 | Johnson et al. |
| 9,898,175 B2 | 2/2018 | Fiedler |
| 9,936,556 B2 | 4/2018 | Chraibi et al. |
| 10,027,775 B1 | 7/2018 | Mierau et al. |
| 10,055,094 B2 | 8/2018 | Li et al. |
| 10,068,364 B2 | 9/2018 | Cui |
| 10,091,017 B2 | 10/2018 | Landow et al. |
| 10,120,536 B2 | 11/2018 | Cha et al. |
| 10,142,122 B1 | 11/2018 | Hill et al. |
| 10,157,040 B2 | 12/2018 | Ballinger et al. |
| 10,219,026 B2 | 2/2019 | Eim et al. |
| 10,237,141 B2 | 3/2019 | Sasaki et al. |
| 10,282,068 B2 | 5/2019 | Dubin et al. |
| 10,284,980 B1 | 5/2019 | Woo et al. |
| 10,296,128 B1 | 5/2019 | Nold et al. |
| 10,298,643 B1 | 5/2019 | Toal et al. |
| 10,300,394 B1 | 5/2019 | Evans et al. |
| 10,303,422 B1 | 5/2019 | Woo et al. |
| 10,310,725 B2 | 6/2019 | Smith et al. |
| 10,339,769 B2 | 7/2019 | Mixter et al. |
| 10,409,239 B2 | 9/2019 | Reeder et al. |
| 10,420,185 B2 | 9/2019 | Biery et al. |
| 10,436,977 B2 | 10/2019 | Bergman et al. |
| 10,454,781 B2 | 10/2019 | Sasaki et al. |
| 10,459,416 B1 | 10/2019 | Fernandez |
| 10,474,349 B2 | 11/2019 | Jang et al. |
| 10,511,456 B2 | 12/2019 | Smith et al. |
| 10,523,625 B1 | 12/2019 | Allen et al. |
| 10,631,123 B2 | 4/2020 | O'keeffe |
| 10,708,653 B1 | 7/2020 | Stinson et al. |
| 10,779,085 B1 | 9/2020 | Carrigan |
| 10,783,883 B2 | 9/2020 | Mixter et al. |
| 10,924,446 B1 | 2/2021 | Paul |
| 10,929,099 B2 | 2/2021 | Querze et al. |
| 10,963,145 B1 | 3/2021 | Voss et al. |
| 11,024,303 B1 | 6/2021 | Devaraj et al. |
| 11,062,156 B1 | 7/2021 | Vallance et al. |
| 11,079,913 B1 | 8/2021 | Kim et al. |
| 11,164,580 B2 | 11/2021 | Kraker |
| 11,176,940 B1 | 11/2021 | Zhong et al. |
| 11,283,916 B2 | 3/2022 | Coffman et al. |
| 11,316,709 B2 | 4/2022 | Brown et al. |
| 11,343,613 B2 | 5/2022 | Gordon et al. |
| 11,523,166 B1 | 12/2022 | Tu et al. |
| 12,014,118 B2 | 6/2024 | Gruber et al. |
| 12,085,421 B2 | 9/2024 | Yedid et al. |
| 2001/0030597 A1 | 10/2001 | Inoue et al. |
| 2002/0012526 A1 | 1/2002 | Sai et al. |
| 2002/0060701 A1 | 5/2002 | Naughton et al. |
| 2002/0063737 A1 | 5/2002 | Feig et al. |
| 2002/0154888 A1 | 10/2002 | Allen et al. |
| 2002/0180774 A1 | 12/2002 | Errico et al. |
| 2003/0040813 A1 | 2/2003 | Gonzales et al. |
| 2003/0063130 A1 | 4/2003 | Barbieri et al. |
| 2003/0093790 A1 | 5/2003 | Logan et al. |
| 2003/0110511 A1 | 6/2003 | Schutte et al. |
| 2003/0112938 A1 | 6/2003 | Kanakubo et al. |
| 2004/0003051 A1 | 1/2004 | Krzyzanowski et al. |
| 2004/0095377 A1 | 5/2004 | Salandro |
| 2004/0131254 A1 | 7/2004 | Liang et al. |
| 2004/0239692 A1* | 12/2004 | Balle .............. G06F 3/0236 |
| | | 345/660 |
| 2005/0055472 A1 | 3/2005 | Krzyzanowski et al. |
| 2005/0094610 A1 | 5/2005 | De et al. |
| 2005/0144247 A1 | 6/2005 | Christensen et al. |
| 2005/0163345 A1 | 7/2005 | Van et al. |
| 2005/0169503 A1 | 8/2005 | Howell et al. |
| 2005/0275626 A1 | 12/2005 | Mueller et al. |
| 2006/0002523 A1 | 1/2006 | Bettis et al. |
| 2006/0013554 A1 | 1/2006 | Poslinski et al. |
| 2006/0034586 A1 | 2/2006 | Millar et al. |
| 2006/0132455 A1 | 6/2006 | Rimas-Ribikauskas et al. |
| 2006/0171453 A1 | 8/2006 | Rohlfing et al. |
| 2006/0174035 A1 | 8/2006 | Tufail |
| 2006/0221184 A1 | 10/2006 | Vallone et al. |
| 2006/0279628 A1 | 12/2006 | Fleming |
| 2006/0280186 A1 | 12/2006 | Carlton et al. |
| 2007/0033632 A1 | 2/2007 | Baynger et al. |
| 2007/0050452 A1 | 3/2007 | Raju et al. |
| 2007/0061020 A1 | 3/2007 | Bovee et al. |
| 2007/0064105 A1 | 3/2007 | Ohshima et al. |
| 2007/0162762 A1 | 7/2007 | Huh et al. |
| 2007/0171091 A1 | 7/2007 | Nisenboim et al. |
| 2007/0174774 A1 | 7/2007 | Lerman et al. |
| 2007/0192486 A1 | 8/2007 | Wilson et al. |
| 2007/0198111 A1 | 8/2007 | Oetzel et al. |
| 2007/0216764 A1 | 9/2007 | Kwak |
| 2007/0241945 A1 | 10/2007 | Moorer et al. |
| 2008/0080743 A1 | 4/2008 | Schneiderman et al. |
| 2008/0165160 A1 | 7/2008 | Kocienda et al. |
| 2009/0133070 A1 | 5/2009 | Hamano et al. |
| 2009/0153289 A1 | 6/2009 | Hope et al. |
| 2009/0199119 A1 | 8/2009 | Park et al. |
| 2009/0220206 A1 | 9/2009 | Kisliakov |
| 2009/0232028 A1 | 9/2009 | Baalbergen et al. |
| 2009/0243507 A1 | 10/2009 | Lucero-vera et al. |
| 2009/0282362 A1 | 11/2009 | Matsumoto |
| 2009/0299810 A1 | 12/2009 | Jardine et al. |
| 2010/0081375 A1 | 4/2010 | Rosenblatt et al. |
| 2010/0121636 A1 | 5/2010 | Burke et al. |
| 2010/0138007 A1 | 6/2010 | Clark et al. |
| 2010/0138794 A1 | 6/2010 | Ganey et al. |

(56) References Cited

U.S. PATENT DOCUMENTS

| | | |
|---|---|---|
| 2010/0145485 A1 | 6/2010 | Duchene et al. |
| 2010/0191575 A1 | 7/2010 | Raleigh |
| 2010/0191833 A1 | 7/2010 | Hofrichter et al. |
| 2010/0201815 A1 | 8/2010 | Anderson et al. |
| 2010/0267370 A1 | 10/2010 | Lee |
| 2010/0318917 A1 | 12/2010 | Holladay et al. |
| 2010/0318928 A1 | 12/2010 | Neuman et al. |
| 2010/0318939 A1 | 12/2010 | Moon |
| 2011/0040754 A1 | 2/2011 | Peto et al. |
| 2011/0040760 A1 | 2/2011 | Fleischman et al. |
| 2011/0071656 A1 | 3/2011 | Mckiel, Jr. |
| 2011/0106279 A1 | 5/2011 | Cho et al. |
| 2011/0145745 A1 | 6/2011 | Hyeon et al. |
| 2011/0173545 A1 | 7/2011 | Meola et al. |
| 2011/0228084 A1 | 9/2011 | Colciago |
| 2011/0249123 A1 | 10/2011 | Subbian et al. |
| 2011/0249861 A1 | 10/2011 | Tokutake |
| 2011/0252357 A1 | 10/2011 | Chaudhri |
| 2011/0254683 A1 | 10/2011 | Soldan et al. |
| 2012/0054278 A1 | 3/2012 | Taleb et al. |
| 2012/0066632 A1 | 3/2012 | Sundermeyer et al. |
| 2012/0070129 A1 | 3/2012 | Lin et al. |
| 2012/0079507 A1 | 3/2012 | Agarwal et al. |
| 2012/0098854 A1 | 4/2012 | Ohnishi |
| 2012/0144416 A1 | 6/2012 | Wetzer et al. |
| 2012/0169583 A1 | 7/2012 | Rippel et al. |
| 2012/0173767 A1 | 7/2012 | Kim et al. |
| 2012/0177339 A1 | 7/2012 | Chang et al. |
| 2012/0223890 A1 | 9/2012 | Borovsky et al. |
| 2012/0266199 A1 | 10/2012 | Noonan et al. |
| 2012/0269361 A1 | 10/2012 | Bhow et al. |
| 2012/0282974 A1 | 11/2012 | Green et al. |
| 2012/0291068 A1 | 11/2012 | Khushoo et al. |
| 2012/0311499 A1 | 12/2012 | Dellinger et al. |
| 2013/0060352 A1 | 3/2013 | Kouda et al. |
| 2013/0099672 A1 | 4/2013 | Lin et al. |
| 2013/0113822 A1 | 5/2013 | Putrevu et al. |
| 2013/0124207 A1 | 5/2013 | Sarin et al. |
| 2013/0124997 A1 | 5/2013 | Speir et al. |
| 2013/0132865 A1 | 5/2013 | Li |
| 2013/0141223 A1 | 6/2013 | Brandsma et al. |
| 2013/0141378 A1 | 6/2013 | Yumiki et al. |
| 2013/0148020 A1 | 6/2013 | Cook |
| 2013/0225152 A1 | 8/2013 | Matthews et al. |
| 2013/0227414 A1 | 8/2013 | Hwang et al. |
| 2013/0257284 A1 | 10/2013 | Vanwagoner et al. |
| 2013/0282180 A1 | 10/2013 | Layton |
| 2013/0283161 A1 | 10/2013 | Reimann et al. |
| 2013/0285576 A1 | 10/2013 | Van Der Zande et al. |
| 2013/0298021 A1 | 11/2013 | Park et al. |
| 2013/0326583 A1 | 12/2013 | Freihold et al. |
| 2013/0331083 A1 | 12/2013 | Oslund |
| 2014/0013243 A1 | 1/2014 | Flynn et al. |
| 2014/0025798 A1 | 1/2014 | Apte et al. |
| 2014/0062309 A1 | 3/2014 | Kim |
| 2014/0068439 A1 | 3/2014 | Lacaze et al. |
| 2014/0068486 A1 | 3/2014 | Sellers et al. |
| 2014/0070959 A1 | 3/2014 | Bhargava et al. |
| 2014/0075321 A1 | 3/2014 | Masera |
| 2014/0082501 A1 | 3/2014 | Bae et al. |
| 2014/0092292 A1 | 4/2014 | Kuznetsov et al. |
| 2014/0150029 A1 | 5/2014 | Avedissian et al. |
| 2014/0173082 A1 | 6/2014 | Shin |
| 2014/0215365 A1 | 7/2014 | Hiraga et al. |
| 2014/0215564 A1 | 7/2014 | Banatwala et al. |
| 2014/0218517 A1 | 8/2014 | Kim |
| 2014/0232273 A1 | 8/2014 | Sasaki et al. |
| 2014/0236325 A1 | 8/2014 | Sasaki et al. |
| 2014/0236326 A1 | 8/2014 | Sasaki et al. |
| 2014/0237419 A1 | 8/2014 | Ryu |
| 2014/0257532 A1 | 9/2014 | Kim et al. |
| 2014/0258854 A1 | 9/2014 | Li |
| 2014/0267068 A1 | 9/2014 | Smith et al. |
| 2014/0267549 A1 | 9/2014 | Pinter et al. |
| 2014/0285017 A1 | 9/2014 | Noguchi et al. |
| 2014/0293046 A1 | 10/2014 | Ni |
| 2014/0313032 A1 | 10/2014 | Sager et al. |
| 2014/0359524 A1 | 12/2014 | Sasaki et al. |
| 2014/0363024 A1 | 12/2014 | Apodaca |
| 2014/0365980 A1 | 12/2014 | Morrison et al. |
| 2014/0375819 A1 | 12/2014 | Larsen et al. |
| 2014/0380234 A1 | 12/2014 | Shim et al. |
| 2015/0008845 A1 | 1/2015 | Kim et al. |
| 2015/0010167 A1 | 1/2015 | Arling et al. |
| 2015/0040012 A1 | 2/2015 | Faaborg et al. |
| 2015/0042576 A1 | 2/2015 | Wang |
| 2015/0058780 A1 | 2/2015 | Malik et al. |
| 2015/0071601 A1 | 3/2015 | Dabous et al. |
| 2015/0081072 A1 | 3/2015 | Kallai et al. |
| 2015/0082225 A1 | 3/2015 | Shearer |
| 2015/0090189 A1 | 4/2015 | Sills et al. |
| 2015/0092009 A1 | 4/2015 | Deluca et al. |
| 2015/0095804 A1 | 4/2015 | Grossman et al. |
| 2015/0095937 A1 | 4/2015 | Tobin |
| 2015/0097669 A1* | 4/2015 | Li .................... G08B 21/24 455/435.1 |
| 2015/0106721 A1 | 4/2015 | Cha et al. |
| 2015/0113418 A1 | 4/2015 | Sasaki et al. |
| 2015/0120000 A1 | 4/2015 | Coffey et al. |
| 2015/0120768 A1 | 4/2015 | Wellen et al. |
| 2015/0135068 A1 | 5/2015 | Chiu |
| 2015/0142587 A1 | 5/2015 | Salgar et al. |
| 2015/0145435 A1 | 5/2015 | Ogawa |
| 2015/0146945 A1 | 5/2015 | Han |
| 2015/0147067 A1 | 5/2015 | Ryan et al. |
| 2015/0159895 A1 | 6/2015 | Quam et al. |
| 2015/0160797 A1 | 6/2015 | Shearer et al. |
| 2015/0177914 A1 | 6/2015 | Coyner et al. |
| 2015/0180922 A1 | 6/2015 | Draznin et al. |
| 2015/0181169 A1 | 6/2015 | Kim et al. |
| 2015/0188724 A1 | 7/2015 | Kim et al. |
| 2015/0193127 A1 | 7/2015 | Chai et al. |
| 2015/0193196 A1 | 7/2015 | Lin et al. |
| 2015/0198938 A1 | 7/2015 | Steele et al. |
| 2015/0201480 A1 | 7/2015 | Ogawa |
| 2015/0206529 A1 | 7/2015 | Kwon et al. |
| 2015/0207849 A1 | 7/2015 | Bingzhou et al. |
| 2015/0212705 A1 | 7/2015 | Sasaki et al. |
| 2015/0244539 A1 | 8/2015 | Ickman et al. |
| 2015/0256957 A1 | 9/2015 | Kim et al. |
| 2015/0264304 A1 | 9/2015 | Chastney et al. |
| 2015/0310736 A1 | 10/2015 | Yamada et al. |
| 2015/0319006 A1 | 11/2015 | Plummer et al. |
| 2015/0319046 A1 | 11/2015 | Plummer et al. |
| 2015/0332586 A1 | 11/2015 | Hamm et al. |
| 2015/0341227 A1 | 11/2015 | Tatzel et al. |
| 2015/0348493 A1 | 12/2015 | Chae et al. |
| 2015/0350031 A1 | 12/2015 | Burks et al. |
| 2015/0350297 A1 | 12/2015 | Yang et al. |
| 2015/0370230 A1 | 12/2015 | Duchene et al. |
| 2015/0370426 A1 | 12/2015 | Carrigan et al. |
| 2015/0373178 A1 | 12/2015 | Felt et al. |
| 2016/0004499 A1 | 1/2016 | Kim et al. |
| 2016/0005280 A1 | 1/2016 | Laska et al. |
| 2016/0005281 A1 | 1/2016 | Laska et al. |
| 2016/0007423 A1 | 1/2016 | Aliakseyeu et al. |
| 2016/0021603 A1 | 1/2016 | Mueck et al. |
| 2016/0033985 A1 | 2/2016 | Gulli'et al. |
| 2016/0037140 A1 | 2/2016 | Lindsey et al. |
| 2016/0037436 A1 | 2/2016 | Spencer et al. |
| 2016/0043905 A1 | 2/2016 | Fiedler |
| 2016/0043962 A1 | 2/2016 | Kim et al. |
| 2016/0050476 A1 | 2/2016 | Patil |
| 2016/0070244 A1 | 3/2016 | Cipollo et al. |
| 2016/0073197 A1 | 3/2016 | Hammer et al. |
| 2016/0073439 A1 | 3/2016 | Palin et al. |
| 2016/0073482 A1 | 3/2016 | Fok et al. |
| 2016/0077795 A1 | 3/2016 | Cha et al. |
| 2016/0085412 A1 | 3/2016 | Meganathan et al. |
| 2016/0085431 A1 | 3/2016 | Kim et al. |
| 2016/0088438 A1 | 3/2016 | Okeeffe |
| 2016/0092072 A1 | 3/2016 | So et al. |
| 2016/0093180 A1 | 3/2016 | Fitzgibbon et al. |
| 2016/0093338 A1 | 3/2016 | Laska et al. |

(56) References Cited

U.S. PATENT DOCUMENTS

| | | |
|---|---|---|
| 2016/0099901 A1 | 4/2016 | Allen et al. |
| 2016/0103830 A1 | 4/2016 | Cheong et al. |
| 2016/0117402 A1 | 4/2016 | Gowel |
| 2016/0120009 A1 | 4/2016 | Aliakseyeu et al. |
| 2016/0133297 A1 | 5/2016 | Thornton et al. |
| 2016/0139752 A1 | 5/2016 | Shim et al. |
| 2016/0150135 A1 | 5/2016 | Chen |
| 2016/0165390 A1 | 6/2016 | Hartzell et al. |
| 2016/0173318 A1 | 6/2016 | Ha et al. |
| 2016/0179068 A1 | 6/2016 | Qian et al. |
| 2016/0187995 A1 | 6/2016 | Rosewall |
| 2016/0191992 A1 | 6/2016 | Kwon |
| 2016/0216879 A1 | 7/2016 | Park et al. |
| 2016/0224233 A1 | 8/2016 | Phang et al. |
| 2016/0231902 A1 | 8/2016 | Sirpal et al. |
| 2016/0253145 A1 | 9/2016 | Lee et al. |
| 2016/0255706 A1 | 9/2016 | Kim et al. |
| 2016/0259459 A1 | 9/2016 | Yang et al. |
| 2016/0277903 A1 | 9/2016 | Poosala et al. |
| 2016/0286630 A1 | 9/2016 | Witzgall |
| 2016/0291824 A1 | 10/2016 | Grossman et al. |
| 2016/0301566 A1 | 10/2016 | Ramasubramani et al. |
| 2016/0320849 A1 | 11/2016 | Koo |
| 2016/0335041 A1 | 11/2016 | Wachter et al. |
| 2016/0364114 A1 | 12/2016 | Von Dehsen et al. |
| 2016/0364123 A1 | 12/2016 | Burns et al. |
| 2016/0364129 A1 | 12/2016 | Mclean et al. |
| 2016/0365986 A1 | 12/2016 | Song et al. |
| 2016/0366481 A1 | 12/2016 | Lim et al. |
| 2017/0017531 A1 | 1/2017 | Choi et al. |
| 2017/0046025 A1 | 2/2017 | Dascola et al. |
| 2017/0053008 A1 | 2/2017 | Frenkel et al. |
| 2017/0070775 A1 | 3/2017 | Taxier et al. |
| 2017/0078767 A1 | 3/2017 | Borel et al. |
| 2017/0084132 A1 | 3/2017 | Scalisi |
| 2017/0084135 A1 | 3/2017 | Yu |
| 2017/0091551 A1 | 3/2017 | Zhang et al. |
| 2017/0097621 A1 | 4/2017 | Ackmann et al. |
| 2017/0176035 A1 | 6/2017 | Reeder et al. |
| 2017/0185277 A1 | 6/2017 | Sundermeyer et al. |
| 2017/0195130 A1 | 7/2017 | Landow et al. |
| 2017/0206779 A1 | 7/2017 | Lee et al. |
| 2017/0230705 A1 | 8/2017 | Pardue et al. |
| 2017/0251314 A1 | 8/2017 | Pye et al. |
| 2017/0285788 A1 | 10/2017 | Park et al. |
| 2017/0302779 A1 | 10/2017 | Zhao et al. |
| 2017/0311368 A1 | 10/2017 | Kandur Raja et al. |
| 2017/0315715 A1 | 11/2017 | Fujita et al. |
| 2017/0318322 A1 | 11/2017 | Lamb et al. |
| 2017/0337791 A1 | 11/2017 | Gordon-Carroll |
| 2017/0345420 A1 | 11/2017 | Barnett, Jr. |
| 2017/0352380 A1 | 12/2017 | Doumbouya et al. |
| 2017/0357425 A1 | 12/2017 | Smith et al. |
| 2017/0357434 A1 | 12/2017 | Coffman et al. |
| 2017/0359189 A1 | 12/2017 | Smith et al. |
| 2017/0359191 A1 | 12/2017 | Smith et al. |
| 2017/0359311 A1 | 12/2017 | Chen |
| 2017/0359555 A1 | 12/2017 | Irani et al. |
| 2018/0007838 A1 | 1/2018 | Mccord |
| 2018/0014043 A1 | 1/2018 | Zhang et al. |
| 2018/0014077 A1 | 1/2018 | Hou et al. |
| 2018/0018081 A1 | 1/2018 | Dattilo-Green et al. |
| 2018/0019889 A1* | 1/2018 | Burns ................ H04L 12/4625 |
| 2018/0020530 A1 | 1/2018 | Scordato et al. |
| 2018/0088795 A1 | 3/2018 | Van Os et al. |
| 2018/0091381 A1 | 3/2018 | Mclaughlin et al. |
| 2018/0101297 A1 | 4/2018 | Yang et al. |
| 2018/0109754 A1 | 4/2018 | Kwon |
| 2018/0113577 A1 | 4/2018 | Burns et al. |
| 2018/0115788 A1 | 4/2018 | Burns et al. |
| 2018/0122378 A1 | 5/2018 | Mixter et al. |
| 2018/0199080 A1 | 7/2018 | Jackson et al. |
| 2018/0213396 A1 | 7/2018 | Segal et al. |
| 2018/0227341 A1 | 8/2018 | Rizzi |
| 2018/0228003 A1 | 8/2018 | O'driscoll et al. |
| 2018/0228006 A1 | 8/2018 | Baker et al. |
| 2018/0232592 A1 | 8/2018 | Stewart et al. |
| 2018/0232705 A1 | 8/2018 | Baker et al. |
| 2018/0246639 A1 | 8/2018 | Han et al. |
| 2018/0249113 A1 | 8/2018 | Faulkner |
| 2018/0267774 A1 | 9/2018 | Williams et al. |
| 2018/0286395 A1 | 10/2018 | Li et al. |
| 2018/0288104 A1 | 10/2018 | Padilla et al. |
| 2018/0308480 A1 | 10/2018 | Jang et al. |
| 2018/0332559 A1 | 11/2018 | Gudivada et al. |
| 2018/0338038 A1 | 11/2018 | Ly et al. |
| 2018/0341448 A1 | 11/2018 | Behzadi et al. |
| 2018/0349707 A1 | 12/2018 | Bataller et al. |
| 2018/0349736 A1 | 12/2018 | Bapat et al. |
| 2018/0364665 A1 | 12/2018 | Clymer et al. |
| 2018/0367578 A1 | 12/2018 | Verma et al. |
| 2019/0004678 A1 | 1/2019 | Zhang et al. |
| 2019/0025943 A1 | 1/2019 | Jobs et al. |
| 2019/0026021 A1 | 1/2019 | Coffman et al. |
| 2019/0028419 A1 | 1/2019 | Sullivan |
| 2019/0056907 A1 | 2/2019 | So et al. |
| 2019/0075105 A1 | 3/2019 | Rajakumar |
| 2019/0089934 A1 | 3/2019 | Goulden et al. |
| 2019/0090014 A1 | 3/2019 | Shoop |
| 2019/0102145 A1 | 4/2019 | Wilberding et al. |
| 2019/0124745 A1 | 4/2019 | Mason et al. |
| 2019/0130185 A1 | 5/2019 | Delaney et al. |
| 2019/0138951 A1 | 5/2019 | Brownhill et al. |
| 2019/0208282 A1 | 7/2019 | Singh et al. |
| 2019/0265946 A1 | 8/2019 | Bae et al. |
| 2019/0266800 A1 | 8/2019 | Khalid et al. |
| 2019/0273664 A1 | 9/2019 | Fujita et al. |
| 2019/0279634 A1 | 9/2019 | Tak et al. |
| 2019/0286651 A1 | 9/2019 | Lee et al. |
| 2019/0289703 A1 | 9/2019 | Lang et al. |
| 2019/0294889 A1 | 9/2019 | Sriram et al. |
| 2019/0295393 A1 | 9/2019 | Lee et al. |
| 2019/0325229 A1 | 10/2019 | Koyama et al. |
| 2019/0332400 A1 | 10/2019 | Spoor et al. |
| 2019/0339769 A1 | 11/2019 | Cox et al. |
| 2019/0342621 A1 | 11/2019 | Carrigan et al. |
| 2019/0342622 A1* | 11/2019 | Carrigan ................ H04N 7/18 |
| 2019/0354252 A1 | 11/2019 | Badr |
| 2019/0361575 A1 | 11/2019 | Ni et al. |
| 2020/0041079 A1 | 2/2020 | Mellor et al. |
| 2020/0042775 A1 | 2/2020 | Lim |
| 2020/0050502 A1 | 2/2020 | Ghafourifar et al. |
| 2020/0120772 A1 | 4/2020 | Boring et al. |
| 2020/0127988 A1 | 4/2020 | Bradley et al. |
| 2020/0135191 A1 | 4/2020 | Nourbakhsh |
| 2020/0142667 A1 | 5/2020 | Querze et al. |
| 2020/0152186 A1 | 5/2020 | Koh et al. |
| 2020/0186378 A1 | 6/2020 | Six et al. |
| 2020/0220914 A1 | 7/2020 | Carrigan et al. |
| 2020/0225817 A1 | 7/2020 | Coffman et al. |
| 2020/0225841 A1 | 7/2020 | Coffman et al. |
| 2020/0301575 A1 | 9/2020 | Lindholm et al. |
| 2020/0302913 A1 | 9/2020 | Marcinkiewicz |
| 2020/0312318 A1 | 10/2020 | Olson et al. |
| 2020/0335187 A1 | 10/2020 | Lefkofsky et al. |
| 2020/0374996 A1 | 11/2020 | Barnes et al. |
| 2020/0382332 A1 | 12/2020 | Carrigan et al. |
| 2020/0382559 A1 | 12/2020 | Kramar et al. |
| 2020/0395012 A1 | 12/2020 | Kim et al. |
| 2020/0413197 A1 | 12/2020 | Carrigan et al. |
| 2021/0043189 A1 | 2/2021 | Pyun |
| 2021/0064317 A1 | 3/2021 | Juenger et al. |
| 2021/0065134 A1 | 3/2021 | Chhabra et al. |
| 2021/0092491 A1 | 3/2021 | Carrigan et al. |
| 2021/0099829 A1 | 4/2021 | Soto et al. |
| 2021/0152685 A1 | 5/2021 | Li |
| 2021/0158830 A1 | 5/2021 | Boehlke |
| 2021/0243084 A1 | 8/2021 | Lou et al. |
| 2021/0266274 A1 | 8/2021 | Liu et al. |
| 2021/0321197 A1 | 10/2021 | Annamraju |
| 2021/0323406 A1 | 10/2021 | So et al. |
| 2021/0349680 A1 | 11/2021 | Kim et al. |
| 2021/0352172 A1 | 11/2021 | Kim et al. |
| 2021/0383130 A1 | 12/2021 | Deets et al. |

(56) References Cited

U.S. PATENT DOCUMENTS

| | | |
|---|---|---|
| 2021/0385417 A1 | 12/2021 | Park et al. |
| 2021/0389869 A1 | 12/2021 | Deets et al. |
| 2022/0004356 A1 | 1/2022 | Kim et al. |
| 2022/0180862 A1 | 6/2022 | Sharifi et al. |
| 2022/0279022 A1 | 9/2022 | Kramar et al. |
| 2022/0365667 A1 | 11/2022 | Carrigan et al. |
| 2023/0041125 A1 | 2/2023 | Kim et al. |
| 2023/0057851 A1 | 2/2023 | Ansari et al. |
| 2023/0082492 A1 | 3/2023 | Coffman et al. |
| 2023/0209016 A1 | 6/2023 | Park et al. |
| 2023/0393714 A1 | 12/2023 | Giuliani |
| 2023/0403509 A1 | 12/2023 | Carrigan et al. |
| 2024/0040198 A1 | 2/2024 | Carrigan et al. |
| 2024/0077991 A1 | 3/2024 | Von Hagen |
| 2024/0220095 A1 | 7/2024 | Ye et al. |
| 2024/0259638 A1 | 8/2024 | Carrigan et al. |
| 2024/0406632 A1 | 12/2024 | Carrigan et al. |
| 2025/0123738 A1 | 4/2025 | Deets et al. |
| 2025/0164951 A1 | 5/2025 | Coffman et al. |
| 2025/0168456 A1 | 5/2025 | Carrigan et al. |

FOREIGN PATENT DOCUMENTS

| | | |
|---|---|---|
| CN | 101517557 A | 8/2009 |
| CN | 101627361 A | 1/2010 |
| CN | 101989072 A | 3/2011 |
| CN | 102063253 A | 5/2011 |
| CN | 102202192 A | 9/2011 |
| CN | 102915630 A | 2/2013 |
| CN | 102932216 A | 2/2013 |
| CN | 103136497 A | 6/2013 |
| CN | 103347116 A | 10/2013 |
| CN | 103677711 A | 3/2014 |
| CN | 103970814 A | 8/2014 |
| CN | 104076757 A | 10/2014 |
| CN | 104155938 A | 11/2014 |
| CN | 104247449 A | 12/2014 |
| CN | 104284477 A | 1/2015 |
| CN | 104298188 A | 1/2015 |
| CN | 204155434 U | 2/2015 |
| CN | 104429094 A | 3/2015 |
| CN | 104469512 A | 3/2015 |
| CN | 104581043 A | 4/2015 |
| CN | 104618672 A | 5/2015 |
| CN | 104684207 A | 6/2015 |
| CN | 104766021 A | 7/2015 |
| CN | 104780654 A | 7/2015 |
| CN | 104820631 A | 8/2015 |
| CN | 104898603 A | 9/2015 |
| CN | 104956276 A | 9/2015 |
| CN | 104956417 A | 9/2015 |
| CN | 105069118 A | 11/2015 |
| CN | 105159107 A | 12/2015 |
| CN | 105204742 A | 12/2015 |
| CN | 105263114 A | 1/2016 |
| CN | 105283840 A | 1/2016 |
| CN | 105359199 A | 2/2016 |
| CN | 105373165 A | 3/2016 |
| CN | 105374192 A | 3/2016 |
| CN | 105388773 A | 3/2016 |
| CN | 105474580 A | 4/2016 |
| CN | 105531671 A | 4/2016 |
| CN | 105553796 A | 5/2016 |
| CN | 105554516 A | 5/2016 |
| CN | 105847746 A | 8/2016 |
| CN | 105900376 A | 8/2016 |
| CN | 106537991 A | 3/2017 |
| CN | 106572326 A | 4/2017 |
| CN | 106878676 A | 6/2017 |
| CN | 107197441 A | 9/2017 |
| CN | 107533368 A | 1/2018 |
| CN | 107613235 A | 1/2018 |
| CN | 107637073 A | 1/2018 |
| CN | 107819928 A | 3/2018 |
| CN | 109117078 A | 1/2019 |
| CN | 109196825 A | 1/2019 |
| CN | 109287140 A | 1/2019 |
| CN | 109302531 A | 2/2019 |
| CN | 109348052 A | 2/2019 |
| CN | 109688441 A | 4/2019 |
| CN | 109688442 A | 4/2019 |
| CN | 110069190 A | 7/2019 |
| DK | 180842 B1 | 5/2022 |
| EP | 1881649 A2 | 1/2008 |
| EP | 2536259 A2 | 12/2012 |
| EP | 2675195 A2 | 12/2013 |
| EP | 2784611 A2 | 10/2014 |
| EP | 2797391 A1 | 10/2014 |
| EP | 2879470 A1 | 6/2015 |
| EP | 2894948 A2 | 7/2015 |
| EP | 2933953 A1 | 10/2015 |
| EP | 2981093 A1 | 2/2016 |
| EP | 2996359 A1 | 3/2016 |
| EP | 3038427 A1 | 6/2016 |
| EP | 3041229 A1 | 7/2016 |
| EP | 3099143 A1 | 11/2016 |
| EP | 3420441 A1 | 1/2019 |
| EP | 3445058 A1 | 2/2019 |
| EP | 3460770 A1 | 3/2019 |
| EP | 3038427 B1 | 12/2019 |
| EP | 3579093 A1 | 12/2019 |
| EP | 3751405 A1 | 12/2020 |
| EP | 4134799 A1 | 2/2023 |
| GB | 2499123 A | 8/2013 |
| GB | 2512821 A | 10/2014 |
| GB | 2533101 A | 6/2016 |
| IN | 1038/MUM/2005 A | 6/2007 |
| JP | 4-175921 A | 6/1992 |
| JP | 6-178356 A | 6/1994 |
| JP | 2000-224542 A | 8/2000 |
| JP | 2001-67099 A | 3/2001 |
| JP | 2002-153678 A | 5/2002 |
| JP | 2003-228780 A | 8/2003 |
| JP | 2004-96397 A | 3/2004 |
| JP | 2004-110559 A | 4/2004 |
| JP | 2005-333294 A | 12/2005 |
| JP | 2006-350819 A | 12/2006 |
| JP | 2007-58663 A | 3/2007 |
| JP | 2007-179302 A | 7/2007 |
| JP | 2008-99330 A | 4/2008 |
| JP | 2009-201127 A | 9/2009 |
| JP | 2011-124665 A | 6/2011 |
| JP | 2012-73839 A | 4/2012 |
| JP | 2012-123460 A | 6/2012 |
| JP | 2013-98613 A | 5/2013 |
| JP | 2013-200879 A | 10/2013 |
| JP | 2014-53294 A | 3/2014 |
| JP | 2014-71835 A | 4/2014 |
| JP | 2014-87126 A | 5/2014 |
| JP | 2014-160461 A | 9/2014 |
| JP | 2014-170982 A | 9/2014 |
| JP | 2014-186961 A | 10/2014 |
| JP | 5628461 B1 | 11/2014 |
| JP | 2015-70327 A | 4/2015 |
| JP | 2015-125671 A | 7/2015 |
| JP | 2015-128043 A | 7/2015 |
| JP | 2015-128326 A | 7/2015 |
| JP | 2015-149710 A | 8/2015 |
| JP | 2015-154253 A | 8/2015 |
| JP | 2015-195222 A | 11/2015 |
| JP | 2015-204510 A | 11/2015 |
| JP | 2015-211035 A | 11/2015 |
| JP | 2016-38615 A | 3/2016 |
| JP | 2016-51661 A | 4/2016 |
| JP | 2016-063520 A | 4/2016 |
| JP | 2016-63531 A | 4/2016 |
| JP | 2016-72953 A | 5/2016 |
| JP | 2016-100791 A | 5/2016 |
| JP | 2016-119600 A | 6/2016 |
| JP | 2016-525732 A | 8/2016 |
| JP | 2016-157292 A | 9/2016 |
| JP | 2017-41008 A | 2/2017 |
| JP | 2017-508195 A | 3/2017 |
| JP | 2017-84253 A | 5/2017 |

(56) References Cited

FOREIGN PATENT DOCUMENTS

| | | | |
|---|---|---|---|
| JP | 2017-158202 A | 9/2017 | |
| JP | 2017-173998 A | 9/2017 | |
| JP | 2017-212096 A | 11/2017 | |
| JP | 2018-7158 A | 1/2018 | |
| JP | 2018-63826 A | 4/2018 | |
| JP | 2018-200624 A | 12/2018 | |
| JP | 2019-526095 A | 9/2019 | |
| KR | 10-2001-0091156 A | 10/2001 | |
| KR | 10-2011-0022980 A | 3/2011 | |
| KR | 10-2011-0075136 A | 7/2011 | |
| KR | 10-2011-0093040 A | 8/2011 | |
| KR | 10-2012-0059860 A | 6/2012 | |
| KR | 10-2012-0079208 A | 7/2012 | |
| KR | 10-2013-0115611 A | 10/2013 | |
| KR | 10-2014-0075932 A | 6/2014 | |
| KR | 10-2014-0148289 A | 12/2014 | |
| KR | 10-2015-0005134 A | 1/2015 | |
| KR | 10-2015-0043146 A | 4/2015 | |
| KR | 10-1522311 B1 | 5/2015 | |
| KR | 10-2015-0136440 A | 12/2015 | |
| KR | 10-2017-0008601 A | 1/2017 | |
| KR | 10-2017-0100358 A | 9/2017 | |
| KR | 10-2018-0027707 A | 3/2018 | |
| KR | 10-2018-0034637 A | 4/2018 | |
| KR | 10-2018-0042013 A | 4/2018 | |
| KR | 10-2018-0085931 A | 7/2018 | |
| KR | 10-2019-0002658 A | 1/2019 | |
| KR | 10-2019-0014495 A | 2/2019 | |
| KR | 10-2019-0057414 A | 5/2019 | |
| KR | 10-2020-0039030 A | 4/2020 | |
| KR | 10-2020-0054298 A | 5/2020 | |
| TW | 201547326 A | 12/2015 | |
| WO | 00/39964 A1 | 7/2000 | |
| WO | 2005/055521 A1 | 6/2005 | |
| WO | 2011/027964 A1 | 3/2011 | |
| WO | 2011/126502 A1 | 10/2011 | |
| WO | 2012/085794 A1 | 6/2012 | |
| WO | 2014/030540 A1 | 2/2014 | |
| WO | 2014/128800 A1 | 8/2014 | |
| WO | 2014/155429 A1 | 10/2014 | |
| WO | 2014/197339 A1 | 12/2014 | |
| WO | 2014/208057 A1 | 12/2014 | |
| WO | 2014/210304 A1 | 12/2014 | |
| WO | 2015/008409 A1 | 1/2015 | |
| WO | 2015/039009 A1 | 3/2015 | |
| WO | 2015/105763 A1 | 7/2015 | |
| WO | 2015/114690 A1 | 8/2015 | |
| WO | 2015/179031 A1 | 11/2015 | |
| WO | 2016/052888 A1 | 4/2016 | |
| WO | 2016/079889 A1 | 5/2016 | |
| WO | 2016/103546 A1 | 6/2016 | |
| WO | 2016/200603 A1 | 12/2016 | |
| WO | 2017/027526 A1 | 2/2017 | |
| WO | 2017/058293 A1 | 4/2017 | |
| WO | 2017/147081 A1 | 8/2017 | |
| WO | 2017/205657 A1 | 11/2017 | |
| WO | 2017/218143 A1 | 12/2017 | |
| WO | 2017/218192 A1 | 12/2017 | |
| WO | 2018/052572 A1 | 3/2018 | |
| WO | 2018/144339 A2 | 8/2018 | |
| WO | 2018/200685 A2 | 11/2018 | |
| WO | 2018/213401 A1 | 11/2018 | |
| WO | 2018/213415 A1 | 11/2018 | |
| WO | 2018/213844 A1 | 11/2018 | |
| WO | 2018/232333 A1 | 12/2018 | |
| WO | 2019/090653 A1 | 5/2019 | |
| WO | 2019/217341 A1 | 11/2019 | |
| WO | 202/1231412 A1 | 11/2021 | |

OTHER PUBLICATIONS

Final Office Action received for U.S. Appl. No. 16/830,838, mailed on Apr. 11, 2024, 17 pages.
Intention to Grant received for European Patent Application No. 20746426.4, mailed on Apr. 12, 2024, 9 pages.
Notice of Allowance received for U.S. Appl. No. 17/992,229, mailed on Apr. 17, 2024, 9 pages.
Corrected Notice of Allowance received for U.S. Appl. No. 18/235,291, mailed on Jul. 18, 2024, 3 pages.
Extended European Search Report received for European Patent Application No. 24165156.1, mailed on Jul. 16, 2024, 7 pages.
Intention to Grant received for European Patent Application No. 20719301.2, mailed on Jul. 2, 2024, 9 pages.
Non-Final Office Action received for U.S. Appl. No. 18/204,888, mailed on Jul. 18, 2024, 21 pages.
Notice of Allowance received for U.S. Appl. No. 16/830,838, mailed on Jul. 15, 2024, 8 pages.
Notice of Allowance received for U.S. Appl. No. 18/235,291, mailed on Jul. 3, 2024, 18 pages.
Office Action received for European Patent Application No. 23203433.0, mailed on Jul. 9, 2024, 6 pages.
Advisory Action received for U.S. Appl. No. 16/830,838, mailed on Oct. 10, 2023, 5 pages.
Applicant-Initiated Interview Summary received for U.S. Appl. No. 16/830,838, mailed on Sep. 22, 2023, 2 pages.
Applicant-Initiated Interview Summary received for U.S. Appl. No. 17/476,404. mailed on Oct. 31, 2023, 4 pages.
Corrected Notice of Allowance received for U.S. Appl. No. 18/111,484, mailed on Nov. 8, 2023, 7 pages.
Examiner's Answer to Appeal Brief received for U.S. Appl. No. 17/116,938, mailed on Oct. 31, 2023, 55 pages.
Final Office Action received for U.S. Appl. No. 17/992,229, mailed on Sep. 25, 2023, 16 pages.
Notice of Allowance received for Japanese Patent Application No. 2022-016138, mailed on Sep. 25, 2023. 3 pages (1 page of English Translation and 2 pages of Official Copy).
Notice of Allowance received for Korean Patent Application No. 10-2022-7001332, mailed on Oct. 25, 2023, 7 pages (2 pages of English Translation and 5 pages of Official Copy).
Notice of Allowance received for Korean Patent Application No. 10-2022-7040554, mailed on Sep. 26, 2023, 7 pages (2 pages of English Translation and 5 pages of Official Copy).
Notice of Allowance received for U.S. Appl. No. 18/111,484, mailed on Oct. 24, 2023, 10 pages.
Office Action received for Australian Patent Application No. 2022291522, mailed on Oct. 11, 2023, 2 pages.
Office Action received for European Patent Application No. 20719301.2, mailed on Oct. 20, 2023, 11 pages.
Office Action received for Japanese Patent Application No. 2022-104306, mailed on Sep. 19, 2023, 4 pages (2 pages of English Translation and 2 pages of Official Copy).
Office Action received for Korean Patent Application No. 10-2023-0001668, mailed on Nov. 3, 2023, 5 pages (2 pages of English Translation and 3 pages of Official Copy).
Decision to Grant received for European Patent Application No. 20746426.4, mailed on May 10, 2024, 2 pages.
Notice of Allowance received for Korean Patent Application No. 10-2023-7044810, mailed on Apr. 24, 2024, 7 pages (2 pages of English Translation and 5 pages of Official Copy).
Notice of Allowance received for U.S. Appl. No. 18/375,457, mailed on May 16, 2024, 15 pages.
Corrected Notice of Allowance received for U.S. Appl. No. 18/375,457, mailed on Aug. 16, 2024, 2 pages.
Office Action received for Australian Patent Application No. 2023251497, mailed on Aug. 9, 2024, 2 pages.
Advisory Action received for U.S. Appl. No. 16/404,605, mailed on Apr. 15, 2020, 10 pages.
Advisory Action received for U.S. Appl. No. 17/031,877, mailed on Nov. 3, 2022, 3 pages.
Androidcentral, "How do i respond to group messages from notification bar?", Available online at: https://forums.androidcentral.com/ask-question/952030-how-do-i-respond-group-messages-notification-bar.html, Mar. 25, 2019, 3 pages.
Applicant-Initiated Interview Summary received for U.S. Appl. No. 16/404,605, mailed on Nov. 13, 2019, 3 pages.
Applicant-Initiated Interview Summary received for U.S. Appl. No. 16/584,743, mailed on May 1, 2020, 5 pages.

(56) References Cited

OTHER PUBLICATIONS

Applicant-Initiated Interview Summary received for U.S. Appl. No. 16/586,002, mailed on Apr. 28, 2020, 5 pages.
Applicant-Initiated Interview Summary received for U.S. Appl. No. 16/817,328, mailed on Dec. 21, 2021, 3 pages.
Applicant-Initiated Interview Summary received for U.S. Appl. No. 16/830,838, mailed on Apr. 6, 2022, 2 pages.
Applicant-Initiated Interview Summary received for U.S. Appl. No. 16/830,838, mailed on Dec. 16, 2022, 2 pages.
Applicant-Initiated Interview Summary received for U.S. Appl. No. 16/830,838, mailed on Jun. 1, 2023, 2 pages.
Applicant-Initiated Interview Summary received for U.S. Appl. No. 16/830,838, mailed on May 24, 2021, 3 pages.
Applicant-Initiated Interview Summary received for U.S. Appl. No. 16/830,838, mailed on Sep. 21, 2022, 2 pages.
Applicant-Initiated Interview Summary received for U.S. Appl. No. 17/026,818, mailed on Dec. 15, 2020, 7 pages.
Applicant-Initiated Interview Summary received for U.S. Appl. No. 17/026,818, mailed on Mar. 8, 2021, 4 pages.
Applicant-Initiated Interview Summary received for U.S. Appl. No. 17/028,176, mailed on Jun. 2, 2022, 5 pages.
Applicant-Initiated Interview Summary received for U.S. Appl. No. 17/028,176, mailed on Oct. 14, 2022, 5 pages.
Applicant-Initiated Interview Summary received for U.S. Appl. No. 17/031,877, mailed on Dec. 22, 2021, 4 pages.
Applicant-Initiated Interview Summary received for U.S. Appl. No. 17/031,877, mailed on Oct. 6, 2022, 5 pages.
Applicant-Initiated Interview Summary received for U.S. Appl. No. 17/116,938, mailed on Dec. 13, 2021, 3 pages.
Applicant-Initiated Interview Summary received for U.S. Appl. No. 17/116,938, mailed on Jun. 14, 2022, 2 pages.
Applicant-Initiated Interview Summary received for U.S. Appl. No. 17/116,938, mailed on Oct. 13, 2022, 3 pages.
Applicant-Initiated Interview Summary received for U.S. Appl. No. 17/223,794, mailed on Sep. 7, 2021, 3 pages.
Applicant-Initiated Interview Summary received for U.S. Appl. No. 17/337,110, mailed on Sep. 21, 2022, 2 pages.
Applicant-Initiated Interview Summary received for U.S. Appl. No. 17/476,404, mailed on Dec. 20, 2022, 2 pages.
Applicant-Initiated Interview Summary received for U.S. Appl. No. 17/476,404, mailed on Jul. 27, 2022, 6 pages.
Applicant-Initiated Interview Summary received for U.S. Appl. No. 17/476,404, mailed on Jun. 2, 2023, 2 pages.
Applicant-Initiated Interview Summary received for U.S. Appl. No. 17/476,404, mailed on Mar. 18, 2022, 2 pages.
Applicant-Initiated Interview Summary received for U.S. Appl. No. 17/742,273, mailed on Jan. 18, 2023, 4 pages.
Applicant-Initiated Interview Summary received for U.S. Appl. No. 17/742,273, mailed on Mar. 30, 2023, 5 pages.
Applicant-Initiated Interview Summary received for U.S. Appl. No. 17/742,273, mailed on Sep. 27, 2023, 4 pages.
Applicant-Initiated Interview Summary received for U.S. Appl. No. 17/992,229, mailed on Aug. 28, 2023, 3 pages.
Benjamin Jeff, "iOS 10: How to use the new Home app to control HomeKit devices [Video]", Available online at: https://9to5mac.com/2016/09/23/ios-10-how-to-use-new-home-app-control-homekit-devices-video, Sep. 23, 2016, 36 pages.
BlueJeans, "Video Conferencing Software | BlueJeans", Online Available at:- https://www.bluejeans.com/features/video-conferences Retrieved from online at: Apr. 28, 2020, 6 pages.
Brief Communication Regarding Oral Proceedings received for European Patent Application No. 17813777.4, mailed on Nov. 23, 2020, 6 pages.
Brief Communication Regarding Oral Proceedings received for European Patent Application No. 19182037.2, mailed on Apr. 15, 2021, 2 pages.
Brief Communication Regarding Oral Proceedings received for European Patent Application No. 19728558.8, mailed on Jul. 5, 2022, 1 page.
Brief Communication Regarding Oral Proceedings received for European Patent Application No. 20187610.9, mailed on May 31, 2022, 1 page.
CCTV Camera Pros, "View HD Security Cameras on iDVR-PRO iPhone App", Online Available at: https://www.youtube.com/watch?v=LAsZdfys2GM, Apr. 12, 2017, 3 pages.
Certificate of Examination received for Australian Patent Application No. 2017100666, mailed on Jan. 29, 2018, 2 pages.
Certificate of Examination received for Australian Patent Application No. 2019100487, mailed on Jan. 7, 2020, 2 pages.
Certificate of Examination received for Australian Patent Application No. 2020100303, mailed on Apr. 17, 2020, 2 pages.
Certificate of Examination received for Australian Patent Application No. 2020100886, mailed on Dec. 22, 2020, 2 pages.
Certificate of Examination received for Australian Patent Application No. 2021100721, mailed on Dec. 16, 2021, 2 pages.
Corrected International Search Report and Written Opinion received for PCT Patent Application No. PCT/US2017/035293, mailed on Dec. 8, 2017, 21 pages.
Corrected Notice of Allowance received for U.S. Appl. No. 15/427,516, mailed on Apr. 29, 2019, 2 pages.
Corrected Notice of Allowance received for U.S. Appl. No. 15/427,516, mailed on May 8, 2019, 2 pages.
Corrected Notice of Allowance received for U.S. Appl. No. 16/143,379, mailed on Aug. 15, 2019, 2 pages.
Corrected Notice of Allowance received for U.S. Appl. No. 16/143,379, mailed on Dec. 18, 2019, 2 pages.
Corrected Notice of Allowance received for U.S. Appl. No. 16/143,379, mailed on Feb. 14, 2020, 2 pages.
Corrected Notice of Allowance received for U.S. Appl. No. 16/143,379, mailed on Mar. 3, 2020, 2 pages.
Corrected Notice of Allowance received for U.S. Appl. No. 16/143,379, mailed on Mar. 12, 2020, 2 pages.
Corrected Notice of Allowance received for U.S. Appl. No. 16/143,379, mailed on Nov. 12, 2019, 2 pages.
Corrected Notice of Allowance received for U.S. Appl. No. 16/143,379, mailed on Oct. 16, 2019, 2 pages.
Corrected Notice of Allowance received for U.S. Appl. No. 16/404,605, mailed on Dec. 23, 2020, 3 pages.
Corrected Notice of Allowance received for U.S. Appl. No. 16/584,743, mailed on Dec. 30, 2020, 3 pages.
Corrected Notice of Allowance received for U.S. Appl. No. 17/019,845, mailed on Aug. 7, 2023, 4 pages.
Corrected Notice of Allowance received for U.S. Appl. No. 17/027,373, mailed on Jul. 12, 2022, 2 pages.
Corrected Notice of Allowance received for U.S. Appl. No. 17/027,373, mailed on Oct. 26, 2022, 2 pages.
Corrected Notice of Allowance received for U.S. Appl. No. 17/028,176, mailed on Mar. 6, 2023, 3 pages.
Corrected Notice of Allowance received for U.S. Appl. No. 17/337,110, mailed on Jan. 19, 2023, 7 pages.
Decision to Grant received for Danish Patent Application No. PA201670601, mailed on Jun. 21, 2019, 2 pages.
Decision to Grant received for Danish Patent Application No. PA201670602, mailed on Nov. 30, 2018, 2 pages.
Decision to Grant received for Danish Patent Application No. PA201670604, mailed on Aug. 22, 2018, 2 pages.
Decision to Grant received for Danish Patent Application No. PA201670605, mailed on Nov. 29, 2018, 2 pages.
Decision to Grant received for Danish Patent Application No. PA201870293, mailed on Dec. 3, 2018, 2 pages.
Decision to Grant received for Danish Patent Application No. PA201870435, mailed on Oct. 20, 2020, 2 pages.
Decision to Grant received for Danish Patent Application No. PA202070627, mailed on May 11, 2022, 2 pages.
Decision to Grant received for European Patent Application No. 19182037.2, mailed on Sep. 16, 2021, 3 pages.
Decision to Grant received for Japanese Patent Application No. 2021-051415, mailed on Jan. 6, 2022, 3 pages.
Decision to Refuse received for European Patent Application No. 20187610.9, mailed on Jul. 19, 2022, 13 pages.
Examiner-Initiated Interview Summary received for U.S. Appl. No. 17/027,373, mailed on Mar. 31, 2022, 4 pages.

(56) References Cited

OTHER PUBLICATIONS

Examiner-Initiated Interview Summary received for U.S. Appl. No. 17/028,176, mailed on Nov. 17, 2021, 2 pages.
Examiner's Answer to Appeal Brief received for U.S. Appl. No. 17/031,877, mailed on Jun. 29, 2023, 12 pages.
Examiner's Pre-Review Report received for Japanese Patent Application No. 2020-047952, mailed on Dec. 13, 2022, 10 pages.
Extended European Search Report (includes Supplementary European Search Report and Search Opinion) received for European Patent Application No. 17813777.4, mailed on Mar. 25, 2019, 8 pages.
Extended European Search Report received for European Patent Application No. 19182037.2, mailed on Oct. 31, 2019, 8 pages.
Extended European Search Report received for European Patent Application No. 20187610.9, mailed on Nov. 16, 2020, 7 pages.
Extended European Search Report received for European Patent Application No. 21160991.2, mailed on Jul. 16, 2021, 14 pages.
Extended European Search Report received for European Patent Application No. 22196865.4, mailed on Jan. 13, 2023, 7 pages.
Extended European Search Report received for European Patent Application No. 22191264.5, mailed on Nov. 11, 2022, 8 pages.
Extended Search Report received for European Patent Application No. 21161005.0, mailed on Jun. 14, 2021, 12 pages.
Final Office Action received for U.S. Appl. No. 16/404,605, mailed on Feb. 10, 2020, 21 pages.
Final Office Action received for U.S. Appl. No. 16/830,838, mailed on Dec. 9, 2021, 16 pages.
Final Office Action received for U.S. Appl. No. 16/830,838, mailed on Jun. 26, 2023, 16 pages.
Final Office Action received for U.S. Appl. No. 16/830,838, mailed on Oct. 14, 2022, 16 pages.
Final Office Action received for U.S. Appl. No. 17/026,818, mailed on Jan. 29, 2021, 21 pages.
Final Office Action received for U.S. Appl. No. 17/028,176, mailed on Mar. 9, 2022, 22 pages.
Final Office Action received for U.S. Appl. No. 17/031,877, mailed on Aug. 4, 2022, 35 pages.
Final Office Action received for U.S. Appl. No. 17/031,877, mailed on Oct. 27, 2021, 24 pages.
Final Office Action received for U.S. Appl. No. 17/116,938, mailed on Dec. 29, 2022, 42 pages.
Final Office Action received for U.S. Appl. No. 17/116,938, mailed on Mar. 1, 2022, 27 pages.
Final Office Action received for U.S. Appl. No. 17/476,404, mailed on May 5, 2022, 30 pages.
Final Office Action received for U.S. Appl. No. 17/476,404, mailed on Sep. 12, 2023, 30 pages.
Final Office Action received for U.S. Appl. No. 17/742,273, mailed on Feb. 15, 2023, 56 pages.
Final Office Action received for U.S. Appl. No. 17/742,273, mailed on Oct. 12, 2023, 58 pages.
IDB, "HomeCam is the Best Way to View Multiple HomeKit Cameras on iPhone & Apple TV", Available online at: https://www.youtube.com/watch?v=6x2oCHgSVUU, Feb. 20, 2018, 3 pages.
Intention to Grant received for Danish Patent Application No. PA201670601, mailed on Apr. 10, 2019, 2 pages.
Intention to Grant received for Danish Patent Application No. PA201670602, mailed on Aug. 1, 2018, 2 pages.
Intention to Grant received for Danish Patent Application No. PA201670604, mailed on Jun. 14, 2018, 2 pages.
Intention to Grant received for Danish Patent Application No. PA201670604, mailed on Mar. 15, 2018, 2 pages.
Intention to Grant received for Danish Patent Application No. PA201670605, mailed on Aug. 1, 2018, 2 pages.
Intention to Grant received for Danish Patent Application No. PA201870293, mailed on Aug. 31, 2018, 2 pages.
Intention to Grant received for Danish Patent Application No. PA201870435, mailed on Jul. 1, 2020, 2 pages.
Intention to Grant received for Danish Patent Application No. PA202070617, mailed on Nov. 15, 2021, 2 pages.
Intention to Grant received for Danish Patent Application No. PA202070627, mailed on Jan. 4, 2022, 2 pages.
Intention to Grant received for European Patent Application No. 19182037.2, mailed on May 4, 2021, 9 pages.
Intention to Grant received for European Patent Application No. 21728781.2, mailed on Jul. 28, 2023, 9 pages.
International Preliminary Report on Patentability received for PCT Patent Application No. PCT/US2017/035293, mailed on Dec. 27, 2018, 16 pages.
International Preliminary Report on Patentability received for PCT Patent Application No. PCT/US2019/030963, mailed on Nov. 19, 2020, 12 pages.
International Preliminary Report on Patentability received for PCT Patent Application No. PCT/US2020/024390, mailed on Dec. 9, 2021, 20 pages.
International Preliminary Report on Patentability received for PCT Patent Application No. PCT/US2020/035426, mailed on Dec. 9, 2021, 10 pages.
International Preliminary Report on Patentability received for PCT Patent Application No. PCT/US2021/031760, mailed on Nov. 24, 2022, 11 pages.
International Preliminary Report on Patentability received for PCT Patent Application No. PCT/US2021/035715, mailed on Dec. 15, 2022, 14 pages.
International Search Report and Written Opinion received for PCT Patent Application No. PCT/US2017/035293, mailed on Oct. 10, 2017, 25 pages.
International Search Report and Written Opinion received for PCT Patent Application No. PCT/US2019/030963, mailed on Oct. 17, 2019, 21 pages.
International Search Report and written Opinion received for PCT Patent Application No. PCT/US2020/024390, mailed on Aug. 17, 2020, 22 pages.
International Search Report and Written Opinion received for PCT Patent Application No. PCT/US2020/024390, mailed on Oct. 23, 2020, 26 pages.
International Search Report and Written Opinion received for PCT Patent Application No. PCT/US2020/035426, mailed on Sep. 11, 2020, 12 pages.
International Search Report and Written Opinion received for PCT Patent Application No. PCT/US2021/031760, mailed on Sep. 16, 2021, 18 pages.
International Search Report and Written Opinion received for PCT Patent Application No. PCT/US2021/035715, mailed on Nov. 15, 2021, 19 pages.
International Search Report and Written Opinion received for PCT Patent Application No. PCT/US2022/029282, mailed on Nov. 9, 2022, 22 pages.
Invitation to Pay Additional Fees and Partial International Search Report received for PCT Patent Application No. PCT/US2021/035715, mailed on Sep. 21, 2021, 15 pages.
Invitation to Pay Additional Fees and Partial International Search Report received for PCT Patent Application No. PCT/US2022/029282, mailed on Sep. 15, 2022, 15 pages.
Invitation to Pay Additional Fees received for PCT Patent Application No. PCT/US2020/024390, mailed on Jun. 26, 2020, 15 pages.
Invitation to Pay Additional Fees received for PCT Patent Application No. PCT/US2017/035293, mailed on Aug. 17, 2017, 3 pages.
Invitation to Pay Additional Fees received for PCT Patent Application No. PCT/US2019/030963, mailed on Aug. 22, 2019, 12 pages.
Invitation to Pay Search Fees received for European Patent Application No. 19728558.8, mailed on Apr. 20, 2021, 4 pages.
Invitation to Pay Search Fees received for European Patent Application No. 20719301.2, mailed on Dec. 17, 2020, 5 pages.
Invitation to Pay Search Fees received for European Patent Application No. 21728781.2, mailed on Dec. 2, 2022, 3 pages.
Minutes of the Oral Proceedings received for European Patent Application No. 20187610.9, mailed on Jun. 7, 2022, 6 pages.
Multi-camera view on Alexa, Online available at:https://forums.wyzecam.com/t/multi-camera-view-on-alexa/24290, Retrieved on May 12, 2021, 8 pages.

(56) References Cited

OTHER PUBLICATIONS

Non-Final Office Action received for U.S. Appl. No. 15/427,516, mailed on Aug. 28, 2018, 11 pages.
Non-Final Office Action received for U.S. Appl. No. 16/404,605, mailed on Jun. 24, 2020, 18 pages.
Non-Final Office Action received for U.S. Appl. No. 16/404,605, mailed on Aug. 1, 2019, 19 pages.
Non-Final Office Action received for U.S. Appl. No. 16/404,612, mailed on Feb. 28, 2020, 13 pages.
Non-Final Office Action received for U.S. Appl. No. 16/584,743, mailed on Feb. 6, 2020, 15 pages.
Non-Final Office Action received for U.S. Appl. No. 16/586,002, mailed on Feb. 20, 2020, 15 pages.
Non-Final Office Action received for U.S. Appl. No. 16/817,328, mailed on Oct. 29, 2021, 9 pages.
Non-Final Office Action received for U.S. Appl. No. 16/830,838, mailed on Apr. 1, 2021, 13 pages.
Non-Final Office Action received for U.S. Appl. No. 16/830,838, mailed on Jun. 9, 2022, 17 pages.
Non-Final Office Action received for U.S. Appl. No. 16/830,838, mailed on Mar. 30, 2023, 16 pages.
Non-Final Office Action received for U.S. Appl. No. 17/026,818, mailed on Nov. 25, 2020, 20 pages.
Non-Final Office Action received for U.S. Appl. No. 17/027,373, mailed on Feb. 2, 2022, 17 pages.
Non-Final Office Action received for U.S. Appl. No. 17/028,176, mailed on Aug. 25, 2021, 20 pages.
Non-Final Office Action received for U.S. Appl. No. 17/028,176, mailed on Jul. 14, 2022, 23 pages.
Non-Final Office Action received for U.S. Appl. No. 17/031,877, mailed on Mar. 2, 2022, 33 pages.
Non-Final Office Action received for U.S. Appl. No. 17/031,877, mailed on Mar. 19, 2021, 20 pages.
Non-Final Office Action received for U.S. Appl. No. 17/116,938, mailed on Aug. 1, 2022, 15 pages.
Non-Final Office Action received for U.S. Appl. No. 17/116,938, mailed on Jul. 30, 2021, 19 pages.
Non-Final Office Action received for U.S. Appl. No. 17/223,794, mailed on Jun. 16, 2021, 32 pages.
Non-Final Office Action received for U.S. Appl. No. 17/337,110, mailed on Jun. 20, 2022, 30 pages.
Non-Final Office Action received for U.S. Appl. No. 17/476,404, mailed on Feb. 8, 2022, 26 pages.
Non-Final Office Action received for U.S. Appl. No. 17/476,404, mailed on Mar. 30, 2023, 29 pages.
Non-Final Office Action received for U.S. Appl. No. 17/476,404, mailed on Sep. 14, 2022, 31 pages.
Non-Final Office Action received for U.S. Appl. No. 17/742,273, mailed on Dec. 7, 2022, 47 pages.
Non-Final Office Action received for U.S. Appl. No. 17/742,273, mailed on Sep. 13, 2023, 58 pages.
Non-Final Office Action received for U.S. Appl. No. 17/746,789, mailed on Jun. 22, 2023, 8 pages.
Non-Final Office Action received for U.S. Appl. No. 17/992,229, mailed on Jul. 13, 2023, 14 pages.
Non-Final Office Action received for U.S. Appl. No. 18/111,484, mailed on Aug. 2, 2023, 8 pages.
Non-Final Office Action received for U.S. Appl. No. 16/143,379, mailed on Mar. 14, 2019, 10 pages.
Notice of Acceptance received for Australian Patent Application No. 2017286129, mailed on Dec. 10, 2018, 3 pages.
Notice of Acceptance received for Australian Patent Application No. 2020217458, mailed on Sep. 7, 2022, 3 pages.
Notice of Acceptance received for Australian Patent Application No. 2020239711, mailed on Dec. 16, 2021, 3 pages.
Notice of Acceptance received for Australian Patent Application No. 2020257092, mailed on Aug. 27, 2021, 3 pages.
Notice of Acceptance received for Australian Patent Application No. 2021201403, mailed on Oct. 22, 2021, 3 pages.
Notice of Acceptance received for Australian Patent Application No. 2021261941, mailed on Mar. 15, 2023, 3 pages.
Notice of Acceptance received for Australian Patent Application No. 2022201532, mailed on May 22, 2023, 3 pages.
Notice of Acceptance received for Australian Patent Application No. 2022204466, mailed on Jul. 25, 2023, 3 pages.
Notice of Allowance received for Chinese Patent Application No. 201710493025.3, mailed on May 7, 2021, 6 pages.
Notice of Allowance received for Chinese Patent Application No. 201810730279.7, mailed on Nov. 5, 2020, 2 pages.
Notice of Allowance received for Chinese Patent Application No. 201811151702.4, mailed on Jul. 6, 2020, 6 pages.
Notice of Allowance received for Chinese Patent Application No. 201811152097.2, mailed on Oct. 28, 2019, 6 pages.
Notice of Allowance received for Chinese Patent Application No. 202010742019.9, mailed on Jul. 6, 2021, 7 pages.
Notice of Allowance received for Chinese Patent Application No. 202011336156.9, mailed on Jan. 6, 2022, 3 pages.
Notice of Allowance received for Chinese Patent Application No. 202011450203.2, mailed on Sep. 30, 2022, 4 pages.
Notice of Allowance received for Chinese Patent Application No. 202110248576.X, mailed on Mar. 21, 2022, 2 pages.
Notice of Allowance received for Chinese Patent Application No. 202110818370.6, mailed on Sep. 2, 2022, 7 pages.
Notice of Allowance received for Chinese Patent Application No. 202110819254.6, mailed on Dec. 27, 2022, 4 pages.
Notice of Allowance received for Chinese Patent Application No. 202210646482.2, mailed on Sep. 2, 2023, 2 pages.
Notice of Allowance received for Japanese Patent Application No. 2018-562659, mailed on Jul. 30, 2021, 4 pages.
Notice of Allowance received for Japanese Patent Application No. 2020-047952, mailed on Jun. 26, 2023, 25 pages.
Notice of Allowance received for Japanese Patent Application No. 2020-159840, mailed on Jul. 8, 2022, 4 pages.
Notice of Allowance received for Japanese Patent Application No. 2020-558885, mailed on Jul. 26, 2021, 4 pages.
Notice of Allowance received for Japanese Patent Application No. 2020-560927, mailed on May 30, 2022, 3 pages.
Notice of Allowance received for Japanese Patent Application No. 2021-026630, mailed on Jan. 7, 2022, 4 pages.
Notice of Allowance received for Japanese Patent Application No. 2022-014389, mailed on Jan. 27, 2023, 4 pages.
Notice of Allowance received for Japanese Patent Application No. 2022-125792, mailed on Jan. 27, 2023, 4 pages.
Notice of Allowance received for Korean Patent Application No. 10-2018-7034909, mailed on Sep. 30, 2019, 4 pages.
Notice of Allowance received for Korean Patent Application No. 10-2019-7038093, mailed on Aug. 10, 2020, 5 pages.
Notice of Allowance received for Korean Patent Application No. 10-2020-0123805, mailed on Jun. 19, 2022, 5 pages.
Notice of Allowance received for Korean Patent Application No. 10-2020-7031319, mailed on Apr. 6, 2021, 5 pages.
Notice of Allowance received for Korean Patent Application No. 10-2020-7031700, mailed on Apr. 21, 2021, 4 pages.
Notice of Allowance received for Korean Patent Application No. 10-2020-7032488, mailed on Jun. 16, 2021, 4 pages.
Notice of Allowance received for Korean Patent Application No. 10-2021-7021047, mailed on Dec. 6, 2021, 3 pages.
Notice of Allowance received for Korean Patent Application No. 10-2021-7022610, mailed on Oct. 13, 2021, 3 pages.
Notice of Allowance received for Korean Patent Application No. 10-2021-7029861, mailed on Jan. 4, 2023, 7 pages.
Notice of Allowance received for Korean Patent Application No. 10-2022-0091730, mailed on Oct. 4, 2022, 5 pages.
Notice of Allowance received for Korean Patent Application No. 10-2022-7014651, mailed on Aug. 18, 2022, 5 pages.
Notice of Allowance received for Korean Patent Application No. 10-2022-7014651, mailed on Nov. 25, 2022, 7 pages.
Notice of Allowance received for U.S. Appl. No. 15/427,516, mailed on Mar. 4, 2019, 7 pages.
Notice of Allowance received for U.S. Appl. No. 16/143,379, mailed on Jan. 29, 2020, 5 pages.

(56) References Cited

OTHER PUBLICATIONS

Notice of Allowance received for U.S. Appl. No. 16/143,379, mailed on Jun. 26, 2019, 5 pages.
Notice of Allowance received for U.S. Appl. No. 16/143,379, mailed on Sep. 25, 2019, 5 pages.
Notice of Allowance received for U.S. Appl. No. 16/404,605, mailed on Sep. 18, 2020, 5 pages.
Notice of Allowance received for U.S. Appl. No. 16/404,612, mailed on Jul. 13, 2020, 6 pages.
Notice of Allowance received for U.S. Appl. No. 16/404,612, mailed on Aug. 7, 2019, 9 pages.
Notice of Allowance received for U.S. Appl. No. 16/584,743, mailed on Aug. 7, 2020, 8 pages.
Notice of Allowance received for U.S. Appl. No. 16/584,743, mailed on Nov. 16, 2020, 7 pages.
Notice of Allowance received for U.S. Appl. No. 16/586,002, mailed on Jun. 9, 2020, 5 pages.
Notice of Allowance received for U.S. Appl. No. 16/817,328, mailed on Apr. 18, 2022, 8 pages.
Notice of Allowance received for U.S. Appl. No. 16/817,328, mailed on Feb. 16, 2022, 9 pages.
Notice of Allowance received for U.S. Appl. No. 17/019,845, mailed on Jun. 5, 2023, 10 pages.
Notice of Allowance received for U.S. Appl. No. 17/026,818, mailed on May 13, 2021, 10 pages.
Notice of Allowance received for U.S. Appl. No. 17/027,373, mailed on Aug. 2, 2022, 2 pages.
Notice of Allowance received for U.S. Appl. No. 17/027,373, mailed on Jun. 3, 2022, 8 pages.
Notice of Allowance received for U.S. Appl. No. 17/027,373, mailed on Oct. 3, 2022, 5 pages.
Notice of Allowance received for U.S. Appl. No. 17/028,176, mailed on Jan. 19, 2023, 9 pages.
Notice of Allowance received for U.S. Appl. No. 17/337,110, mailed on Oct. 11, 2022, 11 pages.
Notice of Allowance received for U.S. Appl. No. 17/746,789, mailed on Aug. 9, 2023, 7 pages.
Notice of Reasons for Refusal received for Japanese Patent Application No. 2020-047952, mailed on Apr. 3, 2023, 4 pages.
Office Action received for Australian Patent Application No. 2017100666, mailed on Jul. 27, 2017, 4 pages.
Office Action received for Australian Patent Application No. 2017286129, mailed on Oct. 18, 2018, 3 pages.
Office Action received for Australian Patent Application No. 2019100487, mailed on Aug. 16, 2019, 5 pages.
Office Action received for Australian Patent Application No. 2019100523, mailed on Jan. 23, 2020, 3 pages.
Office Action received for Australian Patent Application No. 2019100523, mailed on Mar. 2, 2020, 3 pages.
Office Action received for Australian Patent Application No. 2019100523, mailed on Sep. 2, 2019, 3 pages.
Office Action received for Australian Patent Application No. 2019201853, mailed on Apr. 23, 2020, 5 pages.
Office Action received for Australian Patent Application No. 2019201853, mailed on Aug. 10, 2020, 4 pages.
Office Action received for Australian Patent Application No. 2019201853, mailed on Aug. 16, 2019, 5 pages.
Office Action received for Australian Patent Application No. 2019201853, mailed on Dec. 9, 2019, 5 pages.
Office Action received for Australian Patent Application No. 2019267527, mailed on Dec. 2, 2021, 4 pages.
Office Action received for Australian Patent Application No. 2019267527, mailed on Jun. 15, 2022, 3 pages.
Office Action received for Australian Patent Application No. 2019267527, mailed on Jun. 24, 2021, 8 pages.
Office Action received for Australian Patent Application No. 2019267527, mailed on Mar. 3, 2022, 3 pages.
Office Action received for Australian Patent Application No. 2020100886, mailed on Aug. 5, 2020, 6 pages.
Office Action received for Australian Patent Application No. 2020217458, mailed on Aug. 2, 2022, 4 pages.
Office Action received for Australian Patent Application No. 2020217458, mailed on May 10, 2022, 3 pages.
Office Action received for Australian Patent Application No. 2020217458, mailed on Sep. 2, 2021, 6 pages.
Office Action received for Australian Patent Application No. 2020239711, mailed on Sep. 13, 2021, 5 pages.
Office Action received for Australian Patent Application No. 2020257092, mailed on Mar. 3, 2021, 7 pages.
Office Action received for Australian Patent Application No. 2020257092, mailed on Nov. 30, 2020, 6 pages.
Office Action received for Australian Patent Application No. 2021100721, mailed on Jun. 4, 2021, 7 pages.
Office Action received for Australian Patent Application No. 2021100721, mailed on Oct. 18, 2021, 4 pages.
Office Action received for Australian Patent Application No. 2021201403, mailed on Mar. 16, 2021, 3 pages.
Office Action received for Australian Patent Application No. 2021261941, mailed on Nov. 3, 2022, 3 pages.
Office Action received for Australian Patent Application No. 2022201532, mailed on Dec. 19, 2022, 5 pages.
Office Action received for Australian Patent Application No. 2022204466, mailed on Jun. 7, 2023, 4 pages.
Office Action received for Australian Patent Application No. 2022291522, mailed on Jul. 20, 2023, 3 pages.
Office Action received for Chinese Patent Application No. 201710493025.3, mailed on Dec. 6, 2019, 11 pages.
Office Action received for Chinese Patent Application No. 201710493025.3, mailed on Jan. 6, 2021, 17 pages.
Office Action received for Chinese Patent Application No. 201710493025.3, mailed on Jul. 10, 2020, 17 pages.
Office Action received for Chinese Patent Application No. 201710493025.3, mailed on Sep. 19, 2017, 2 pages.
Office Action received for Chinese Patent Application No. 201810730279.7, mailed on Jul. 6, 2020, 7 pages.
Office Action received for Chinese Patent Application No. 201810730279.7, mailed on Mar. 4, 2020, 14 pages.
Office Action received for Chinese Patent Application No. 201810730279.7, mailed on May 7, 2019, 15 pages.
Office Action received for Chinese Patent Application No. 201810730279.7, mailed on Nov. 5, 2019, 14 pages.
Office Action received for Chinese Patent Application No. 201811151702.4, mailed on Mar. 4, 2020, 13 pages.
Office Action received for Chinese Patent Application No. 201811151702.4, mailed on May 7, 2019, 16 pages.
Office Action received for Chinese Patent Application No. 201811151702.4, mailed on Oct. 9, 2019, 11 pages.
Office Action received for Chinese Patent Application No. 201811152097.2, mailed on May 7, 2019, 18 pages.
Office Action received for Chinese Patent Application No. 201811152726.1, mailed on Apr. 22, 2019, 15 pages.
Office Action received for Chinese Patent Application No. 201811152726.1, mailed on Apr. 28, 2021, 14 pages.
Office Action received for Chinese Patent Application No. 201811152726.1, mailed on Jan. 28, 2021, 13 pages.
Office Action received for Chinese Patent Application No. 201811152726.1, mailed on Mar. 18, 2020, 12 pages.
Office Action received for Chinese Patent Application No. 201811152726.1, mailed on Oct. 24, 2019, 14 pages.
Office Action received for Chinese Patent Application No. 201811152726.1, mailed on Oct. 29, 2020, 12 pages.
Office Action received for Chinese Patent Application No. 202010742019.9, mailed on Feb. 3, 2021, 17 pages.
Office Action received for Chinese Patent Application No. 202011336156.9, mailed on May 20, 2021, 13 pages.
Office Action received for Chinese Patent Application No. 202011450203.2, mailed on Apr. 20, 2022, 9 pages.
Office Action received for Chinese Patent Application No. 202011450203.2, mailed on Sep. 1, 2021, 12 pages.
Office Action received for Chinese Patent Application No. 202110235995.X, mailed on Mar. 22, 2022, 17 pages.

(56) References Cited

OTHER PUBLICATIONS

Office Action received for Chinese Patent Application No. 202110235995.X, mailed on Sep. 30, 2022, 13 pages.
Office Action received for Chinese Patent Application No. 202110248576.X, mailed on Sep. 15, 2021, 28 pages.
Office Action received for Chinese Patent Application No. 202110818370.6, mailed on Jun. 22, 2022, 7 pages.
Office Action received for Chinese Patent Application No. 202110818370.6, mailed on Mar. 2, 2022, 13 pages.
Office Action received for Chinese Patent Application No. 202110819254.6, mailed on May 16, 2022, 16 pages.
Office Action received for Chinese Patent Application No. 202110819254.6, mailed on Sep. 15, 2022, 13 pages.
Office Action received for Chinese Patent Application No. 202111652452.4, mailed on Aug. 29, 2022, 23 pages.
Office Action received for Chinese Patent Application No. 202111652452.4, mailed on Feb. 11, 2023, 28 pages.
Office Action received for Chinese Patent Application No. 202111652452.4, mailed on May 19, 2023, 15 pages.
Office Action received for Chinese Patent Application No. 202210646482.2, mailed on Dec. 28, 2022, 17 pages.
Office Action received for Danish Patent Application No. PA201670601, mailed on Apr. 10, 2018, 3 pages.
Office Action received for Danish Patent Application No. PA201670601, mailed on Aug. 9, 2018, 2 pages.
Office Action received for Danish Patent Application No. PA201670601, mailed on Dec. 11, 2018, 3 pages.
Office Action received for Danish Patent Application No. PA201670601, mailed on Feb. 6, 2017, 5 pages.
Office Action received for Danish Patent Application No. PA201670601, mailed on Oct. 21, 2016, 9 pages.
Office Action received for Danish Patent Application No. PA201670601, mailed on Sep. 26, 2017, 3 pages.
Office Action received for Danish Patent Application No. PA201670602, mailed on Apr. 16, 2018, 3 pages.
Office Action received for Danish Patent Application No. PA201670602, mailed on Feb. 9, 2017, 3 pages.
Office Action received for Danish Patent Application No. PA201670602, mailed on Oct. 25, 2016, 9 pages.
Office Action received for Danish Patent Application No. PA201670602, mailed on Sep. 26, 2017, 3 pages.
Office Action received for Danish Patent Application No. PA201670603, mailed on Nov. 1, 2016, 9 pages.
Office Action received for Danish Patent Application No. PA201670604, mailed on Feb. 19, 2018, 3 pages.
Office Action received for Danish Patent Application No. PA201670604, mailed on Jun. 9, 2017, 3 pages.
Office Action received for Danish Patent Application No. PA201670604, mailed on Nov. 8, 2016, 8 pages.
Office Action received for Danish Patent Application No. PA201670605, mailed on Apr. 9, 2018, 2 pages.
Office Action received for Danish Patent Application No. PA201670605, mailed on Feb. 19, 2018, 2 pages.
Office Action received for Danish Patent Application No. PA201670605, mailed on Jun. 13, 2017, 4 pages.
Office Action received for Danish Patent Application No. PA201670605, mailed on Nov. 14, 2016, 8 pages.
Office Action received for Danish Patent Application No. PA201870293, mailed on Jul. 17, 2018, 2 pages.
Office Action received for Danish Patent Application No. PA201870293, mailed on Jun. 19, 2018, 8 pages.
Office Action received for Danish Patent Application No. PA201870435, mailed on Feb. 6, 2020, 3 pages.
Office Action received for Danish Patent Application No. PA201870435, mailed on May 2, 2019, 3 pages.
Office Action received for Danish Patent Application No. PA201870435, mailed on May 25, 2020, 3 pages.
Office Action received for Danish Patent Application No. PA202070617, mailed on Sep. 24, 2021, 4 pages.
Office Action received for Danish Patent Application No. PA202070618, mailed on Oct. 15, 2021, 4 pages.
Office Action received for Danish Patent Application No. PA202070627, mailed on Oct. 19, 2021, 3 pages.
Office Action received for European Patent Application No. 17813777.4, mailed on Jan. 3, 2020, 5 pages.
Office Action received for European Patent Application No. 19182037.2, mailed on Jun. 16, 2020, 6 pages.
Office Action received for European Patent Application No. 19728558.8, mailed on Jun. 21, 2021, 9 pages.
Office Action received for European Patent Application No. 20187610.9, mailed on May 21, 2021, 7 pages.
Office Action received for European Patent Application No. 20719301.2, mailed on Feb. 21, 2022, 9 pages.
Office Action received for European Patent Application No. 20719301.2, mailed on Jan. 24, 2023, 9 pages.
Office Action received for European Patent Application No. 20719301.2, mailed on Jan. 28, 2021, 15 pages.
Office Action received for European Patent Application No. 20746426.4, mailed on Aug. 17, 2023, 5 pages.
Office Action received for European Patent Application No. 21160991.2, mailed on Mar. 24, 2022, 11 pages.
Office Action received for European Patent Application No. 21161005.0, mailed on Apr. 22, 2022, 11 pages.
Office Action received for European Patent Application No. 21728781.2, mailed on Mar. 1, 2023, 13 pages.
Office Action received for Indian Patent Application No. 202014041529, mailed on Dec. 6, 2021, 6 pages.
Office Action received for Indian Patent Application No. 202118046028, mailed on Apr. 6, 2022, 6 pages.
Office Action received for Indian Patent Application No. 202215025360, mailed on Mar. 29, 2023, 6 pages.
Office Action received for Indian Patent Application No. 202215025361, mailed on Mar. 29, 2023, 6 pages.
Office Action received for Indian Patent Application No. 202215025363, mailed on Mar. 29, 2023, 6 pages.
Office Action received for Indian Patent Application No. 202215025364, mailed on Mar. 29, 2023, 6 pages.
Office Action received for Japanese Patent Application No. 2018-562659, mailed on Dec. 6, 2019, 7 pages.
Office Action received for Japanese Patent Application No. 2018-562659, mailed on Jul. 26, 2019, 9 pages.
Office Action received for Japanese Patent Application No. 2018-562659, mailed on Mar. 12, 2021, 79 pages.
Office Action received for Japanese Patent Application No. 2018-562659, mailed on May 28, 2020, 5 pages.
Office Action received for Japanese Patent Application No. 2020-047952, mailed on Aug. 27, 2021, 13 pages.
Office Action received for Japanese Patent Application No. 2020-047952, mailed on Feb. 8, 2021, 6 pages.
Office Action received for Japanese Patent Application No. 2020-047952, mailed on Jul. 1, 2022, 8 pages.
Office Action received for Japanese Patent Application No. 2020-159840, mailed on Dec. 10, 2021, 13 pages.
Office Action received for Japanese Patent Application No. 2020-159840, mailed on Mar. 28, 2022, 6 pages.
Office Action received for Japanese Patent Application No. 2020-560927, mailed on Dec. 1, 2021, 3 pages.
Office Action received for Japanese Patent Application No. 2020-560927, mailed on Jun. 10, 2021, 5 pages.
Office Action received for Japanese Patent Application No. 2021-026630, mailed on Aug. 20, 2021, 7 pages.
Office Action received for Japanese Patent Application No. 2021-051415, mailed on Jul. 19, 2021, 4 pages.
Office Action received for Japanese Patent Application No. 2022-016138, mailed on Apr. 24, 2023, 9 pages.
Office Action received for Korean Patent Application No. 10-2019-7038093, mailed on Feb. 13, 2020, 11 pages.
Office Action received for Korean Patent Application No. 10-2020-7031319, mailed on Dec. 8, 2020, 14 pages.
Office Action received for Korean Patent Application No. 10-2020-7031700, mailed on Dec. 15, 2020, 6 pages.

(56) References Cited

OTHER PUBLICATIONS

Office Action received for Korean Patent Application No. 10-2020-7032488, mailed on Feb. 9, 2021, 11 pages.
Office Action received for Korean Patent Application No. 10-2021-7021047, mailed on Aug. 13, 2021, 5 pages.
Office Action received for Korean Patent Application No. 10-2021-7029861, mailed on Jan. 25, 2022, 11 pages.
Office Action received for Korean Patent Application No. 10-2021-7029861, mailed on Nov. 1, 2022, 7 pages.
Office Action received for Korean Patent Application No. 10-2022-7001332, mailed on Apr. 20, 2023, 8 pages.
Office Action received for Korean Patent Application No. 10-2022-7001521, mailed on Dec. 26, 2022, 13 pages.
Office Action received for Korean Patent Application No. 10-2022-7001521, mailed on Jun. 21, 2023, 10 pages.
Office Action received for Korean Patent Application No. 10-2022-7040554, mailed on Jun. 20, 2023, 5 pages.
Office Action received for Korean Patent Application No. 10-2022-7044372, mailed on Aug. 21, 2023, 9 pages.
Result of Consultation received for European Patent Application No. 19182037.2, mailed on Mar. 22, 2021, 5 pages.
Result of Consultation received for European Patent Application No. 19728558.8, mailed on Jun. 28, 2022, 4 pages.
Result of Consultation received for European Patent Application No. 20187610.9, mailed on Jun. 1, 2022, 3 pages.
Ring, "Using the Motion Detection Control to Completely Disable Recording", Online available at: https://support.ring.com/hc/en-us/articles/360021797252-Using-the-Motion-Detection-Control-to-Completely-Disable-Recording, Retrieved on May 4, 2021, 4 pages.
Rossignol Joe, "iOS 10 Concept Simplifies Lock Screen With Collapsed Notifications", Available online at : https://www.macrumors.com/2016/06/16/ios-10-collapsed-notifications-concept/, Jun. 16, 2016, 10 pages.
Search Report and Opinion received for Danish Patent Application No. PA201870435, mailed on Oct. 26, 2018, 9 pages.
Search Report and Opinion received for Danish Patent Application No. PA202070617, mailed on Dec. 23, 2020, 8 pages.
Search Report and Opinion received for Danish Patent Application No. PA202070618, mailed on Dec. 7, 2020, 9 pages.
Search Report and Opinion received for Danish Patent Application No. PA202070627, mailed on Jan. 26, 2021, 9 pages.
Search Report and Opinion received for Danish Patent Application No. PA202270086, mailed on Apr. 7, 2022, 11 pages.
Senicar et al., "User-Centred Design and Development of an Intelligent Light Switch for Sensor Systems", Technical Gazette, vol. 26, No. 2, available online at: https://hrcak.srce.hr/file/320403, 2019, pp. 339-345.
SolarWinds Network Configuration Manager Administrator Guide, Available online at:- https://web.archive.org/web/20141031133207/http://www.solarwinds.com/documentation/orionNCM/docs/OrionNCMAdministratorGuide.pdf, Oct. 31, 2014, 466 pages.
Spectrum, "Using the Picture-in-Picture (PIP) Feature _ Spectrum Support", Online available at:-https://www.spectrum.net/support/tv/dvr-picture-picture/, 2 pages.
Steve Does, "Arlo's New App with new Feature + (Giveaway)", Available online at: https://www.youtube.com/watch?v=jiyWEYCH1BA, Sep. 5, 2019, 5 pages.
Summons to Attend Oral Proceedings received for European Patent Application No. 17813777.4, mailed on Jun. 18, 2020, 8 pages.
Summons to Attend Oral Proceedings received for European Patent Application No. 19182037.2, mailed on Nov. 24, 2020, 12 pages.
Summons to Attend Oral Proceedings received for European Patent Application No. 19728558.8, mailed on Jan. 18, 2022, 9 pages.
Summons to Attend Oral Proceedings received for European Patent Application No. 20187610.9, mailed on Dec. 16, 2021, 12 pages.
Summons to Attend Oral Proceedings received for European Patent Application No. 20187610.9, mailed on Jan. 27, 2022, 2 pages.
Summons to Attend Oral Proceedings received for European Patent Application No. 21160991.2, mailed on Oct. 19, 2022, 10 pages.
Summons to Attend Oral Proceedings received for European Patent Application No. 21161005.0, mailed on Dec. 13, 2022, 9 pages.
Supplemental Notice of Allowance received for U.S. Appl. No. 16/584,743, mailed on Nov. 25, 2020, 2 pages.
Decision to Grant received for European Patent Application No. 21728781.2, mailed on Feb. 8, 2024, 3 pages.
Extended European Search Report received for European Patent Application No. 23203433.0, mailed on Feb. 7, 2024, 7 pages.
Non-Final Office Action received for U.S. Appl. No. 17/992,229, mailed on Feb. 15, 2024, 17 pages.
Notice of Acceptance received for Australian Patent Application No. 2022291522, mailed on Jan. 31, 2024, 3 pages.
Record of Oral Hearing received for U.S. Appl. No. 17/031,877, mailed on Feb. 4, 2024, 14 pages.
Decision to Grant received for Japanese Patent Application No. 2022-104306, mailed on Jan. 4, 2024, 3 pages (1 page of English Translation and 2 pages of Official Copy).
Intention to Grant received for European Patent Application No. 20746426.4, mailed on Jan. 5, 2024, 9 pages.
Office Action received for Australian Patent Application No. 2023204396, mailed on Jan. 8, 2024, 5 pages.
Office Action received for Chinese Patent Application No. 202210463449.6, mailed on Dec. 19, 2023, 11 pages (6 pages of English Translation and 5 pages of Official Copy).
Office Action received for Korean Patent Application No. 10-2022-7001521, mailed on Dec. 19, 2023, 7 pages (3 pages of English Translation and 4 pages of Official Copy).
Office Action received for Japanese Patent Application No. 2023-028786, mailed on Aug. 23, 2024, 10 pages (5 pages of English Translation and 5 pages of Official Copy).
Applicant-Initiated Interview Summary received for U.S. Appl. No. 17/992,229, mailed on Nov. 30, 2023, 2 pages.
Intention to Grant received for European Patent Application No. 21728781.2, mailed on Dec. 12, 2023, 9 pages.
International Preliminary Report on Patentability received for PCT Patent Application No. PCT/US2022/029282, mailed on Nov. 30, 2023, 17 pages.
International Search Report and Written Opinion received for PCT Patent Application No. PCT/US2023/024279, mailed on Nov. 17, 2023, 20 pages.
Invitation to Pay Additional Fees and Partial International Search Report received for PCT Patent Application No. PCT/US2023/024279, mailed on Sep. 26, 2023, 12 pages.
Office Action received for Chinese Patent Application No. 202110817799.3, mailed on Oct. 26, 2023, 22 pages (13 pages of English Translation and 9 pages of Official Copy).
Office Action received for Japanese Patent Application No. 2022-155232, mailed on Dec. 15, 2023, 9 pages (4 pages of English Translation and 5 pages of Official Copy).
Office Action received for Korean Patent Application No. 10-2023-7011715, mailed on Dec. 20, 2023, 9 pages (4 pages of English Translation and 5 pages of Official Copy).
Applicant-Initiated Interview Summary received for U.S. Appl. No. 18/204,888, mailed on Aug. 5, 2024, 4 pages.
Corrected Notice of Allowance received for U.S. Appl. No. 18/235,291, mailed on Aug. 7, 2024, 2 pages.
Decision to Refuse received for Japanese Patent Application No. 2023-022576, mailed on Jul. 26, 2024, 6 pages (3 pages of English Translation and 3 pages of Official Copy).
Non-Final Office Action received for U.S. Appl. No. 18/230,107, mailed on Aug. 7, 2024, 31 pages.
Notice of Allowance received for Korean Patent Application No. 10-2022-7044372, mailed on Jul. 30, 2024, 7 pages (2 pages of English Translation and 5 pages of Official Copy).
Notice of Allowance received for Korean Patent Application No. 10-2023-7011715, mailed on Jul. 25, 2024, 7 pages (2 pages of English Translation and 5 pages of Official Copy).
Extended European Search Report received for European Patent Application No. 24159380.5, mailed on Jun. 4, 2024, 9 pages.
Notice of Acceptance received for Australian Patent Application No. 2023203357, mailed on May 16, 2024, 3 pages.

(56) References Cited

OTHER PUBLICATIONS

Notice of Allowance received for Korean Patent Application No. 10-2024-7001084, mailed on May 22, 2024, 7 pages (2 pages of English Translation and 5 pages of Official Copy).
Office Action received for European Patent Application No. 21736104.7, mailed on May 22, 2024, 11 pages.
Photo Supreme, "Quick Start Manual", Retrieved from the Internet: URL: https://manualsu.idimager.com/version4/QuickStart-PhotoSupreme.pdf, Dec. 31, 2018, pp. 1-11.
Record of Oral Hearing received for U.S. Appl. No. 17/116,938, mailed on May 29, 2024, 13 pages.
Extended European Search Report received for European Patent Application No. 23200934.0, mailed on Apr. 19, 2024, 11 pages.
Notice of Acceptance received for Australian Patent Application No. 2023204396, mailed on Apr. 15, 2024, 3 pages.
Applicant-Initiated Interview Summary received for U.S. Appl. No. 16/830,838. mailed on Jun. 17, 2024, 6 pages.
Applicant-Initiated Interview Summary received for U.S. Appl. No. 17/970,417, mailed on Jun. 26, 2024, 2 pages.
Decision on Appeal received for U.S. Appl. No. 17/116,938, mailed on Jun. 14, 2024, 12 pages.
Non-Final Office Action received for U.S. Appl. No. 17/031,877, mailed on Jun. 20, 2024, 47 pages.
Notice of Allowance received for Korean Patent Application No. 10-2023-0001668, mailed on May 22, 2024, 6 pages (2 pages of English Translation and 4 pages of Official Copy).
Applicant-Initiated Interview Summary received for U.S. Appl. No. 16/830,838, mailed on Mar. 11, 2024, 2 pages.
Applicant-Initiated Interview Summary received for U.S. Appl. No. 17/992,229, mailed on Mar. 11, 2024, 2 pages.
International Search Report and Written Opinion received for PCT Patent Application No. PCT/US2023/031749, mailed on Dec. 6, 2023, 23 pages.
Notice of Allowance received for Chinese Patent Application No. 202210463449.6, mailed on Mar. 9, 2024, 2 pages (1 page of English Translation and 1 page of Official Copy).
Office Action received for Chinese Patent Application No. 202110817799.3, mailed on Feb. 22, 2024, 24 pages (15 pages of English Translation and 9 pages of Official Copy).
Notice of Allowance received for Japanese Patent Application No. 2022-155232, mailed on Feb. 26, 2024, 4 pages (1 page of English Translation and 3 pages of Official Copy).
Notice of Allowance received for U.S. Appl. No. 18/375,457, mailed on Feb. 23, 2024, 16 pages.
Office Action received for Australian Patent Application No. 2023203357, mailed on Feb. 14, 2024, 3 pages.
Office Action received for Japanese Patent Application No. 2023-022576, mailed on Feb. 26, 2024, 10 pages (5 pages of English Translation and 5 pages of Official Copy).
Office Action received for Korean Patent Application No. 10-2022-7044372, mailed on Feb. 13, 2024, 10 pages (4 pages of English Translation and 6 pages of Official Copy).
Extended European Search Report received for European Patent Application No. 23203414.0, mailed on Jan. 26, 2024, 10 pages.
Non-Final Office Action received for U.S. Appl. No. 16/830,838, mailed on Jan. 22, 2024, 17 pages.
Office Action received for Australian Patent Application No. 2022291522, mailed on Jan. 19, 2024, 2 pages.
Decision on Appeal received for U.S. Appl. No. 17/031,877, mailed on Mar. 27, 2024, 24 pages.
Non-Final Office Action received for U.S. Appl. No. 17/970,417, mailed on Apr. 10, 2024, 16 pages.
Notice of Allowance received for Korean Patent Application No. 10-2022-7001521, mailed on Mar. 22, 2024, 7 pages (2 pages of English Translation and 5 pages of Official Copy).
Office Action received for Japanese Patent Application No. 2023-028786, mailed on Mar. 22, 2024, 10 pages (5 pages of English Translation and 5 pages of Official Copy).
Applicant-Initiated Interview Summary received for U.S. Appl. No. 18/230,107, mailed on Sep. 20, 2024, 5 pages.
Final Office Action received for U.S. Appl. No. 17/970,417, mailed on Sep. 18, 2024, 24 pages.
Notice of Acceptance received for Australian Patent Application No. 2023251497, mailed on Sep. 19, 2024, 3 pages.
Notice of Allowance received for U.S. Appl. No. 17/116,938, mailed on Sep. 18, 2024, 5 pages.
Office Action received for Chinese Patent Application No. 202110817799.3, mailed on Sep. 4, 2024, 23 pages (15 pages of English Translation and 8 pages of Official Copy).
Office Action received for Chinese Patent Application No. 202410229610.2, mailed on Sep. 3, 2024, 14 pages (7 pages of English Translation and 7 pages of Official Copy).
Adobe Creative Cloud, "Use facial recognition to organize your photos | Adobe Creative Cloud", XP093214604, Available online at: https://www.youtube.com/watch?app=desktop&v=iTDV8nn611A, Jun. 30, 2016, 2 pages.
Applicant-Initiated Interview Summary received for U.S. Appl. No. 17/970,417, mailed on Nov. 4, 2024, 2 pages.
Corrected Notice of Allowance received for U.S. Appl. No. 17/992,229, mailed on Oct. 31, 2024, 3 pages.
Decision to Grant received for European Patent Application No. 20719301.2, mailed on Nov. 7, 2024, 3 pages.
Final Office Action received for U.S. Appl. No. 17/031,877, mailed on Oct. 30, 2024, 49 pages.
Notice of Allowance received for Chinese Patent Application No. 202311560430.4, mailed on Jun. 14, 2024, 4 pages (1 page of English Translation and 3 pages of Official Copy).
Notice of Allowance received for U.S. Appl. No. 17/992,229, mailed on Oct. 22, 2024, 9 pages.
Office Action received for Chinese Patent Application No. 202080032669.2, mailed on Sep. 20, 2024, 9 pages (4 pages of English Translation and 5 pages of Official Copy).
Office Action received for European Patent Application No. 21736104.7, mailed on Oct. 21, 2024, 7 pages.
Office Action received for European Patent Application No. 22196865.4, mailed on Oct. 18, 2024, 6 pages.
Office Action received for Korean Patent Application No. 10-2024-7028393, mailed on Sep. 24, 2024, 6 pages (2 pages of English Translation and 4 pages of Official Copy).
Shoe Laura, "How to Use Face Detection and Tagging in Adobe Lightroom CC & 6", XP093214657, Available online at: https://www.youtube.com/watch?v=i4Dm3I71UpU, Apr. 21, 2015, 2 pages.
Advisory Action received for U.S. Appl. No. 17/970,417, mailed on Dec. 12, 2024, 7 pages.
Advisory Action received for U.S. Appl. No. 18/204,888, mailed on Dec. 13, 2024, 3 pages.
Applicant-Initiated Interview Summary received for U.S. Appl. No. 18/204,888, mailed on Nov. 27, 2024, 4 pages.
Applicant-Initiated Interview Summary received for U.S. Appl. No. 18/230,107, mailed on Jan. 21, 2025, 5 pages.
Extended European Search Report received for European Patent Application No. 24208135.4, mailed on Jan. 21, 2025, 13 pages.
Final Office Action received for U.S. Appl. No. 18/204,888, mailed on Nov. 18, 2024, 21 pages.
Final Office Action received for U.S. Appl. No. 18/230,107, mailed on Dec. 2, 2024, 33 pages.
International Preliminary Report on Patentability received for PCT Patent Application No. PCT/US2023/024279, mailed on Dec. 12, 2024, 15 pages.
Notice of Allowance received for Chinese Patent Application No. 202080032669.2, mailed on Nov. 11, 2024, 2 pages (1 page of English Translation and 1 page of Official Copy).
Notice of Allowance received for Chinese Patent Application No. 202110817799.3, mailed on Dec. 1, 2024, 3 pages (2 pages of English Translation and 1 page of Official Copy).
Notice of Allowance received for Japanese Patent Application No. 2023-022576, mailed on Dec. 24, 2024, 4 pages (1 page of English Translation and 3 pages of Official Copy).
Notice of Allowance received for Japanese Patent Application No. 2023-028786, mailed on Dec. 2, 2024, 4 pages (1 page of English Translation and 3 pages of Official Copy).

(56) References Cited

OTHER PUBLICATIONS

Notice of Allowance received for Korean Patent Application No. 10-2024-0112016, mailed on Dec. 2, 2024, 6 pages (2 pages of English Translation and 4 pages of Official Copy).
Notice of Allowance received for Korean Patent Application No. 10-2024-7028393, mailed on Nov. 29, 2024, 7 pages (2 pages of English Translation and 5 pages of Official Copy).
Notice of Allowance received for U.S. Appl. No. 17/116,938, mailed on Jan. 30, 2025, 5 pages.
Notice of Allowance received for U.S. Appl. No. 17/970,417, mailed on Feb. 5, 2025, 6 pages.
Notice of Allowance received for U.S. Appl. No. 18/627,363, mailed on Dec. 20, 2024, 14 pages.
Office Action received for Chinese Patent Application No. 202410229610.2, mailed on Dec. 2, 2024, 14 pages (8 pages of English Translation and 6 pages of Official Copy).
Office Action received for European Patent Application No. 23200934.0, mailed on Jan. 28, 2025, 8 pages,.
Office Action received for Japanese Patent Application No. 2024-015643, mailed on Jan. 28, 2025, 3 pages (1 page of English Translation and 2 pages of Official Copy).
Office Action received for Chinese Patent Application No. 202410229610.2, mailed on Feb. 27, 2025, 11 pages (7 pages of English Translation and 4 pages of Official Copy).
Office Action received for European Patent Application No. 22191264.5, mailed on Apr. 14, 2025, 6 pages.
Applicant-Initiated Interview Summary received for U.S. Appl. No. 16/830,838, mailed Feb. 19, 2025, 3 pages.
Corrected Notice of Allowance received for U.S. Appl. No. 16/830,838, mailed on Feb. 25, 2025, 2 pages.
Corrected Notice of Allowance received for U.S. Appl. No. 17/970,417, mailed on Feb. 20, 2025, 2 pages.
Intention to Grant received for European Patent Application No. 21736104.7, mailed on Feb. 24, 2025, 8 pages.
Notice of Allowance received for U.S. Appl. No. 18/230,107, mailed on Feb. 20, 2025, 28 pages.
Office Action received for European Patent Application No. 23203433.0, mailed on Mar. 5, 2025, 4 pages.
Office Action received for European Patent Application No. 24165156.1, mailed on Mar. 5, 2025, 6 pages.
Office Action received for Japanese Patent Application No. 2024-047052, mailed on Mar. 10, 2025, 6 pages (3 pages of English Translation and 3 pages of Official Copy).
Decision to Grant received for Japanese Patent Application No. 2024-015643, mailed on Mar. 25, 2025, 3 pages (1 page of English Translation and 2 pages of Official Copy).
International Preliminary Report on Patentability received for PCT Patent Application No. PCT/US2023/031749, mailed on Mar. 13, 2025, 19 pages.
Notice of Allowance received for U.S. Appl. No. 18/204,888, mailed on Mar. 18, 2025, 8 pages.
Corrected Notice of Allowance received for U.S. Appl. No. 17/116,938, mailed on Feb. 18, 2025, 2 pages.
Notice of Allowance received for U.S. Appl. No. 16/830,838, mailed on Feb. 12, 2025, 9 pages.
Office Action received for European Patent Application No. 24159380.5, mailed on Jan. 31, 2025, 7 pages.
Jahromi et al., "A Multi-Purpose Scenario-based Simulator for Smart House Environments", Online available at: https://arxiv.org/pdf/1105.2902 International Journal of Computer Science and Information Security, vol. 9, No. 1, Jan. 2011, pp. 13-18.
Notice of Allowance received for Japanese Patent Application No. 2024-047052, mailed on May 9, 2025, 4 pages (1 page of English Translation and 3 pages of Official Copy).
Office Action received for Australian Patent Application No. 2024203239, mailed on May 7, 2025, 6 pages.
Rajabzadeh et al., "A Mobile Application for Smart House Remote Control System", Online available at: https://arxiv.org/pdf/1009.5557 World Academy of Science, Engineering and Technology 62, 2010, pp. 80-86.
Supplemental Notice of Allowance received for U.S. Appl. No. 18/230,107, mailed on May 14, 2025, 3 pages.
Decision to Grant received for European Patent Application No. 21736104.7, mailed on Jun. 26, 2025, 4 pages.

* cited by examiner

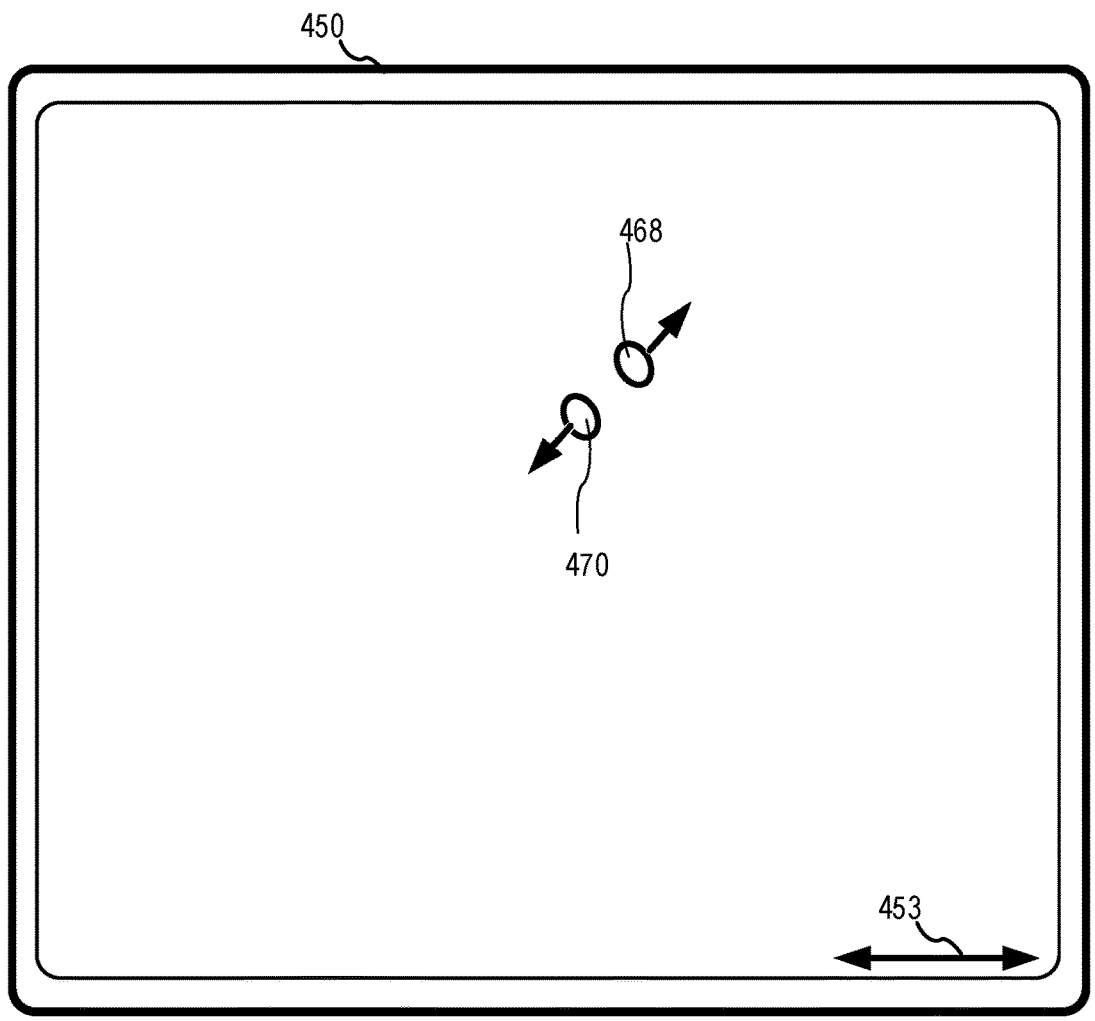
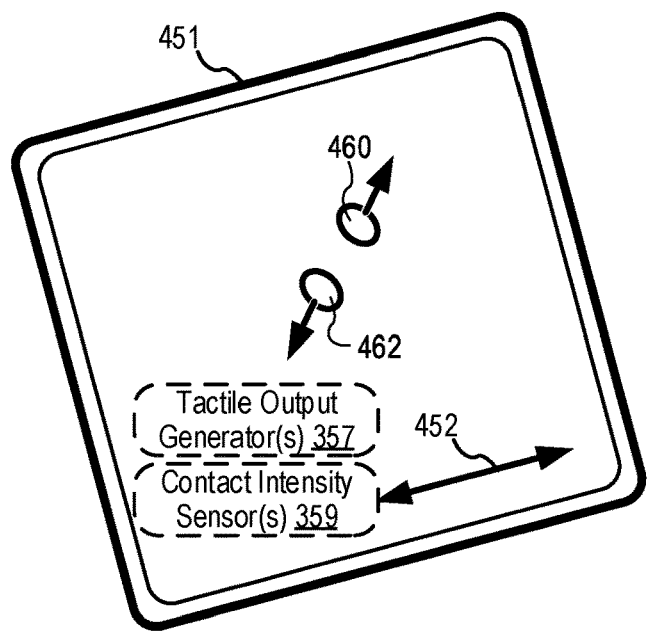
FIG. 4B

700 ⇘

702
While displaying, via the display generation component, a camera user interface, concurrently display, via the display generation component:

704
A first image captured via a first camera that is in communication with the computer system.

706
A plurality of event indicators.

708
While concurrently displaying the first image captured via the first camera and the plurality of event indicators, detect, via the rotatable input mechanism, a first user input.

710
In response to detecting the first user input via the rotatable input mechanism, replace display of the first image captured via the first camera with display of a second image captured via the first camera, where the second image of the first camera corresponds to a first event indicator of the plurality of event indicators, and where the second image captured via the first camera corresponds to one or more images captured via the first camera at a first time prior to a current time.

802
While displaying, via the display generation component, a camera user interface of a first application, where the camera user interface includes an image captured via a camera, detect, via the one or more input devices, a first user input corresponding to the image captured via the camera.

804
In response to detecting the first user input:

806
In accordance with a determination that the image captured via the camera satisfies a first set of criteria, where the first set of criteria includes a criterion that is met when the image captured via the camera includes a first aspect ratio, display, via the display generation component, a first portion of the image captured via the camera in a full screen mode, where the first portion of the image is less than the entire image captured via the camera.

808
In accordance with a determination that the image captured via the camera does not satisfy the first set of criteria, display, via the display generation component, the entire image captured via the camera in the full screen mode.

FIG. 8

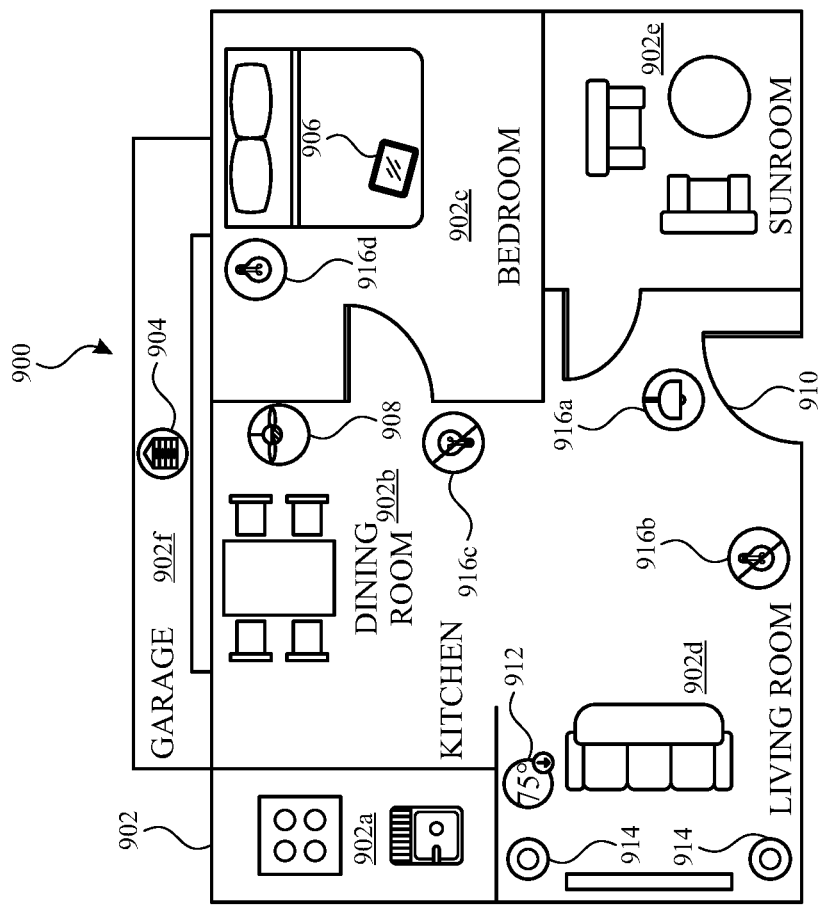
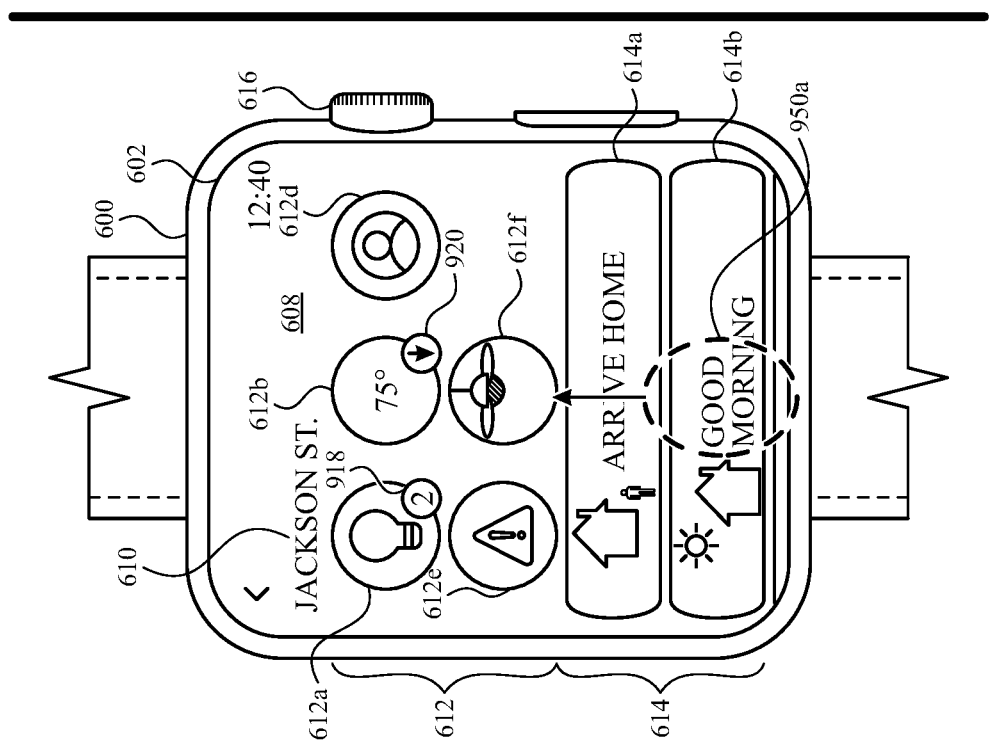
FIG. 9A

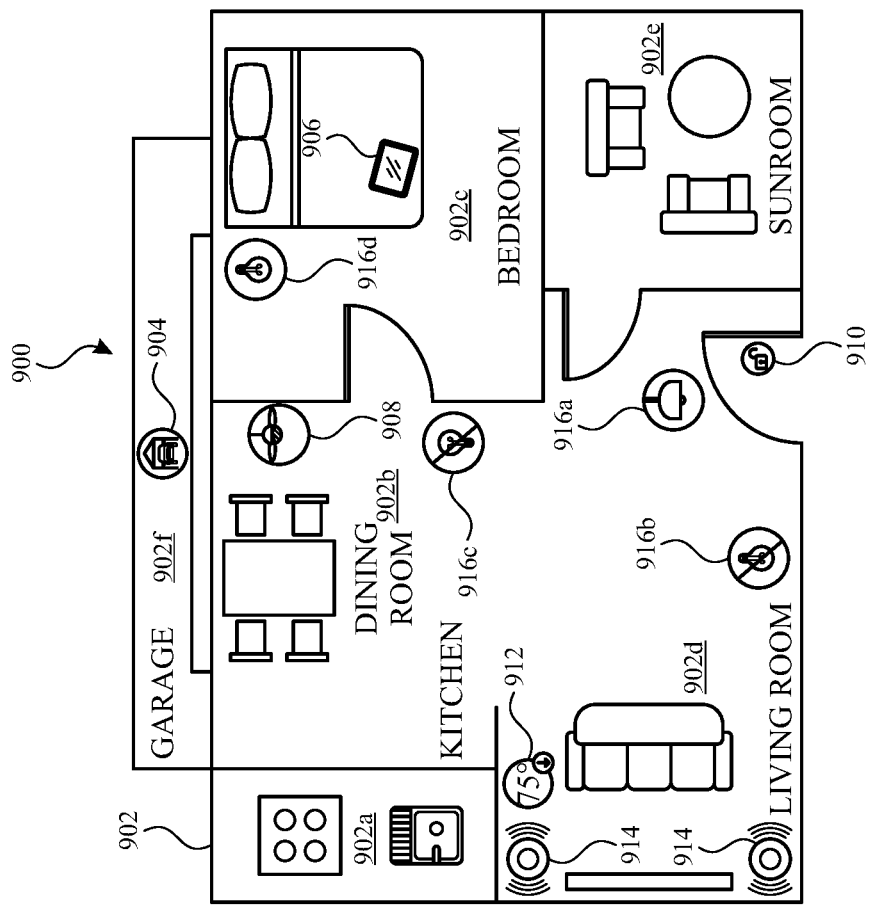
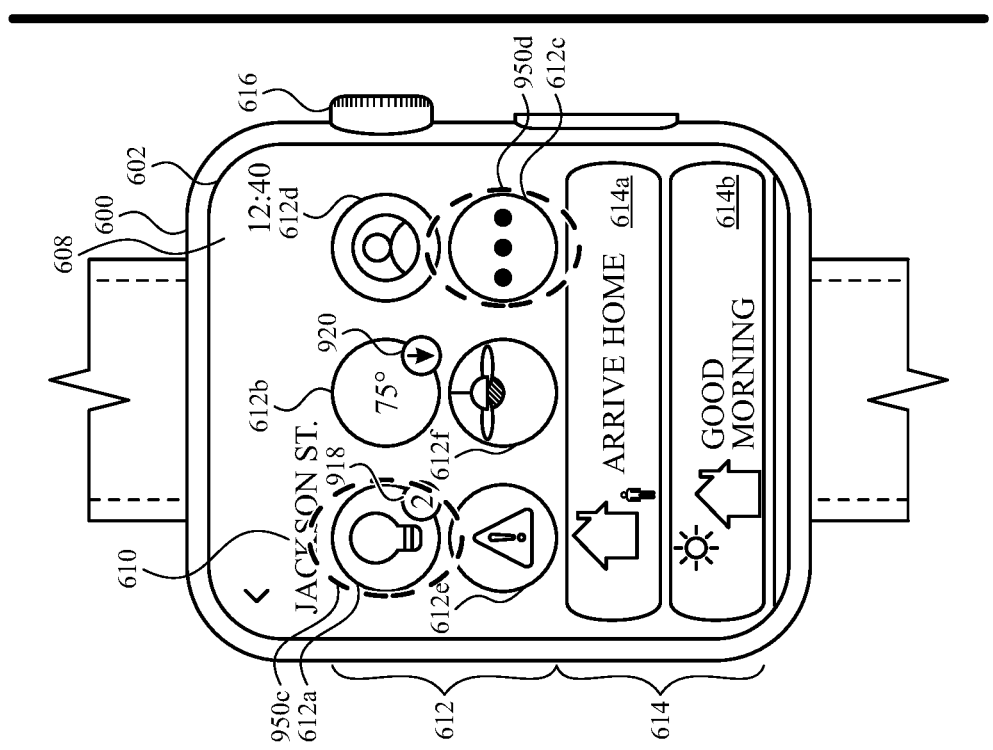
FIG. 9C

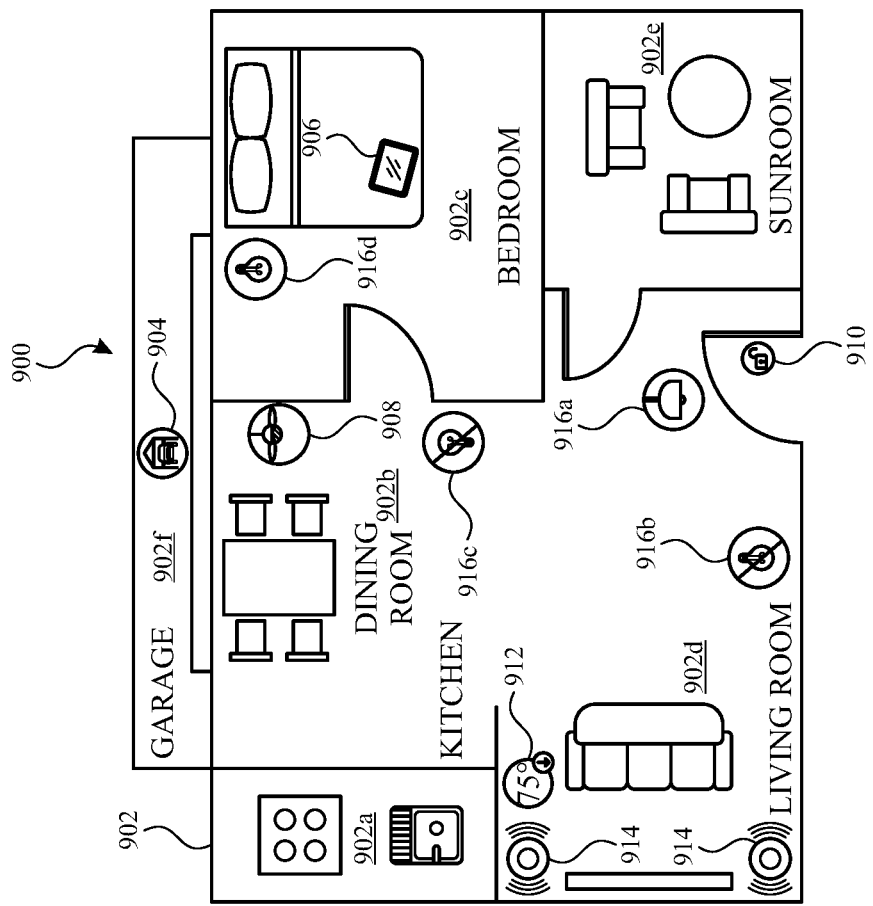
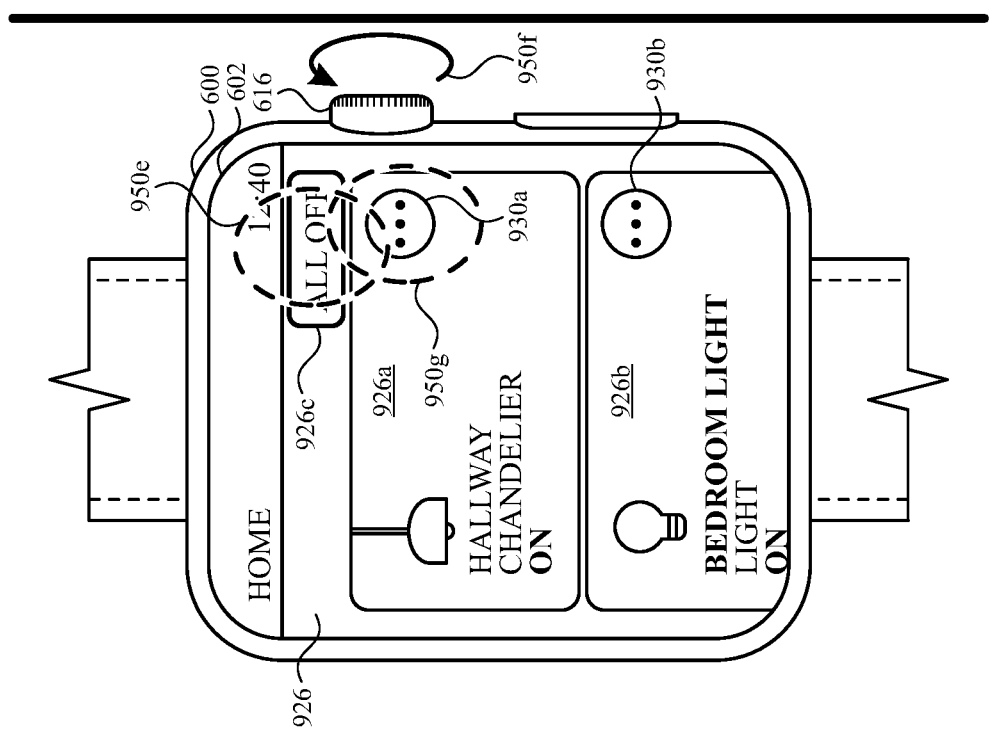
FIG. 9D

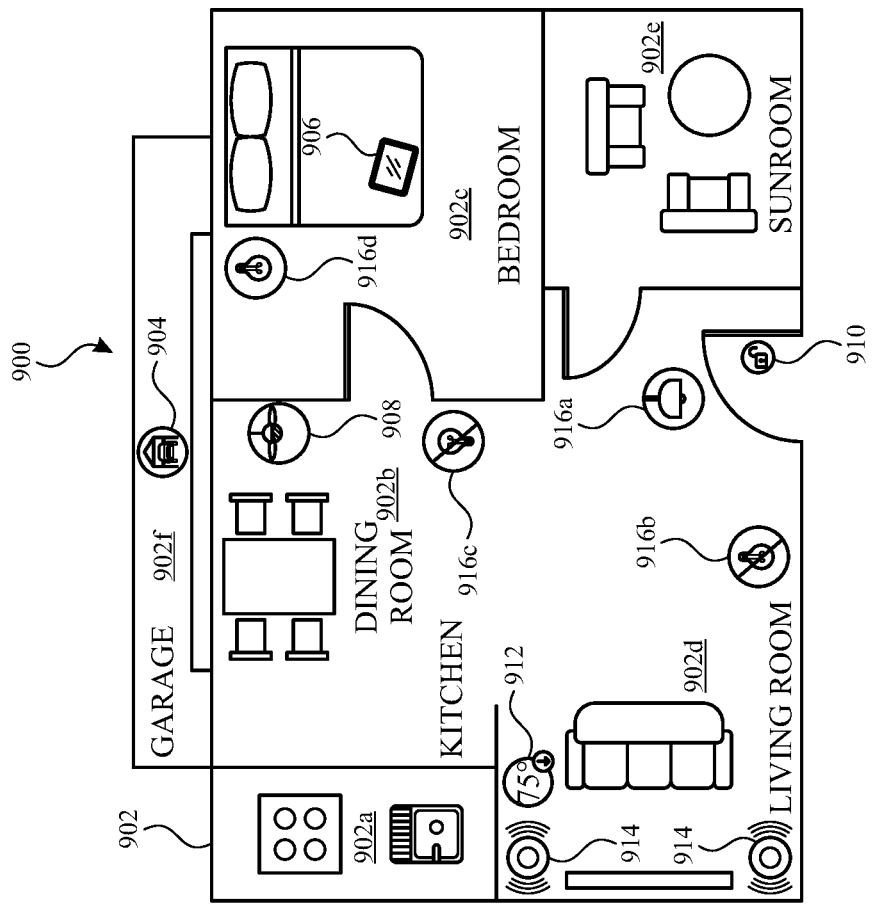
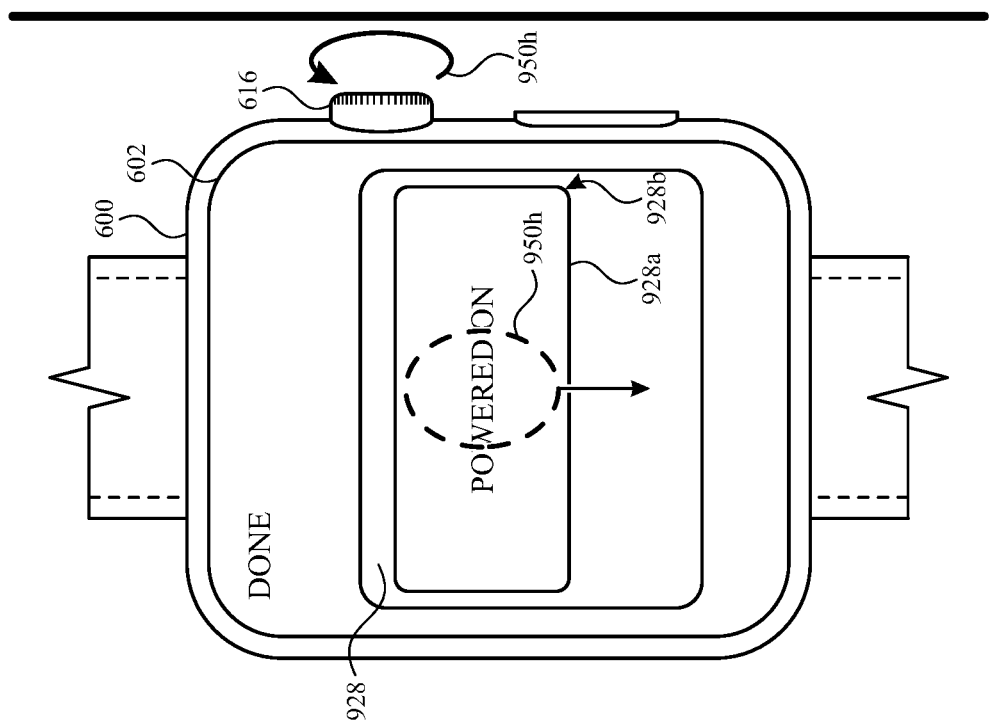
FIG. 9E

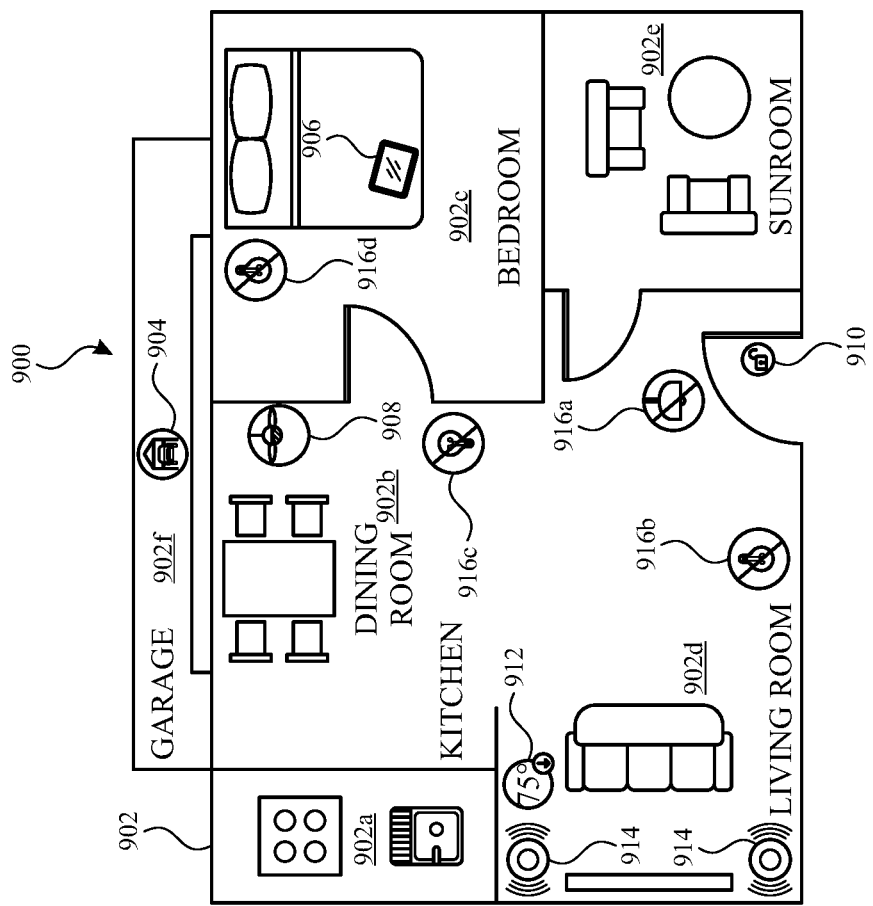
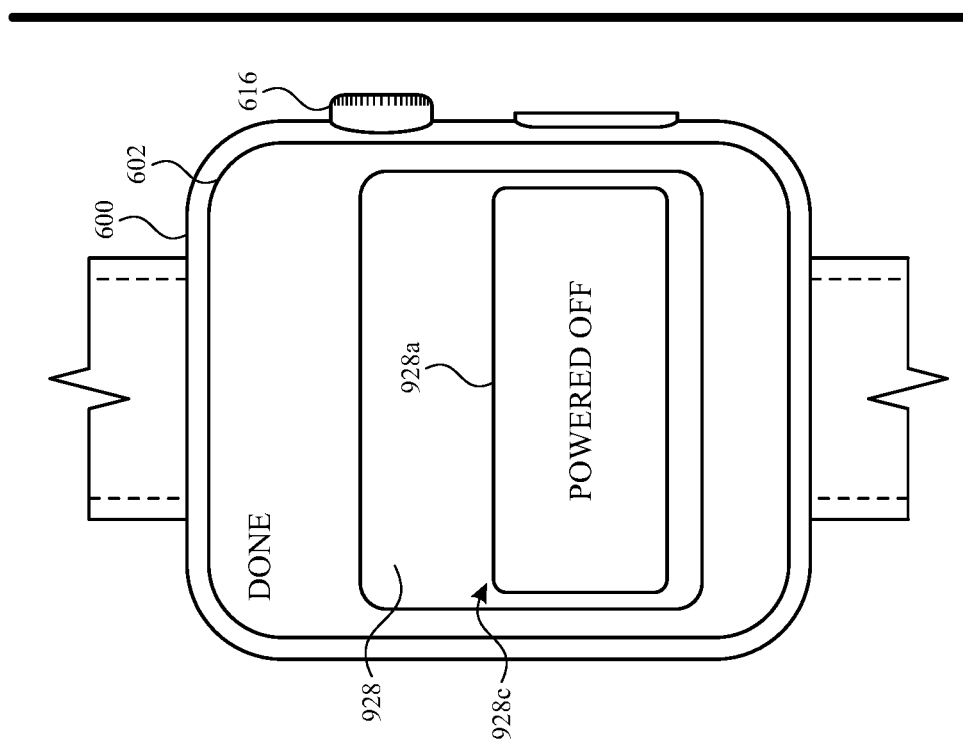
FIG. 9F

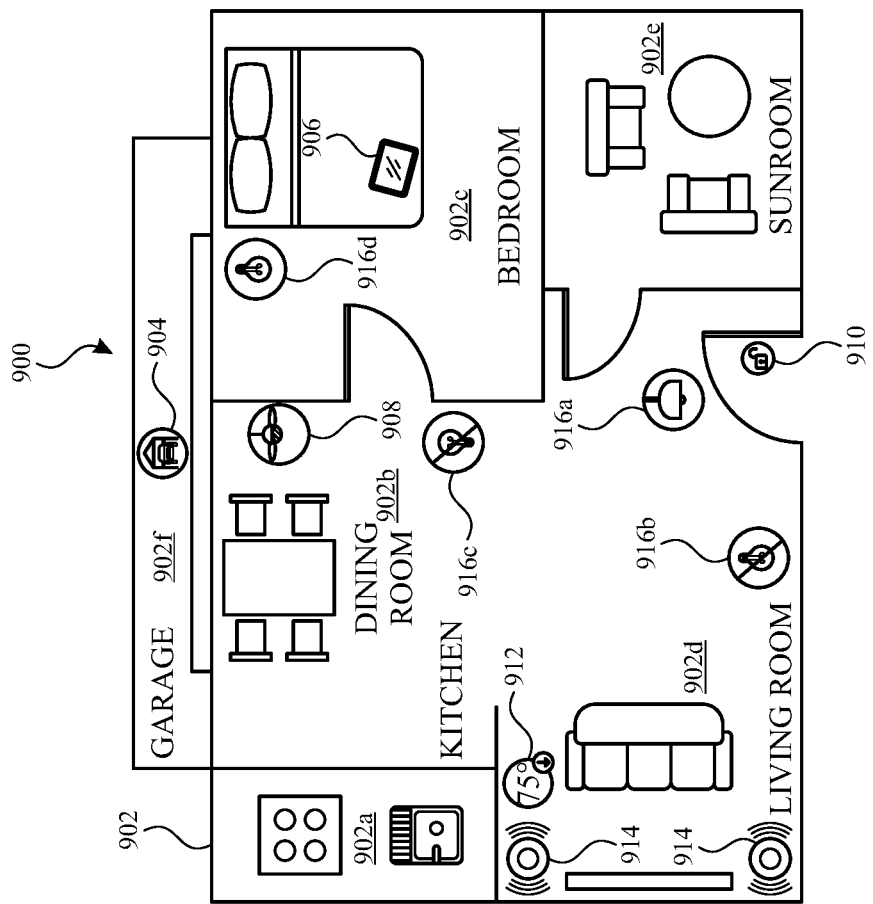
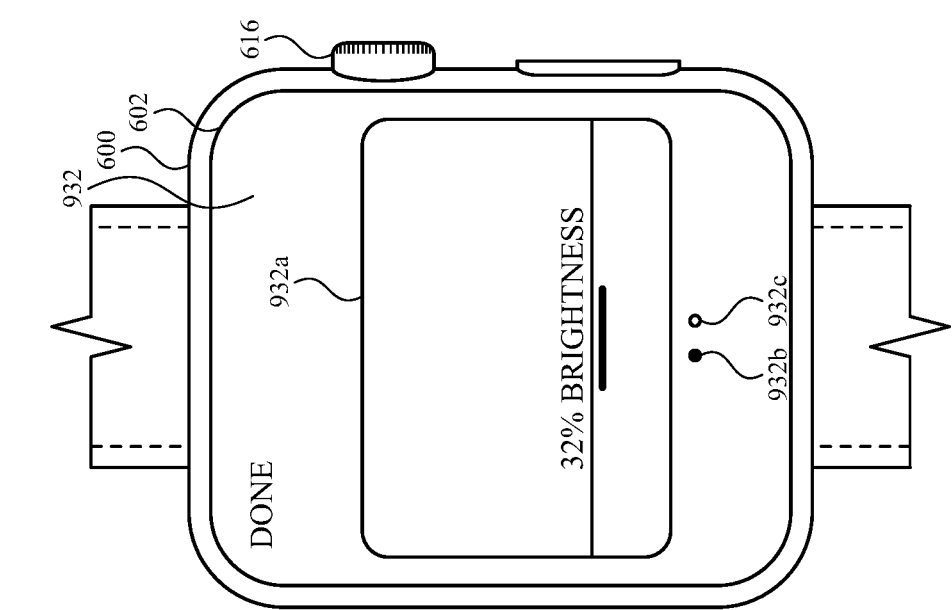
*FIG. 9G*

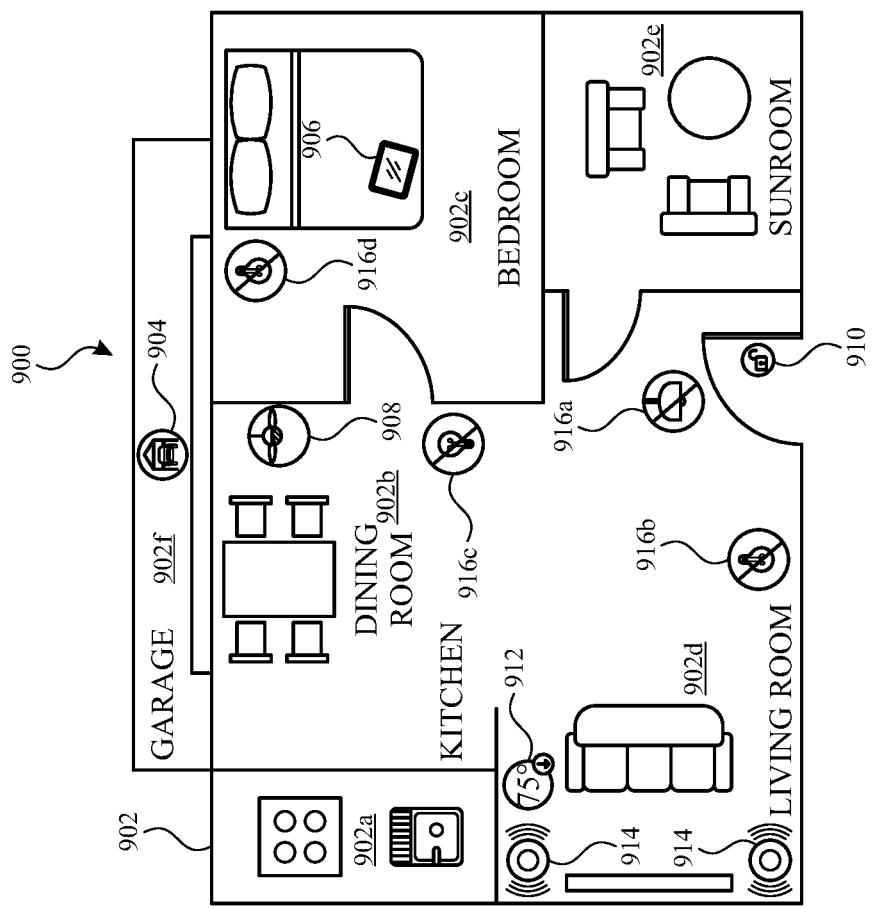
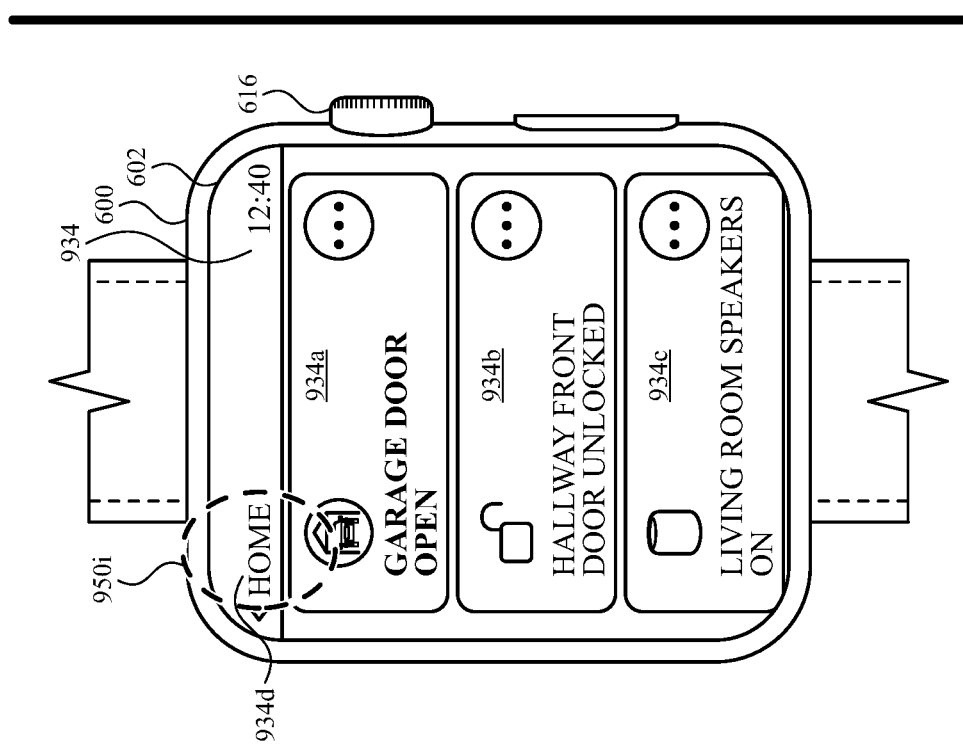
FIG. 9H

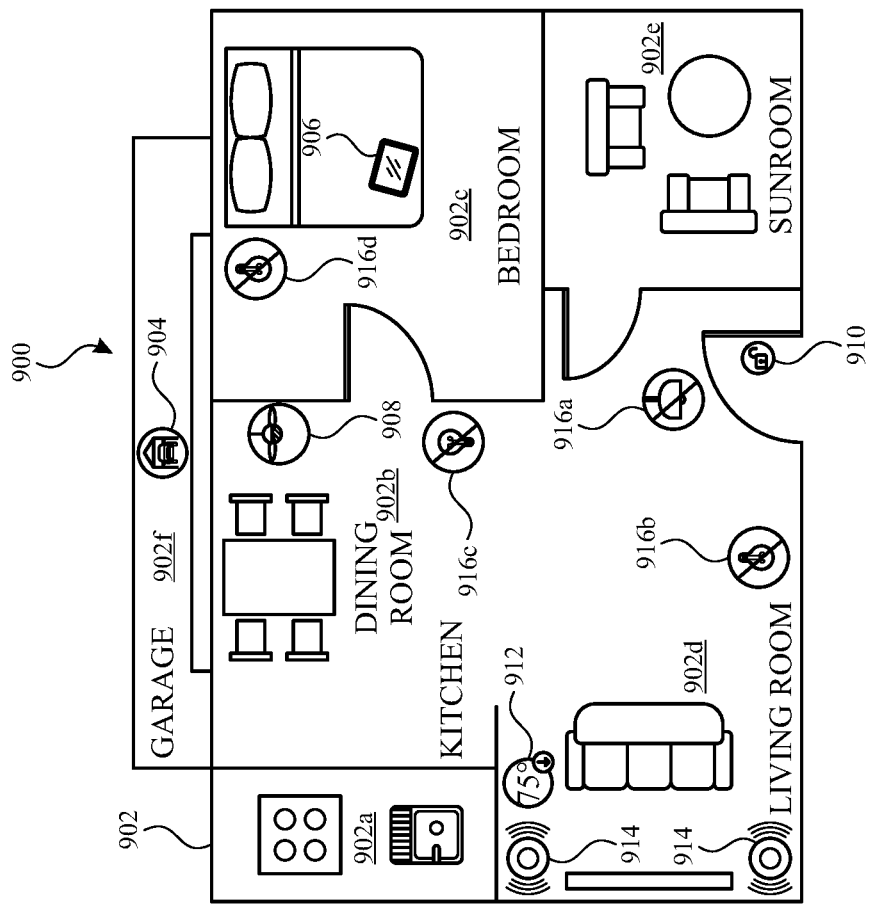
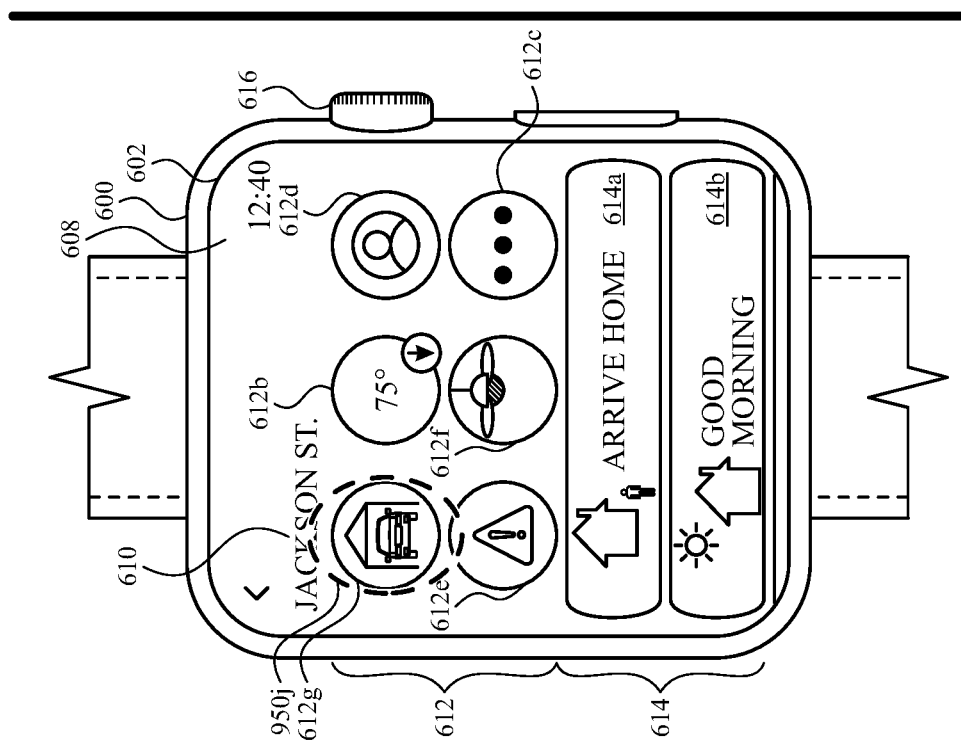
*FIG. 9I*

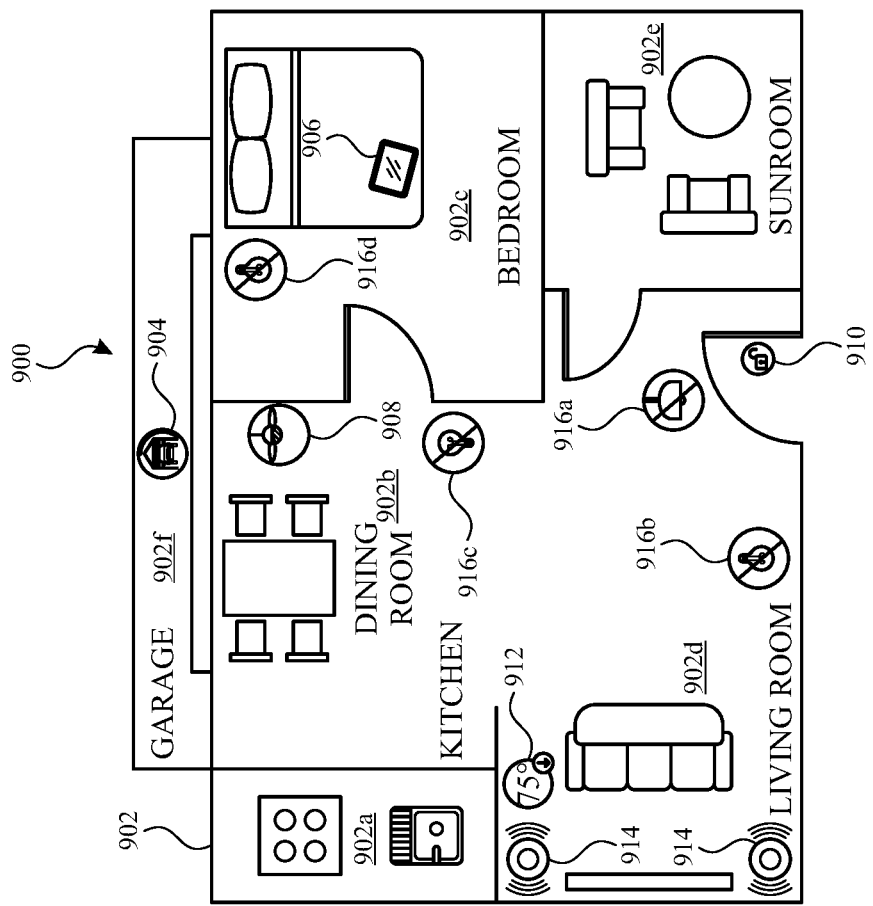
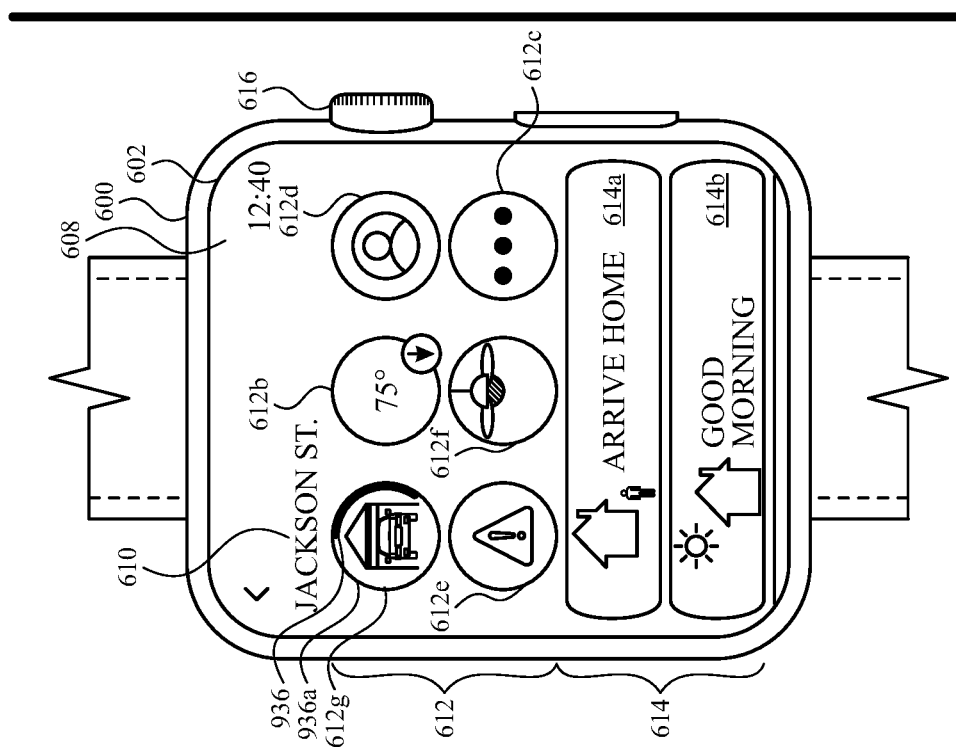
FIG. 9J

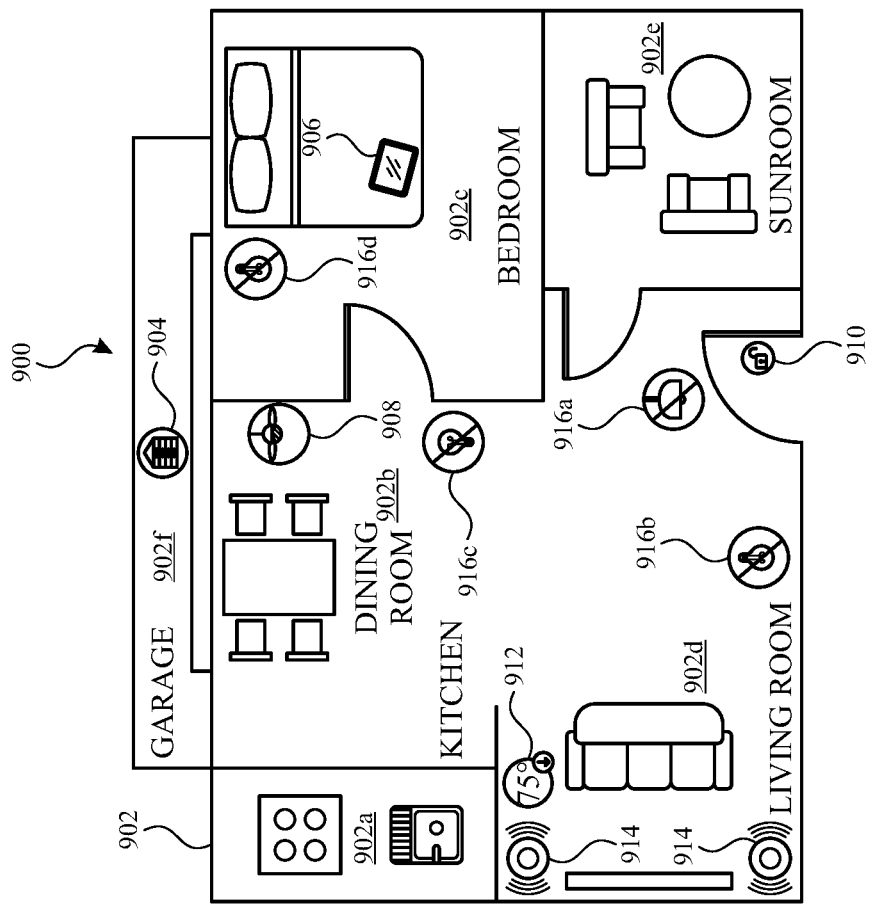
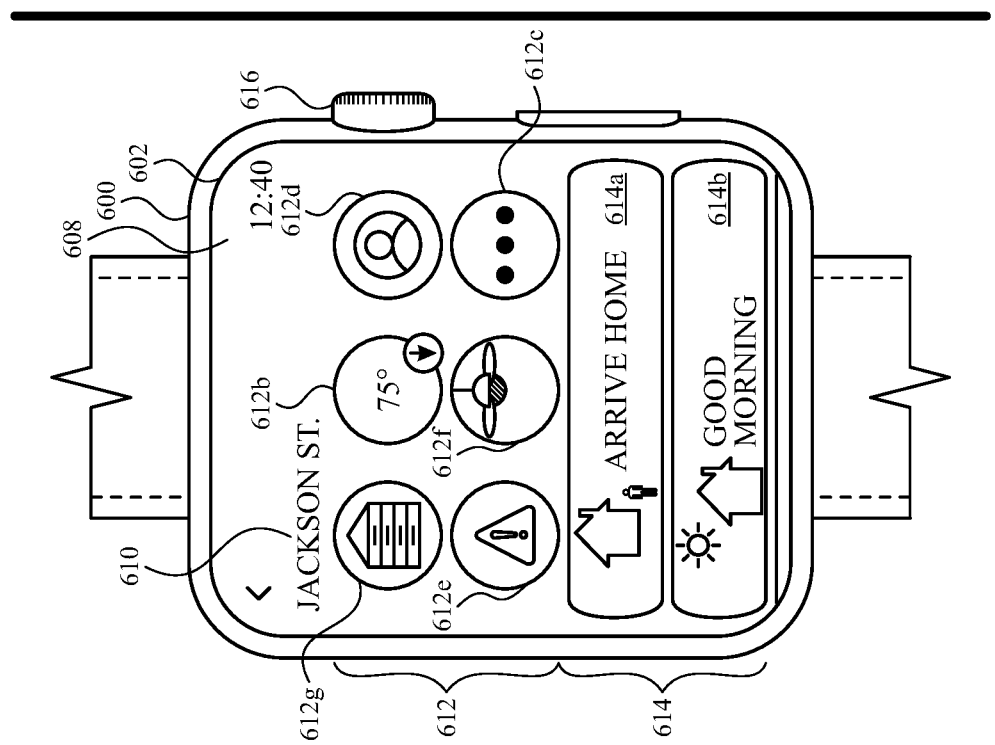
FIG. 9K

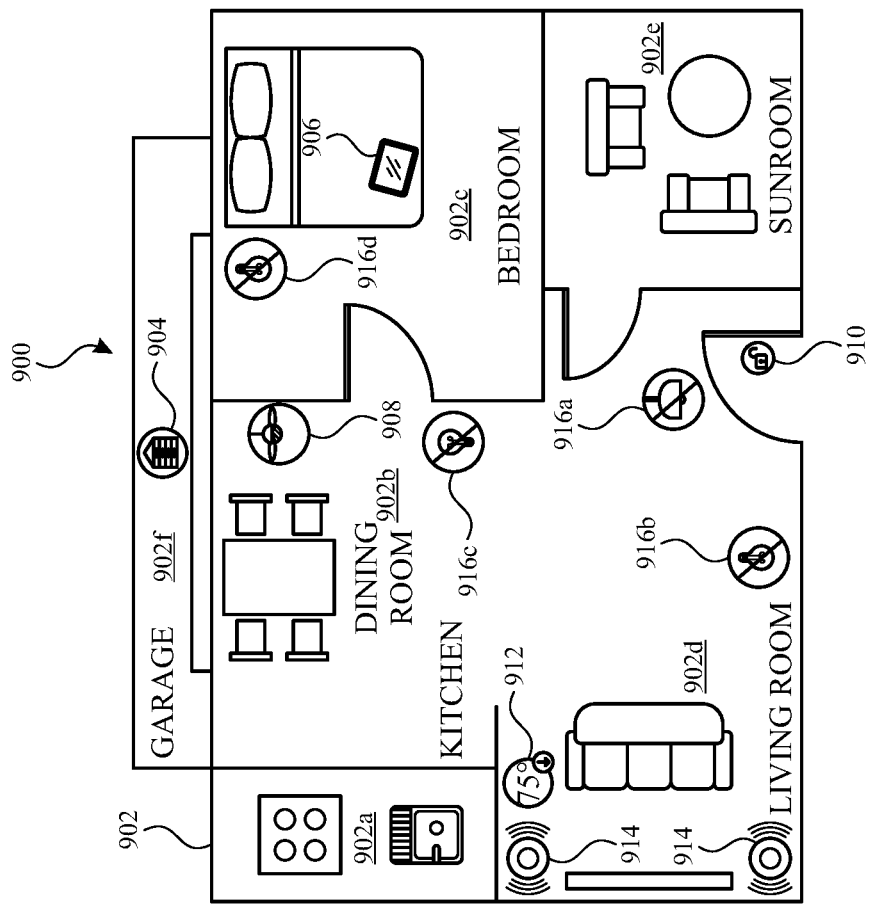
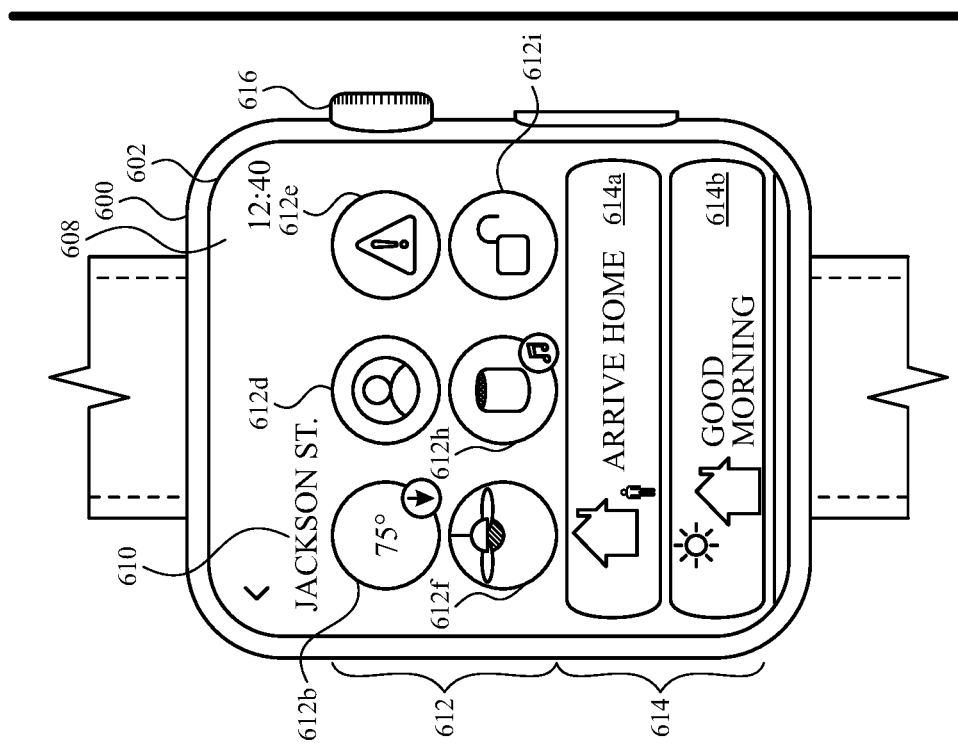
FIG. 9L

1000

1002
In response to a request to display a first user interface, display the first user interface including:

1004
In accordance with a determination that at least two accessories of a first type that are in communication with the computer system satisfy a first set of criteria, wherein the first set of criteria includes a first criterion that is met when the at least two accessories of the first type include a first status, a first status indicator corresponding to the at least two accessories of the first type.

1006
While displaying the first status indicator, detect a first user input corresponding to the first status indicator.

1008
In response to detecting the first user input, display, via the display generation component, a second user interface including at least two control user interface objects corresponding to respective accessories of the first type of the at least two accessories of the first type.

1010
After displaying the second user interface including the at least two control user interface objects, detect, via the rotatable input mechanism, a second user input.

1012
In response to detecting the second user input, cause the at least two accessories of the first type to transition from the first status to a second status, different from the first status.

FIG. 10

USER INTERFACES FOR MANAGING ACCESSORIES

CROSS-REFERENCE TO RELATED APPLICATION

This application is a continuation of U.S. patent application Ser. No. 17/742,273, entitled "USER INTERFACES FOR MANAGING ACCESSORIES," filed on May 11, 2022, which claims priority to U.S. Provisional Patent Application Ser. No. 63/189,078, entitled "USER INTERFACES FOR MANAGING ACCESSORIES," filed on May 15, 2021, the entire contents of each of which are hereby incorporated by reference.

FIELD

The present disclosure relates generally to computer user interfaces, and more specifically to techniques for managing accessories, such as accessories of a home.

BACKGROUND

Electronic devices are able to communicate with various electronic accessories, such as lights, outlets, locks, speakers, and/or other devices. In addition, when connected to an accessory, an electronic device can adjust a state, setting, and/or position of the accessory.

BRIEF SUMMARY

Some techniques for managing accessories using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing accessories. Such methods and interfaces optionally complement or replace other methods for managing accessories. Such methods and interfaces reduce the cognitive burden on a user and produce a more efficient human-machine interface. For instance, such methods and interfaces reduce a number of inputs that are necessary for causing an accessory and/or a group of accessories to transition between states. For battery-operated computing devices, such methods and interfaces conserve power and increase the time between battery charges.

In accordance with some embodiments, a method is described. The method is performed at a computer system that is in communication with a display generation component and a rotatable input mechanism. The method comprises: while displaying, via the display generation component, a camera user interface, concurrently displaying, via the display generation component: a first image captured via a first camera that is in communication with the computer system; and a plurality of event indicators; while concurrently displaying the first image captured via the first camera and the plurality of event indicators, detecting, via the rotatable input mechanism, a first user input; and in response to detecting the first user input via the rotatable input mechanism, replacing display of the first image captured via the first camera with display of a second image captured via the first camera, wherein the second image of the first camera corresponds a first event indicator of the plurality of event indicators, and wherein the second image captured via the first camera corresponds to one or more images captured via the first camera at a first time prior to a current time.

In accordance with some embodiments, a non-transitory computer-readable storage medium is described. The non-transitory computer-readable storage medium stores one or more programs configured to be executed by one or more processors of a computer system that is in communication with a display generation component and a rotatable input mechanism, the one or more programs including instructions for: while displaying, via the display generation component, a camera user interface, concurrently displaying, via the display generation component: a first image captured via a first camera that is in communication with the computer system; and a plurality of event indicators; while concurrently displaying the first image captured via the first camera and the plurality of event indicators, detecting, via the rotatable input mechanism, a first user input; and in response to detecting the first user input via the rotatable input mechanism, replacing display of the first image captured via the first camera with display of a second image captured via the first camera, wherein the second image of the first camera corresponds a first event indicator of the plurality of event indicators, and wherein the second image captured via the first camera corresponds to one or more images captured via the first camera at a first time prior to a current time.

In accordance with some embodiments, a transitory computer-readable storage medium is described. The transitory computer-readable storage medium stores one or more programs configured to be executed by one or more processors of a computer system that is in communication with a display generation component and a rotatable input mechanism, the one or more programs including instructions for: while displaying, via the display generation component, a camera user interface, concurrently displaying, via the display generation component: a first image captured via a first camera that is in communication with the computer system; and a plurality of event indicators; while concurrently displaying the first image captured via the first camera and the plurality of event indicators, detecting, via the rotatable input mechanism, a first user input; and in response to detecting the first user input via the rotatable input mechanism, replacing display of the first image captured via the first camera with display of a second image captured via the first camera, wherein the second image of the first camera corresponds a first event indicator of the plurality of event indicators, and wherein the second image captured via the first camera corresponds to one or more images captured via the first camera at a first time prior to a current time.

In accordance with some embodiments, a computer system is described. The computer system is in communication with a display generation component and a rotatable input mechanism. The computer system comprises: one or more processors; and memory storing one or more programs configured to be executed by the one or more processors, the one or more programs including instructions for: while displaying, via the display generation component, a camera user interface, concurrently displaying, via the display generation component: a first image captured via a first camera that is in communication with the computer system; and a plurality of event indicators; while concurrently displaying the first image captured via the first camera and the plurality of event indicators, detecting, via the rotatable input mechanism, a first user input; and in response to detecting the first user input via the rotatable input mechanism, replacing display of the first image captured via the first camera with display of a second image captured via the first camera, wherein the second image of the first camera corresponds a first event indicator of the plurality of event indicators, and wherein the second image captured via the first camera corresponds to one or more images captured via the first camera at a first time prior to a current time.

In accordance with some embodiments, a computer system is described. The computer system is in communication with a display generation component and a rotatable input mechanism. The computer system comprises: means for, while displaying, via the display generation component, a camera user interface, concurrently displaying, via the display generation component: a first image captured via a first camera that is in communication with the computer system; and a plurality of event indicators; means for, while concurrently displaying the first image captured via the first camera and the plurality of event indicators, detecting, via the rotatable input mechanism, a first user input; and means for, in response to detecting the first user input via the rotatable input mechanism, replacing display of the first image captured via the first camera with display of a second image captured via the first camera, wherein the second image of the first camera corresponds a first event indicator of the plurality of event indicators, and wherein the second image captured via the first camera corresponds to one or more images captured via the first camera at a first time prior to a current time.

In accordance with some embodiments, a computer program product is described. The computer program product comprises one or more programs configured to be executed by one or more processors of a computer system that is in communication with a display generation component and a rotatable input mechanism, the one or more programs including instructions for: while displaying, via the display generation component, a camera user interface, concurrently displaying, via the display generation component: a first image captured via a first camera that is in communication with the computer system; and a plurality of event indicators; while concurrently displaying the first image captured via the first camera and the plurality of event indicators, detecting, via the rotatable input mechanism, a first user input; and in response to detecting the first user input via the rotatable input mechanism, replacing display of the first image captured via the first camera with display of a second image captured via the first camera, wherein the second image of the first camera corresponds a first event indicator of the plurality of event indicators, and wherein the second image captured via the first camera corresponds to one or more images captured via the first camera at a first time prior to a current time.

In accordance with some embodiments, a method is described. The method is performed at a computer system that is in communication with a display generation component and one or more input devices. The method comprises: while displaying, via the display generation component, a camera user interface of a first application, wherein the camera user interface includes an image captured via a camera, detecting, via the one or more input devices, a first user input corresponding to the image captured via the camera; and in response to detecting the first user input: in accordance with a determination that the image captured via the camera satisfies a first set of criteria, wherein the first set of criteria includes a criterion that is met when the image captured via the camera includes a first aspect ratio, displaying, via the display generation component, a first portion of the image captured via the camera in a full screen mode, wherein the first portion of the image is less than the entire image captured via the camera; and in accordance with a determination that the image captured via the camera does not satisfy the first set of criteria, displaying, via the display generation component, the entire image captured via the camera in the full screen mode.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: while displaying, via the display generation component, a camera user interface of a first application, wherein the camera user interface includes an image captured via a camera, detecting, via the one or more input devices, a first user input corresponding to the image captured via the camera; and in response to detecting the first user input: in accordance with a determination that the image captured via the camera satisfies a first set of criteria, wherein the first set of criteria includes a criterion that is met when the image captured via the camera includes a first aspect ratio, displaying, via the display generation component, a first portion of the image captured via the camera in a full screen mode, wherein the first portion of the image is less than the entire image captured via the camera; and in accordance with a determination that the image captured via the camera does not satisfy the first set of criteria, displaying, via the display generation component, the entire image captured via the camera in the full screen mode.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: while displaying, via the display generation component, a camera user interface of a first application, wherein the camera user interface includes an image captured via a camera, detecting, via the one or more input devices, a first user input corresponding to the image captured via the camera; and in response to detecting the first user input: in accordance with a determination that the image captured via the camera satisfies a first set of criteria, wherein the first set of criteria includes a criterion that is met when the image captured via the camera includes a first aspect ratio, displaying, via the display generation component, a first portion of the image captured via the camera in a full screen mode, wherein the first portion of the image is less than the entire image captured via the camera; and in accordance with a determination that the image captured via the camera does not satisfy the first set of criteria, displaying, via the display generation component, the entire image captured via the camera in the full screen mode.

In accordance with some embodiments, a computer system is described. The computer system is in communication with a display generation component and one or more input devices. The computer system comprises: one or more processors; and memory storing one or more programs configured to be executed by the one or more processors, the one or more programs including instructions for: while displaying, via the display generation component, a camera user interface of a first application, wherein the camera user interface includes an image captured via a camera, detecting, via the one or more input devices, a first user input corresponding to the image captured via the camera; and in response to detecting the first user input: in accordance with a determination that the image captured via the camera satisfies a first set of criteria, wherein the first set of criteria includes a criterion that is met when the image captured via the camera includes a first aspect ratio, displaying, via the display generation component, a first portion of the image captured via the camera in a full screen mode, wherein the first portion of the image is less than the entire image captured via the camera; and in accordance with a determination that the image captured via the camera does not satisfy the first set of criteria, displaying, via the display generation component, the entire image captured via the camera in the full screen mode.

In accordance with some embodiments, a computer system is described. The computer system is in communication with a display generation component and one or more input devices. The computer system comprises: means for, while displaying, via the display generation component, a camera user interface of a first application, wherein the camera user interface includes an image captured via a camera, detecting, via the one or more input devices, a first user input corresponding to the image captured via the camera; and means for, in response to detecting the first user input: in accordance with a determination that the image captured via the camera satisfies a first set of criteria, wherein the first set of criteria includes a criterion that is met when the image captured via the camera includes a first aspect ratio, displaying, via the display generation component, a first portion of the image captured via the camera in a full screen mode, wherein the first portion of the image is less than the entire image captured via the camera; and in accordance with a determination that the image captured via the camera does not satisfy the first set of criteria, displaying, via the display generation component, the entire image captured via the camera in the full screen mode.

In accordance with some embodiments, a computer program product is described. The computer program product comprises one or more programs configured to be executed by one or more processors of a computer system that is in communication with a display generation component and one or more input devices, the one or more programs including instructions for: while displaying, via the display generation component, a camera user interface of a first application, wherein the camera user interface includes an image captured via a camera, detecting, via the one or more input devices, a first user input corresponding to the image captured via the camera; and in response to detecting the first user input: in accordance with a determination that the image captured via the camera satisfies a first set of criteria, wherein the first set of criteria includes a criterion that is met when the image captured via the camera includes a first aspect ratio, displaying, via the display generation component, a first portion of the image captured via the camera in a full screen mode, wherein the first portion of the image is less than the entire image captured via the camera; and in accordance with a determination that the image captured via the camera does not satisfy the first set of criteria, displaying, via the display generation component, the entire image captured via the camera in the full screen mode.

In accordance with some embodiments, a method is described. The method is performed at a computer system that is in communication with a display generation component and a rotatable input mechanism. The method comprises: in response to a request to display a first user interface, displaying the first user interface including: in accordance with a determination that at least two accessories of a first type that are in communication with the computer system satisfy a first set of criteria, wherein the first set of criteria includes a first criterion that is met when the at least two accessories of the first type include a first status, a first status indicator corresponding to the at least two accessories of the first type; while displaying the first status indicator, detecting a first user input corresponding to the first status indicator; in response to detecting the first user input, displaying, via the display generation component, a second user interface including at least two control user interface objects corresponding to respective accessories of the first type of the at least two accessories of the first type; after displaying the second user interface including the at least two control user interface objects, detecting, via the rotatable input mechanism, a second user input; and in response to detecting the second user input, causing the at least two accessories of the first type to transition from the first status to a second status, different from the first status.

In accordance with some embodiments, a non-transitory computer-readable storage medium is described. The non-transitory computer-readable storage medium stores one or more programs configured to be executed by one or more processors of a computer system that is in communication with a display generation component and a rotatable input mechanism, the one or more programs including instructions for: in response to a request to display a first user interface, displaying the first user interface including: in accordance with a determination that at least two accessories of a first type that are in communication with the computer system satisfy a first set of criteria, wherein the first set of criteria includes a first criterion that is met when the at least two accessories of the first type include a first status, a first status indicator corresponding to the at least two accessories of the first type; while displaying the first status indicator, detecting a first user input corresponding to the first status indicator; in response to detecting the first user input, displaying, via the display generation component, a second user interface including at least two control user interface objects corresponding to respective accessories of the first type of the at least two accessories of the first type; after displaying the second user interface including the at least two control user interface objects, detecting, via the rotatable input mechanism, a second user input; and in response to detecting the second user input, causing the at least two accessories of the first type to transition from the first status to a second status, different from the first status.

In accordance with some embodiments, a transitory computer-readable storage medium is described. The transitory computer-readable storage medium stores one or more programs configured to be executed by one or more processors of a computer system that is in communication with a display generation component and a rotatable input mechanism, the one or more programs including instructions for: in response to a request to display a first user interface, displaying the first user interface including: in accordance with a determination that at least two accessories of a first type that are in communication with the computer system satisfy a first set of criteria, wherein the first set of criteria includes a first criterion that is met when the at least two accessories of the first type include a first status, a first status indicator corresponding to the at least two accessories of the first type; while displaying the first status indicator, detecting a first user input corresponding to the first status indicator; in response to detecting the first user input, displaying, via the display generation component, a second user interface including at least two control user interface objects corresponding to respective accessories of the first type of the at least two accessories of the first type; after displaying the second user interface including the at least two control user interface objects, detecting, via the rotatable input mechanism, a second user input; and in response to detecting the second user input, causing the at least two accessories of the first type to transition from the first status to a second status, different from the first status.

In accordance with some embodiments, a computer system is described. The computer system is in communication with a display generation component and a rotatable input mechanism. The computer system comprises: one or more processors; and memory storing one or more programs configured to be executed by the one or more processors, the one or more programs including instructions for: in response to a request to display a first user interface, displaying the first user interface including: in accordance with a determination that at least two accessories of a first type that are in communication with the computer system satisfy a first set of criteria, wherein the first set of criteria includes a first criterion that is met when the at least two accessories of the first type include a first status, a first status indicator corresponding to the at least two accessories of the first type; while displaying the first status indicator, detecting a first user input corresponding to the first status indicator; in response to detecting the first user input, displaying, via the display generation component, a second user interface including at least two control user interface objects corresponding to respective accessories of the first type of the at least two accessories of the first type; after displaying the second user interface including the at least two control user interface objects, detecting, via the rotatable input mechanism, a second user input; and in response to detecting the second user input, causing the at least two accessories of the first type to transition from the first status to a second status, different from the first status.

In accordance with some embodiments, a computer system is described. The computer system is in communication with a display generation component and a rotatable input mechanism. The computer system comprises: means for, in response to a request to display a first user interface, displaying the first user interface including: in accordance with a determination that at least two accessories of a first type that are in communication with the computer system satisfy a first set of criteria, wherein the first set of criteria includes a first criterion that is met when the at least two accessories of the first type include a first status, a first status indicator corresponding to the at least two accessories of the first type; means for, while displaying the first status indicator, detecting a first user input corresponding to the first status indicator; means for, in response to detecting the first user input, displaying, via the display generation component, a second user interface including at least two control user interface objects corresponding to respective accessories of the first type of the at least two accessories of the first type; means for, after displaying the second user interface including the at least two control user interface objects, detecting, via the rotatable input mechanism, a second user input; and means for, in response to detecting the second user input, causing the at least two accessories of the first type to transition from the first status to a second status, different from the first status.

In accordance with some embodiments, a computer program product is described. The computer program product comprises one or more programs configured to be executed by one or more processors of a computer system that is in communication with a display generation component and a rotatable input mechanism, the one or more programs including instructions for: in response to a request to display a first user interface, displaying the first user interface including: in accordance with a determination that at least two accessories of a first type that are in communication with the computer system satisfy a first set of criteria, wherein the first set of criteria includes a first criterion that is met when the at least two accessories of the first type include a first status, a first status indicator corresponding to the at least two accessories of the first type; while displaying the first status indicator, detecting a first user input corresponding to the first status indicator; in response to detecting the first user input, displaying, via the display generation component, a second user interface including at least two control user interface objects corresponding to respective accessories of the first type of the at least two accessories of the first type; after displaying the second user interface including the at least two control user interface objects, detecting, via the rotatable input mechanism, a second user input; and in response to detecting the second user input, causing the at least two accessories of the first type to transition from the first status to a second status, different from the first status.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing accessories, thereby increasing the effectiveness, efficiency, and user satisfaction with such devices. Such methods and interfaces may complement or replace other methods for managing accessories.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 is a flow diagram illustrating methods for displaying images corresponding to events detected by one or more camera accessories, in accordance with some embodiments.

FIG. 8 is a flow diagram illustrating methods for displaying an image captured by a camera accessory in a full screen mode, in accordance with some embodiments.

FIGS. 9A-9L illustrate exemplary user interfaces for displaying status indicators associated with one or more accessories, in accordance with some embodiments.

FIG. 10 is a flow diagram illustrating methods for causing a group of accessories to transition between states, in accordance with some embodiments.

DESCRIPTION OF EMBODIMENTS

Figure 1A:
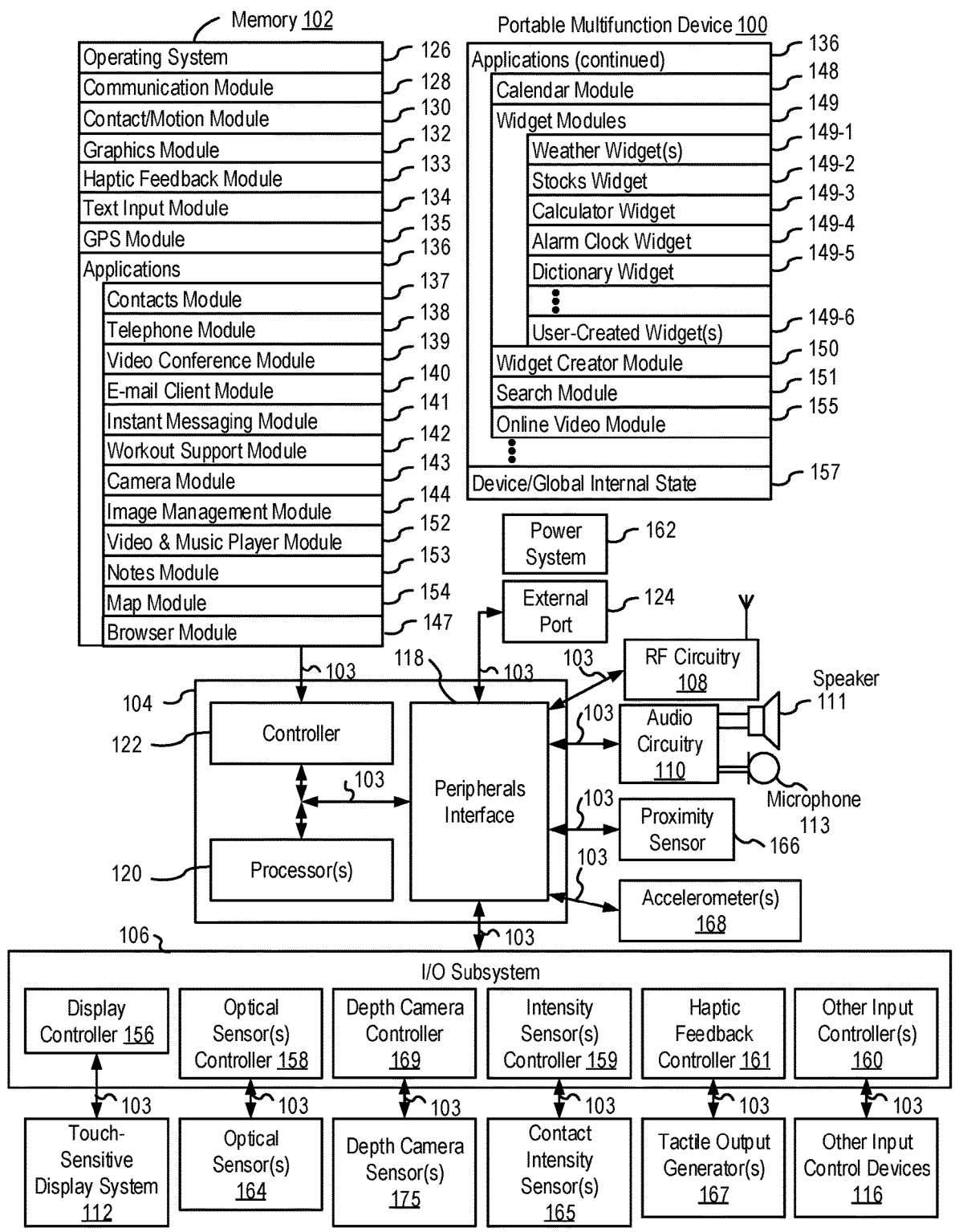
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing accessories. For example, there is a need for electronic devices that facilitate a user's ability to access and/or view images corresponding to events detected by a camera accessory. In addition, there is a need for electronic devices that display an image or a portion of an image captured by a camera accessory in a full screen mode based on an aspect ratio of the image. Further, there is a need for electronic devices that display a status indicator corresponding to a group of accessories, where the status indicator can be selected to enable the electronic device to cause an adjustment of a state of the group of accessories. Such techniques can reduce the cognitive burden on a user who manages accessories, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing event notifications. FIGS. 6A-6J illustrate exemplary user interfaces for managing one or more camera accessories. FIG. 7 is a flow diagram illustrating methods for displaying images corresponding to events detected by one or more camera accessories in accordance with some embodiments. FIG. 8 is a flow diagram illustrating methods for displaying an image captured by a camera accessory in a full screen mode in accordance with some embodiments. The user interfaces in FIGS. 6A-6J are used to illustrate the processes described below, including the processes in FIGS. 7 and 8. FIGS. 9A-9L illustrate exemplary user interfaces for displaying status indicators associated with one or more accessories. FIG. 10 is a flow diagram illustrating methods for causing a group of accessories to transition between states in accordance with some embodiments. The user interfaces in FIGS. 9A-9L are used to illustrate the processes described below, including the processes in FIG. 10.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG.

Figure 3:
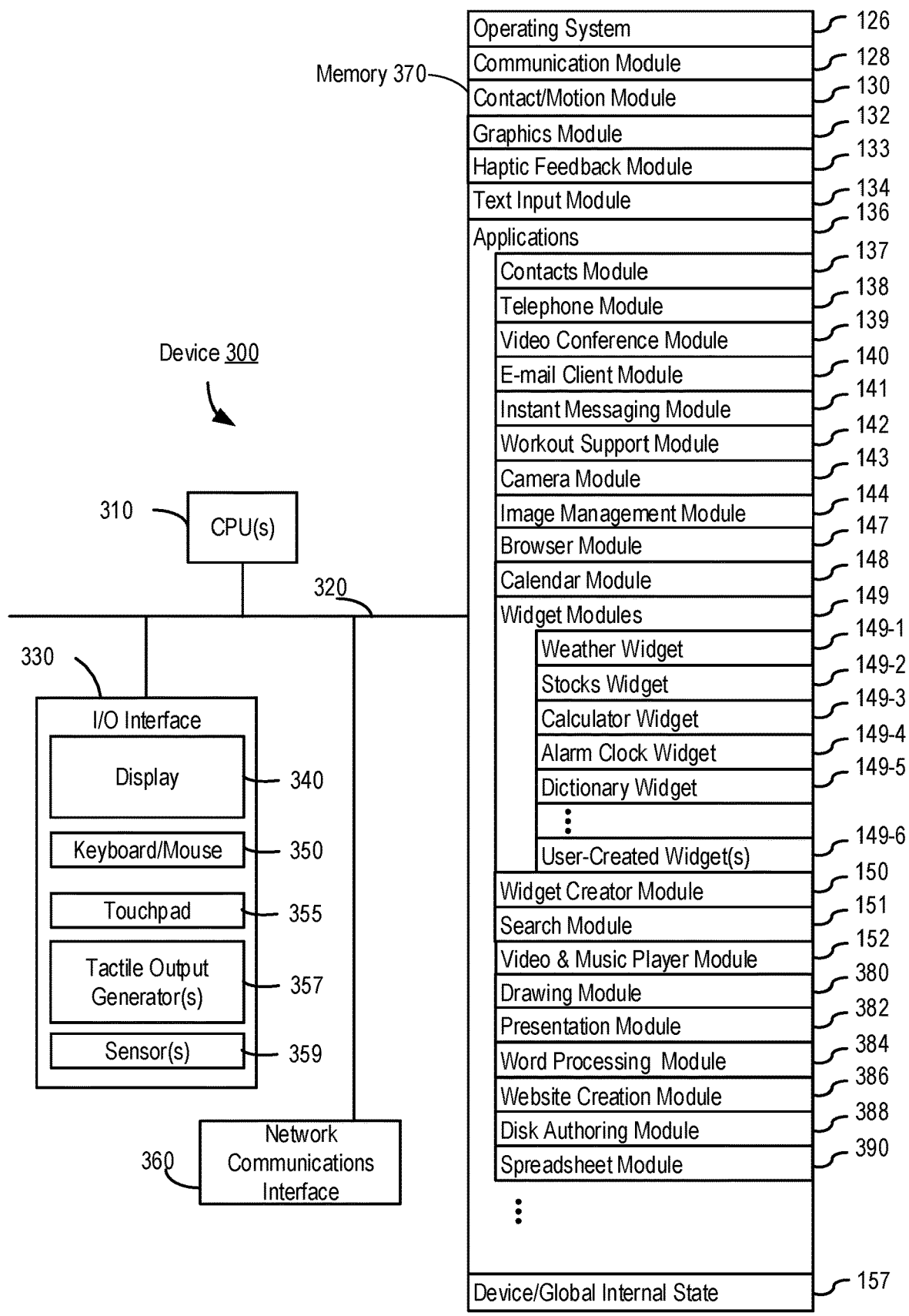
FIG. 3 is a block diagram of an exemplary multifunction device with a display and a touch-sensitive surface in accordance with some embodiments.

1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;

Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
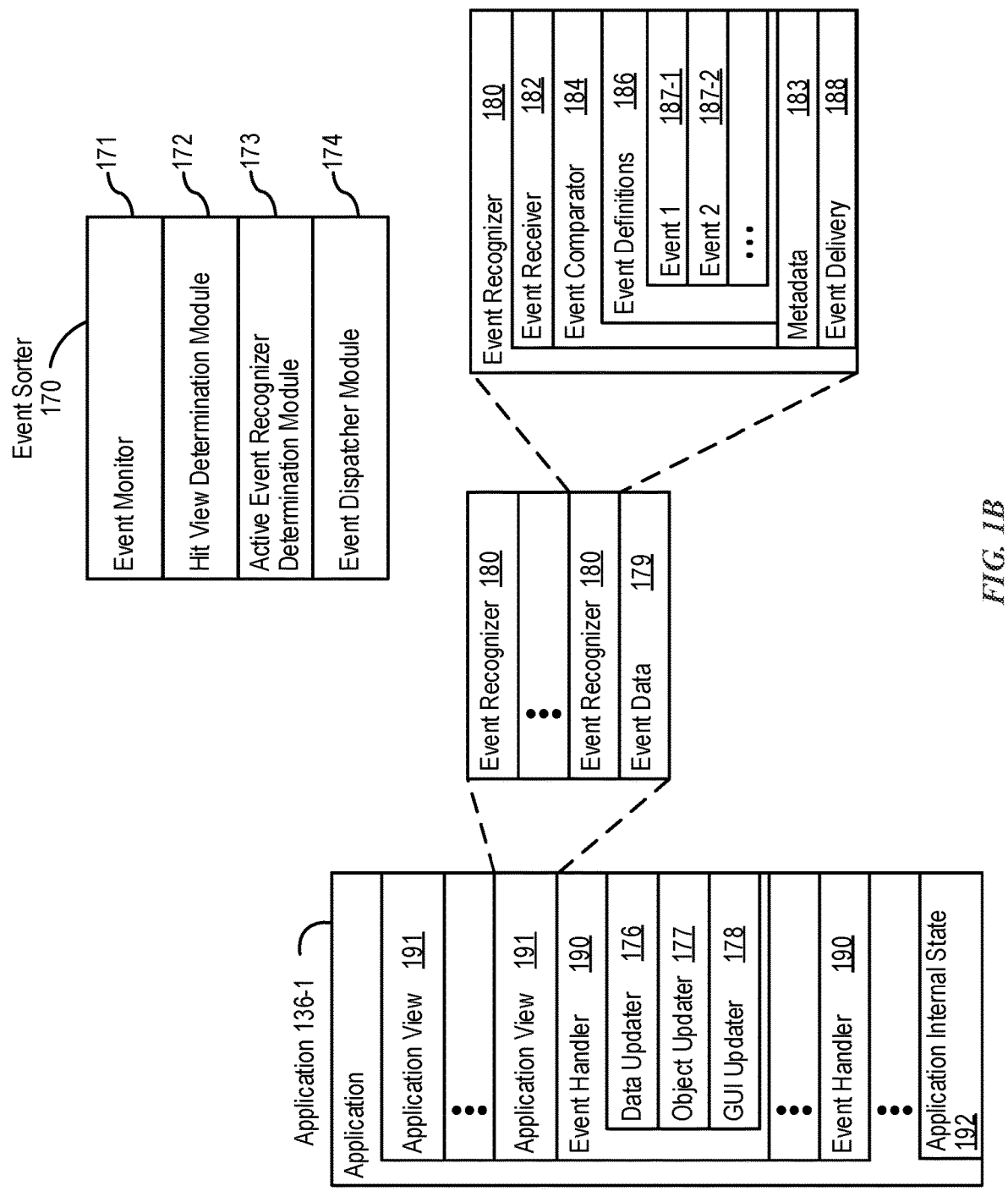
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
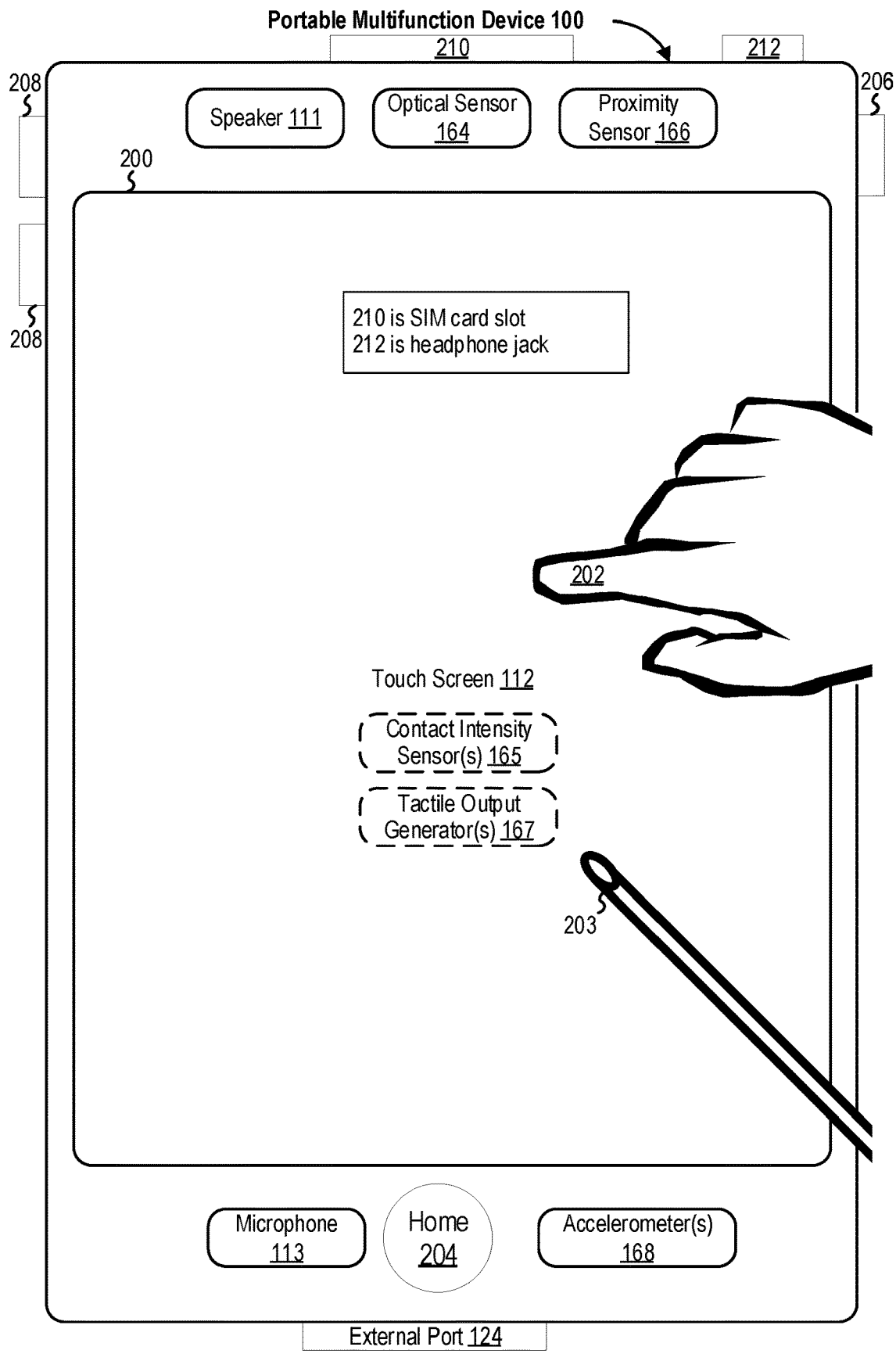
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
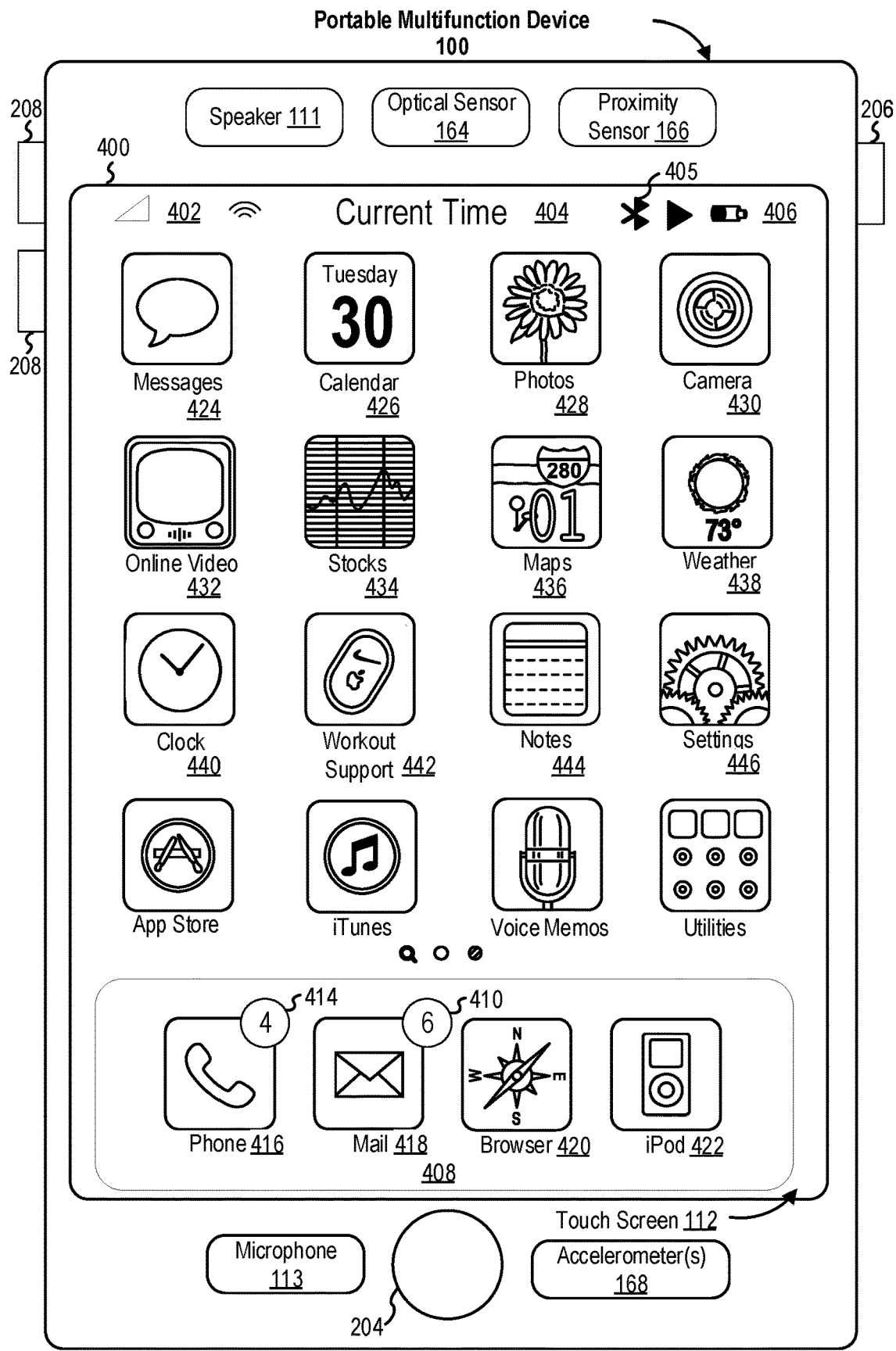
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
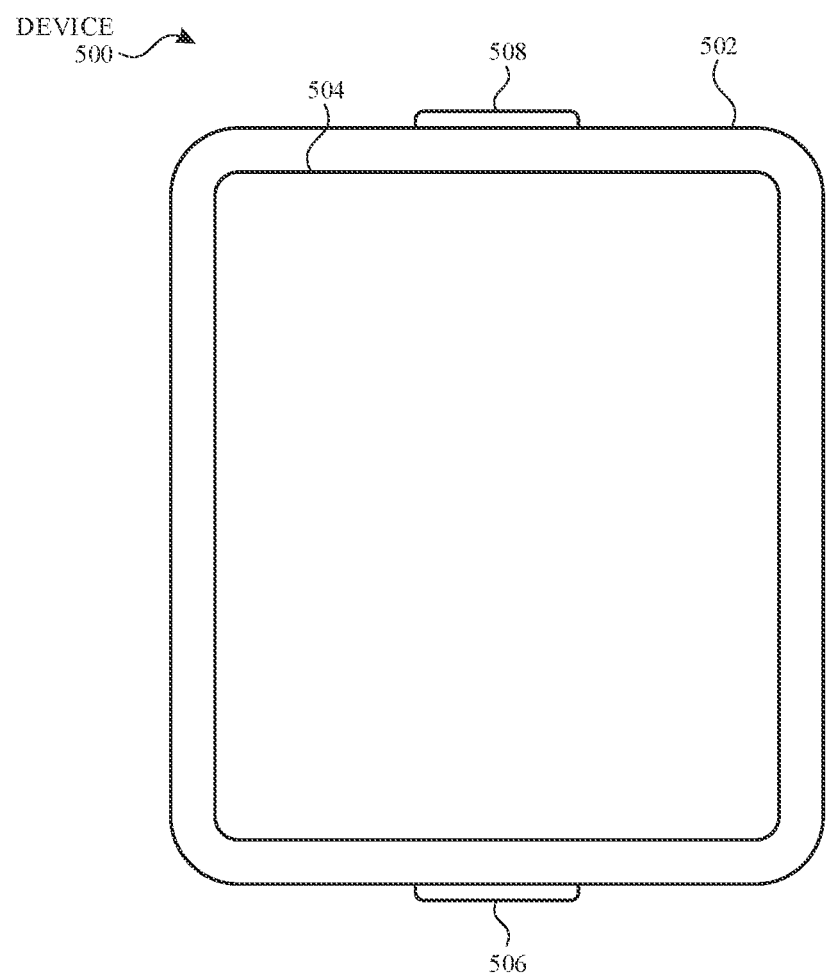
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
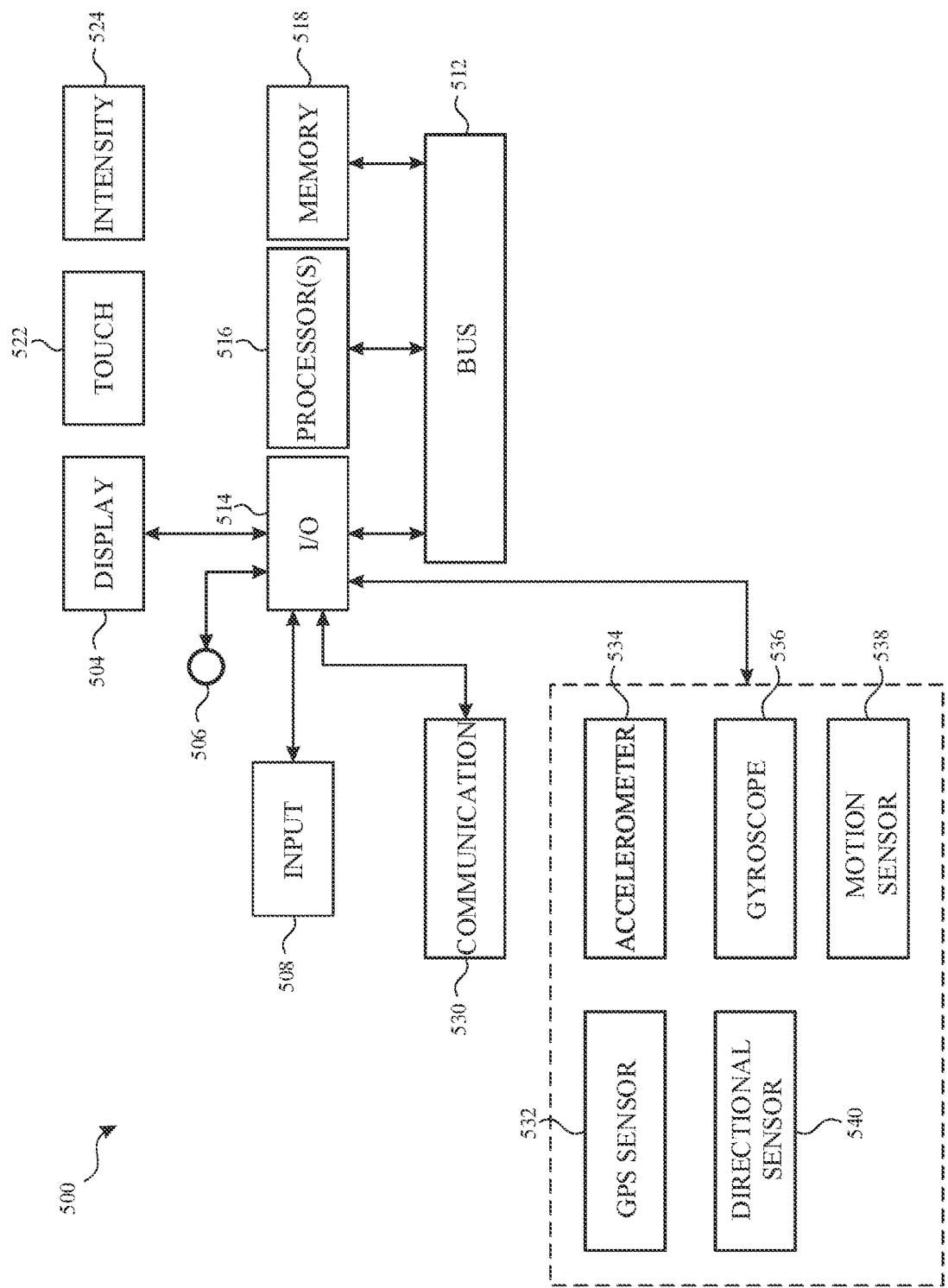
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, and 1000 (FIGS. 7, 8, and 10). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6J illustrate exemplary user interfaces for managing one or more camera accessories, in accordance with some embodiments. The user interfaces in these figures are used to illustrate the processes described below, including the processes in FIGS. 7 and 8.

Figure 6B:
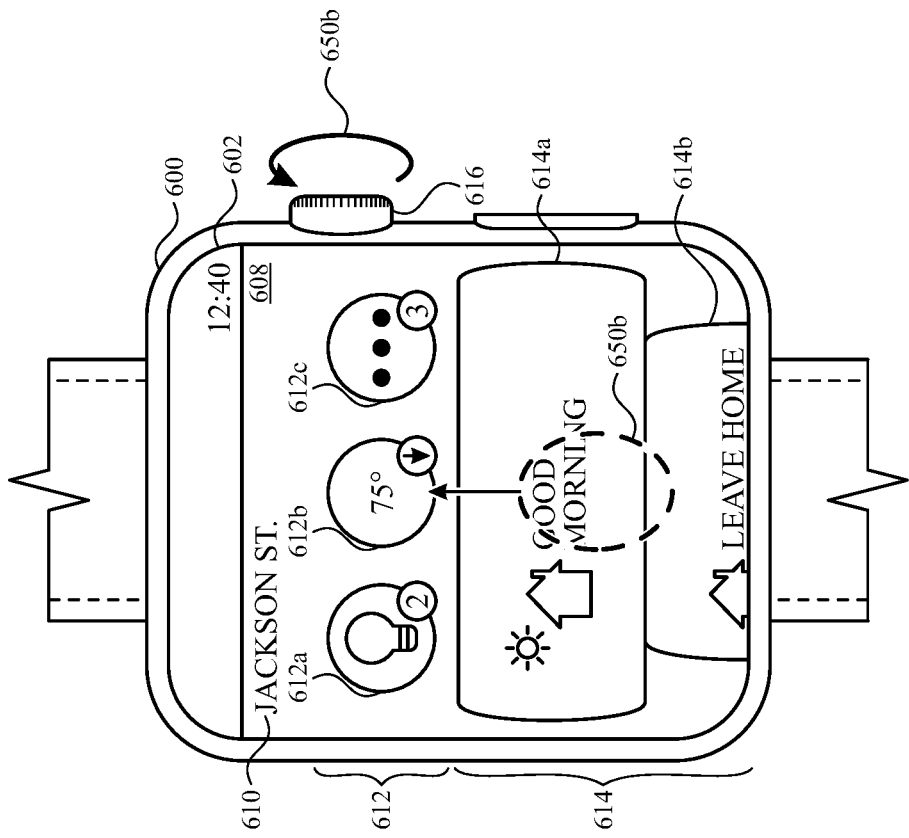
FIGS. 6A-6J illustrate exemplary user interfaces for managing one or more camera accessories, in accordance with some embodiments.
Figure 6A:
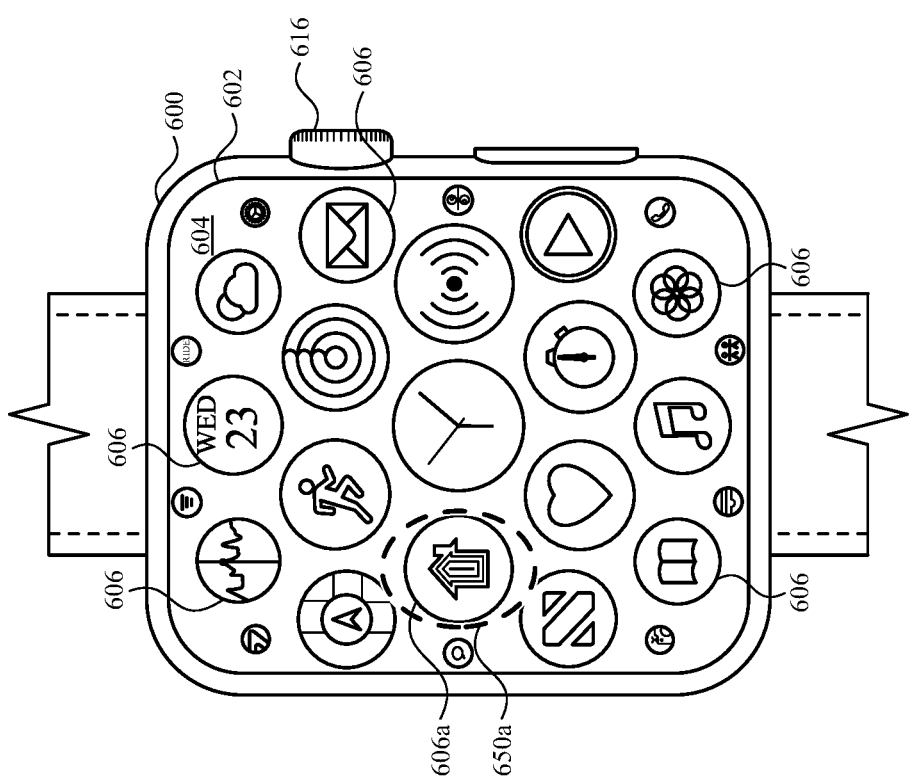

FIG. 6A illustrates electronic device 600 displaying, via display 602, application user interface 604. Application user interface 604 includes a plurality of application user interface objects 606. For instance, the plurality of application user interface objects 606 includes first application user interface object 606a corresponding to a first application of electronic device 600. At FIG. 6A, the first application corresponding to first application user interface object 606a is a home application that is associated with one or more accessories that are in communication with electronic device 600. At FIG. 6A, electronic device 600 detects user input 650a (e.g., a tap gesture) corresponding to selection of first application user interface object 606a. In response to detecting user input 650a, electronic device 600 displays first user interface 608, as shown at FIG. 6B.

At FIG. 6B, first user interface 608 includes home indicator 610 (e.g., "Jackson St."), status indicator region 612 including status indicators 612a-612c, and suggested operations region 614 including first scene user interface object 614a and second scene user interface object 614b. In some embodiments, electronic device 600 displays first user interface 608 as a default user interface and/or a home user interface in response to user input requesting to launch the first application (e.g., user input 650a corresponding to selection of first application user interface object 606a).

Electronic device 600 displays status indicators (e.g., status indicator 612a and status indicator 612b) in status indicator region 612 in response to detecting that an accessory and/or a group of accessories is in a predefined state (e.g., an active state, such as an on state, an open state, an unlocked state, an error state, and/or an activated state). At FIG. 6B, status indicator 612a visually indicates that two lighting accessories in communication with electronic device 600 are in an on state (e.g., turned on). In addition, status indicator 612b visually indicates that a temperature control accessory that is in communication with electronic device 600 is actively causing a temperature control system (e.g., a heating system, an air conditioning system, and/or a ventilation system) to cool a temperature within a portion of a structure (e.g., a structure associated with home indicator 610) to a temperature of 75° Fahrenheit.

In addition, status indicator region 612 includes status indicator 612c. Status indicator 612c visually indicates that electronic device 600 has detected that additional accessories (e.g., three accessories and/or groups of accessories) in communication with electronic device 600 are in the predefined state, but are not displayed as status indicators in status indicator region 612. In some embodiments, electronic device 600 displays a predefined amount of status indicators in status indicator region 612. For instance, at FIG. 6B, first user interface 608 includes three status indicators 612a-612c, where status indicator 612c corresponds to at least three additional status indicators that are not displayed by electronic device 600 in status indicator region 612 of first user interface 608. As such, electronic device 600 displays status indicator 612c when electronic device 600 detects that more than three accessories and/or groups of accessories satisfy a set of criteria for displaying a status indicator (e.g., more than three accessories and/or groups of accessories are in the predefined state). In some embodiments, first user interface 608 includes more than three status indicators without displaying status indicator 612c (e.g., status indicator region 612 shown at FIGS. 9A-9C). In some embodiments, first user interface 608 displays status indicator 612c when a threshold number of accessories and/or groups accessories (e.g., four or more, seven or more, and/or nine or more) satisfy the set of criteria for displaying the status indicator. In response to detecting user input corresponding to status indicator 612c, electronic device 600 displays an accessory user interface that enables a user to view the additional accessories and/or groups of accessories that are in the predefined state.

At FIG. 6B, in response to detecting user input corresponding to selection of first scene user interface object 614a, electronic device 600 causes one or more first accessories to transition to predefined states. Similarly, in response to detecting user input corresponding to selection of second scene user interface object 614b, electronic device causes one or more second accessories to transition to predefined states. In some embodiments, first scene user interface object 614a and second scene user interface object 614b correspond to user-defined control schemes for causing a group of accessories to transition between states defined by a user (e.g., a user of electronic device 600 and/or another user).

At FIG. 6B, electronic device 600 displays suggested operations region 614 after (e.g., below) status indicators 612a-612c. In some embodiments, electronic device 600 displays first scene user interface object 614a and second user interface object 614b based on a time of day (e.g., a first control scheme corresponding to first scene control user interface object 614a and a second control scheme corresponding to second scene control user interface object 614b include identifiers and/or information associated with a particular time of day) and/or based on usage patterns (e.g., a first control scheme corresponding to first scene control user interface object 614a and a second control scheme corresponding to second scene control user interface object 614b are frequently used and/or activated, frequently used and/or activated at a particular time of day, and/or recently used and/or activated). As such, electronic device 600 determines that the first control scheme associated with first scene user interface object 614a and the second control scheme associated with second scene user interface object 614b are likely to be activated and/or used by a user. Electronic device 600 therefore displays first scene control user interface object 614a and second scene control user interface object 614b in suggested operations region 614, which is positioned toward a top portion of first user interface 608, because first scene control user interface object 614a and second scene control user interface object 614b are likely to be selected and/or interacted with by the user of electronic device 600.

At FIG. 6B, electronic device 600 detects user input 650b (e.g., a swipe gesture and/or a rotational gesture detected via rotational input mechanism 616). In response to detecting user input 650b, electronic device 600 translates first user interface 608 to display additional user interface objects and regions of first user interface 608, as shown at FIG. 6C.

Figure 6C:
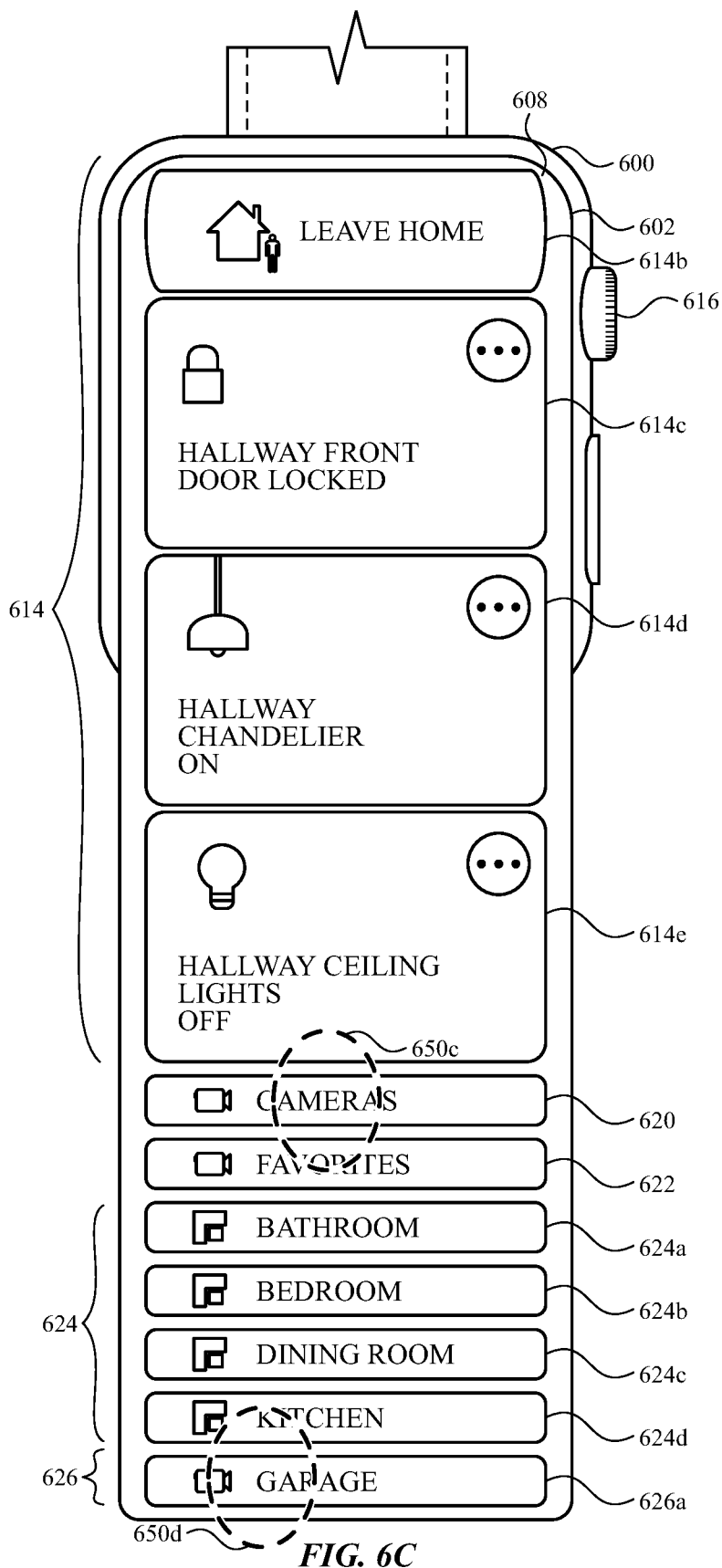

At FIG. 6C, electronic device 600 displays first user interface 608 including suggested operations region 614. Suggested operations region 614 includes second scene user interface object 614b and accessory user interface objects 614c-614e. In addition, at FIG. 6C, first user interface 608 includes cameras user interface object 620, favorites user interface object 622, rooms region 624 including room user interface objects 624a-624d, and accessory region 626 including first camera accessory user interface object 626a. As shown at FIG. 6C, first user interface 608 includes more user interface objects and/or selectable elements that can be displayed via display 602. As such, electronic device 600 translates first user interface 608 and displays, via display 602, different portions of the user interface objects and/or selectable elements of first user interface 608 illustrated in FIG. 6C in response to user input (e.g., swipe gestures and/or rotational inputs detected by rotatable input mechanism 616).

Similar to first scene control user interface object 614a and second scene control user interface object 614b, accessory user interface objects 614c-614e included in suggested operations region 614 are determined by electronic device 600 to be relevant to the user of electronic device 600. For instance, accessory user interface objects 614c-614e correspond to accessories and/or groups of accessories that are likely to be interacted with via electronic device 600. In some embodiments, electronic device 600 displays accessory user interface objects 614c-614e based on time of day (e.g., a current time is at and/or proximate to (e.g., within 5 minutes, within 10 minutes, within 30 minutes, and/or within 1 hour) times when electronic device 600 and/or an external device detect user inputs causing accessories corresponding to accessory user interface objects 614c-614e to transition between states) and/or based on usage patterns (e.g., electronic device 600 and/or an external device detect user inputs causing accessories corresponding to accessory user interface objects 614c-614e to transition between states most frequently, electronic device 600 and/or an external device have detected user inputs causing accessories corresponding to accessory user interface objects 614c-614e to transition between states recently, and/or electronic device 600 and/or an external device detect user inputs causing accessories corresponding to accessory user interface objects 614c-614e to transition between states at times proximate to (e.g., within 5 minutes, within 10 minutes, within 30 minutes, and/or within 1 hour) a current time). In some embodiments, accessory user interface objects 614c-614e correspond to accessories that are predefined via user selection (e.g., a user has selected particular accessories to be displayed as accessory user interface objects in suggested operations region 614).

Cameras user interface object 620 corresponds to camera accessories that are in communication with electronic device 600 (e.g., camera accessories that have been paired to electronic device 600, camera accessories that have been added to an account (e.g., an account associated with home indicator 610) for which electronic device 600 has authorization, and/or otherwise in communication with electronic device 600 (e.g., via a Bluetooth connection, a Wi-Fi connection, and/or another network connection)). In some embodiments, cameras user interface object 620 corresponds to (e.g., provides access to) all camera accessories that are associated with an account (e.g., an account associated with home indicator 610) and/or all camera accessories that are in communication with electronic device 600. As set forth below, in response to detecting user input (e.g., user input 650c) corresponding to selection of cameras user interface object 620, electronic device 600 displays camera user interface 628.

At FIG. 6C, favorites user interface object 622 corresponds to one or more accessories that have been designated (e.g., via user input) as favorite accessories. In some embodiments, user interface objects corresponding to favorite accessories are displayed in suggested operations region 614. In some embodiments, user interface objects corresponding to favorite accessories are displayed between suggested operations region 614 and cameras user interface object 620. In some embodiments, user interface objects corresponding to favorite accessories are displayed in accessory region 626 of first user interface 608. In response to detecting user input corresponding to selection of favorites user interface object 622, electronic device 600 displays a favorite accessory user interface including one or more user interface objects corresponding to the one or more accessories designated as favorite accessories.

In addition, rooms region 624 includes room user interface objects 624a-624d corresponding to different areas and/or portions of a structure associated with home indicator 610 (e.g., a home, an apartment, an office, and/or another structure). At FIG. 6C, first room user interface object 624a corresponds to a bathroom of the structure. As such, in response to user input selecting first room user interface object 624a, electronic device 600 displays a first room user interface including one or more user interface objects associated with accessories designated as being included within the bathroom of the structure. Similarly, in response to user input selecting one of room user interface object 624b and/or room user interface object 624c, electronic device 600 displays a second room user interface including one or more user interface objects associated with accessories designated as being included within a room corresponding to second room user interface object 624b and/or third room user interface object 624c, respectively.

At FIG. 6C, accessory region 626 includes first camera accessory user interface object 626a, which corresponds to a first camera that is in communication with electronic device 600 (e.g., "Garage" camera) and/or otherwise associated with an account for which electronic device 600 has authorization (e.g., an account associated with home indicator 610). As set forth above, in some embodiments, electronic device 600 displays first camera accessory user interface object 626a in accessory region 626 of first user interface 608 in response to one or more user inputs designating the first camera as a favorite accessory. In some embodiments, electronic device 600 displays first camera accessory user interface object 626a in accessory region 626 of first user interface 608 in accordance with a determination that the first camera satisfies a set of criteria (e.g., the first camera is likely to be interacted with via user input detected by electronic device 600, the first camera is newly in communication with electronic device 600 (e.g., the first camera was recently paired to and/or added to the structure associated with home indicator 610), and/or the first camera detected, via a sensor of the first camera, an event within a threshold time from the current time).

Figure 6E:
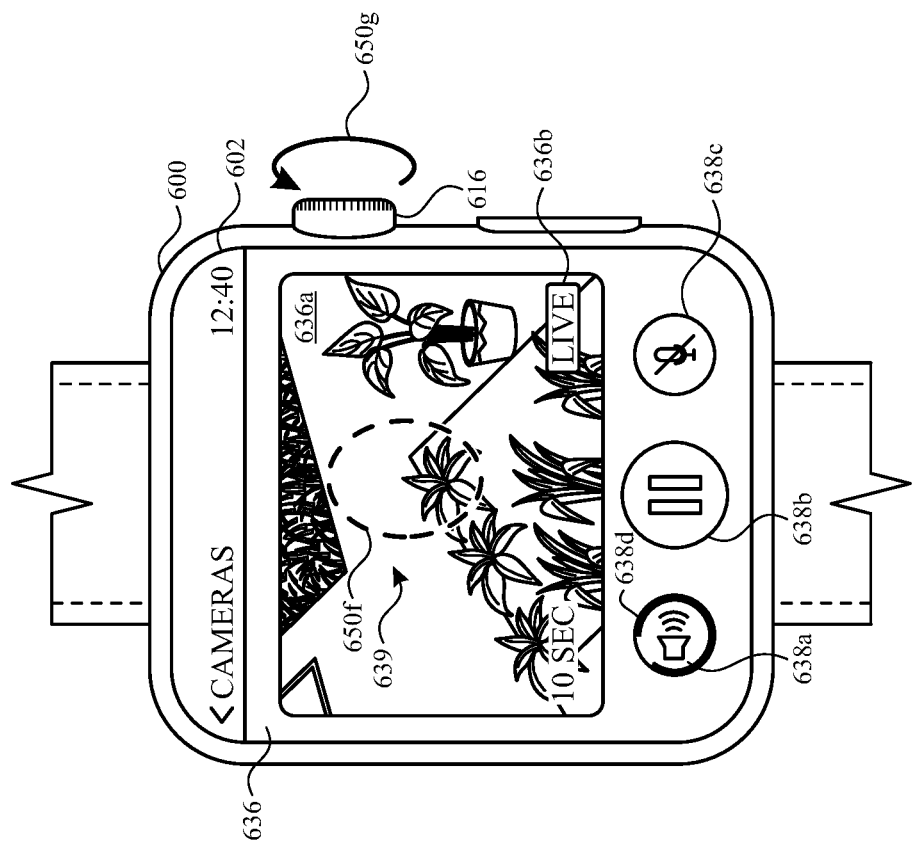
Figure 6D:
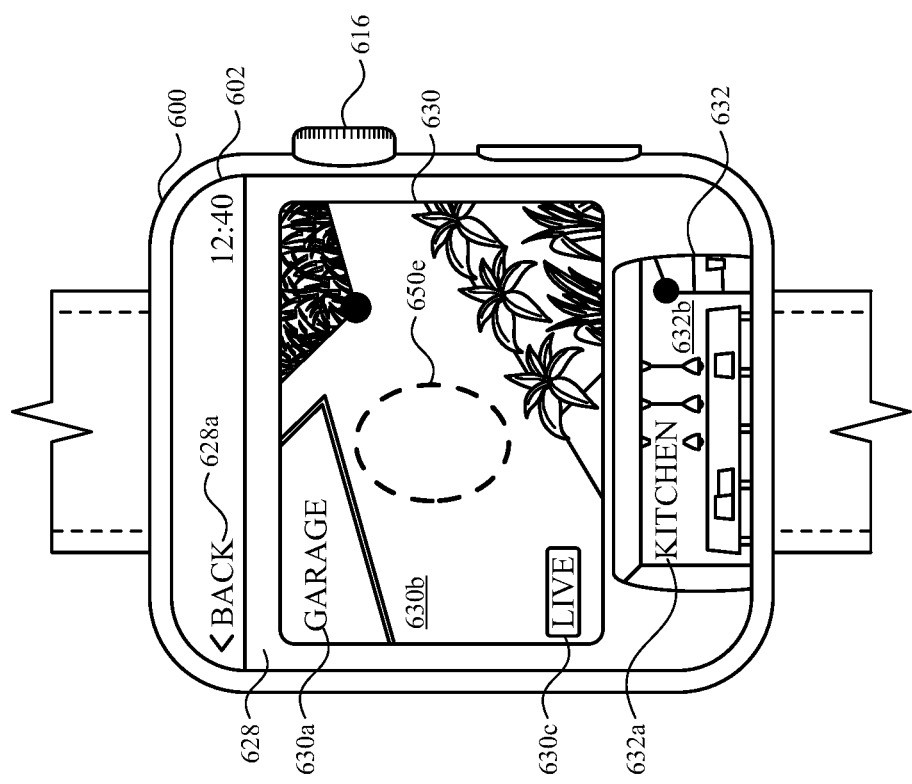

At FIG. 6C, electronic device 600 detects user input 650c (e.g., a tap gesture) corresponding to selection of cameras user interface object 620. In response to detecting user input 650c, electronic device 600 displays camera user interface 628, as shown at FIG. 6D. Alternatively, at FIG. 6C, electronic device 600 detects user input 650d (e.g., a tap gesture) corresponding to first camera user interface object 626a. In response to detecting user input 650d, electronic device 600 displays first camera user interface 636, as shown at FIG. 6E.

At FIG. 6D, camera user interface 628 includes garage camera user interface object 630 (e.g., first camera user interface object 630), kitchen camera user interface object 632 (e.g., second camera user interface object 632), and back user interface object 628a. In response to detecting user input corresponding to back user interface object 628a, electronic device 600 displays first user interface 608 (e.g., and ceases displaying camera user interface 628).

Garage camera user interface object 630 corresponds to the first camera accessory that also corresponds to first camera user interface object 626a. The first camera accessory is a camera accessory positioned proximate to a garage of the structure associated with home indicator 610. In some embodiments, electronic device 600 prompts a user to input an identifier (e.g., "Garage") of an accessory when connecting electronic device 600 to the accessory and/or during a set-up process of the accessory. As such, electronic device 600 displays garage camera user interface object 630 with accessory indicator 630a corresponding to an identifier of the accessory (e.g., a default identifier and/or a user defined identifier). In some embodiments, electronic device 600 prompts a user to select and/or otherwise designate a portion of the structure associated with home identifier 610 (e.g., "Garage") where the accessory (e.g., the first camera accessory) is positioned (or will be positioned). In such embodiments, accessory indicator 630a corresponds to a room and/or area of the structure associated with home identifier 610 that the user selected and/or designated for the first camera accessory.

At FIG. 6D, garage camera user interface object 630 includes visual representation 630b of an image captured via the first camera accessory (e.g., the garage camera). At FIG. 6D, visual representation 630b of the image captured via the first camera accessory is a real-time image (e.g., a snap shot) and/or a real-time video feed (e.g., a series of images) captured via the first camera accessory (e.g., "Garage" camera) as indicated by indicator 630c. In some embodiments, visual representation 630b is a previously captured image and/or a previously captured video feed of the first camera accessory, (e.g., an image and/or video feed corresponding to a time prior to a current time).

Kitchen camera user interface object 632 corresponds to a second camera accessory that is different from the first camera accessory (e.g., a camera different from "Garage" camera, such as "Kitchen" camera). The second camera accessory is a camera accessory positioned proximate to a kitchen of the structure associated with home indicator 610. As set forth above, in some embodiments, electronic device 600 prompts a user to input an identifier (e.g., "Kitchen") of an accessory when connecting electronic device 600 to the accessory and/or during a set-up process of the accessory. As such, electronic device 600 displays kitchen camera user interface object 632 with accessory indicator 632a corresponding to an identifier of the accessory (e.g., a default identifier and/or a user defined identifier). In some embodiments, electronic device 600 prompts a user to select and/or otherwise designate a portion of the structure associated with home identifier 610 (e.g., "Kitchen") where the accessory (e.g., the second camera accessory) is positioned (or will be positioned). In such embodiments, accessory indicator 632a corresponds to a room and/or area of the structure associated with home identifier 610 that the user selected and/or designated for the first camera accessory.

At FIG. 6D, kitchen camera user interface object 632 includes visual representation 632b of an image captured via the first camera accessory (e.g., the garage camera). In some embodiments, visual representation 632b is a real-time image (e.g., a snap shot) and/or a real-time video feed (e.g., a series of images) captured via the second camera accessory (e.g., the "Kitchen" camera). In some embodiments, visual representation 632b is a previously captured image and/or a previously captured video feed of the second camera accessory, (e.g., an image and/or video feed corresponding to a time prior to a current time).

At FIG. 6D, electronic device 600 detects user input 650e (e.g., a tap gesture) corresponding to selection of garage camera user interface object 630. In response to detecting user input 650e, electronic device displays first camera user interface 636, as shown at FIG. 6E. As set forth above, electronic device 600 also displays first camera user interface 636 in response to detecting user input 650d corresponding to selection of first camera user interface object 626a of first user interface 608.

At FIG. 6E, first camera user interface 636 includes visual representation 636a of an image captured via the first camera accessory (e.g., "Garage" camera). Similar to FIG. 6D, visual representation 636a is a real-time (e.g., live) video feed captured via the first camera accessory (e.g., electronic device 600 receives data from the first camera accessory over a network connection and/or via an external device, such as a server), as represented by indicator 636b. Accordingly, a user of electronic device 600 can view a representation of an area of the structure associated with home indicator 610 via electronic device 600.

First camera user interface 636 also includes audio user interface object 638a, playback user interface object 638b, and intercom user interface object 638c, as shown at FIG. 6E. In response to detecting user input corresponding to audio user interface object 638a, electronic device 600 is configured to adjust a volume level of audio output via electronic device 600, where the audio output corresponds to sounds captured via a microphone of the first camera accessory (e.g., electronic device 600 receives data corresponding to the sounds captured via the microphone of the first camera and outputs audio via a speaker of electronic device 600). In some embodiments, electronic device 600 displays audio level indicator 638d (e.g., a border around audio user interface object 638a that indicates a current volume level) in response to detecting user input corresponding to audio user interface object 638a. In such embodiments, electronic device 600 adjusts the audio level in response to additional user input, such as a swipe gesture on display 602 and/or a rotational input on rotatable input mechanism 616, detected while displaying audio level indicator 638d.

In response to detecting a first user input corresponding to playback user interface object 638b, electronic device 600 causes the real-time video feed represented by visual representation 636a to pause (e.g., displays a snapshot and/or still image of the real-time video feed). In some embodiments, after causing the real-time video feed represented by visual representation 636a to pause, electronic device 600 causes the video feed represented by visual representation 636a to resume in response to detecting a second user input corresponding to selection of playback user interface object 638b (e.g., causes the video feed to resume from a time corresponding to the first user input and/or causes the video feed to resume at a current time (e.g., a time after the time corresponding to the first user input)). In some embodiments, visual representation 636a is a snapshot image and not a video feed, such as the real-time video feed. In such embodiments, electronic device 600 does not display playback user interface object 638b and/or displays playback user interface object 638b with an inactive appearance (e.g., a reduced size, a reduced brightness, and/or a grey-scale color scheme) to indicate that playback user interface object 638b cannot be interacted with to cause adjustment of playback of images captured via the first camera accessory.

In response to detecting user input corresponding to intercom user interface object 638c, electronic device 600 prompts a user to speak, such that electronic device 600 transmits data corresponding to audio captured via a microphone of electronic device 600 to the first camera accessory (e.g., to be output via a speaker of the first camera accessory). As such, intercom user interface object 638c enables a user of electronic device 600 to communicate with an entity proximate to the first camera accessory and/or otherwise broadcast audio recorded via the microphone of electronic device 600 over a speaker of the first camera accessory.

Figure 6G:
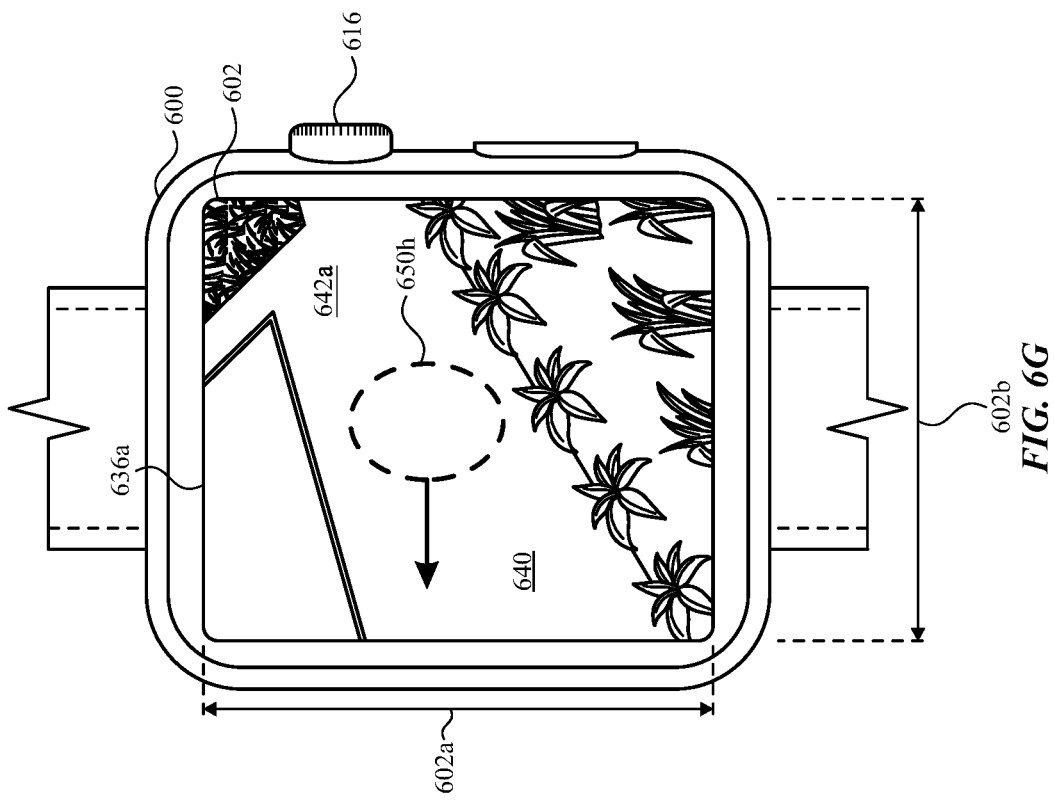
Figure 6F:
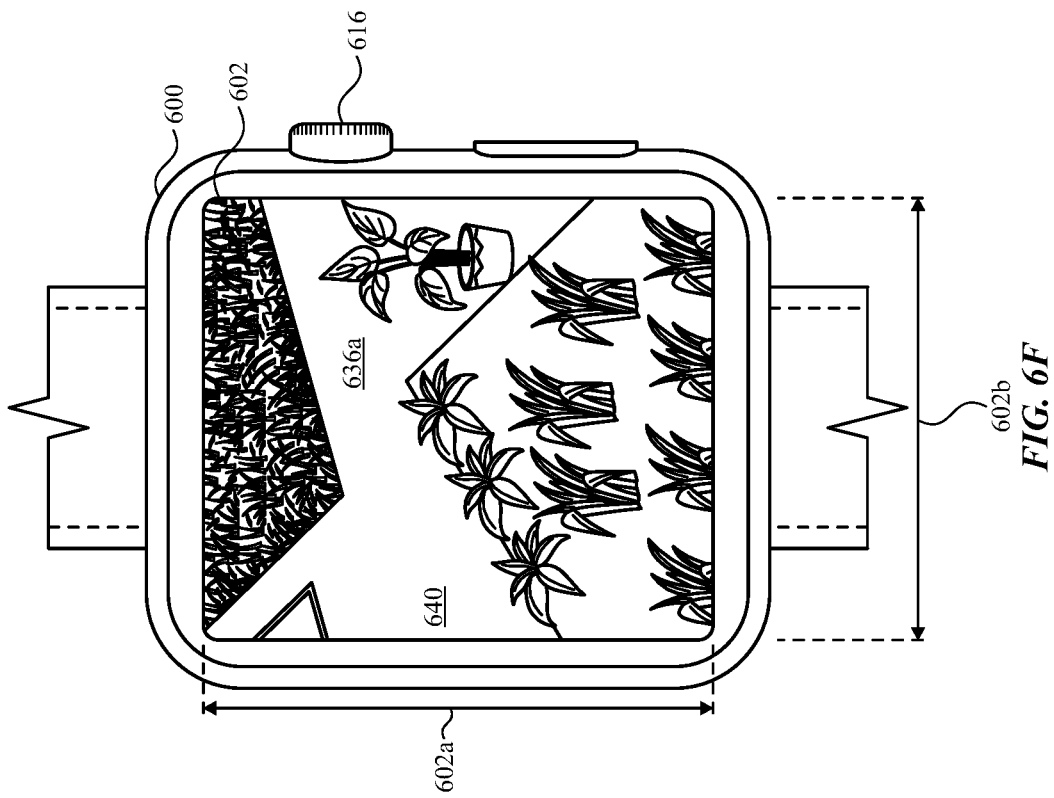
Figure 6I:
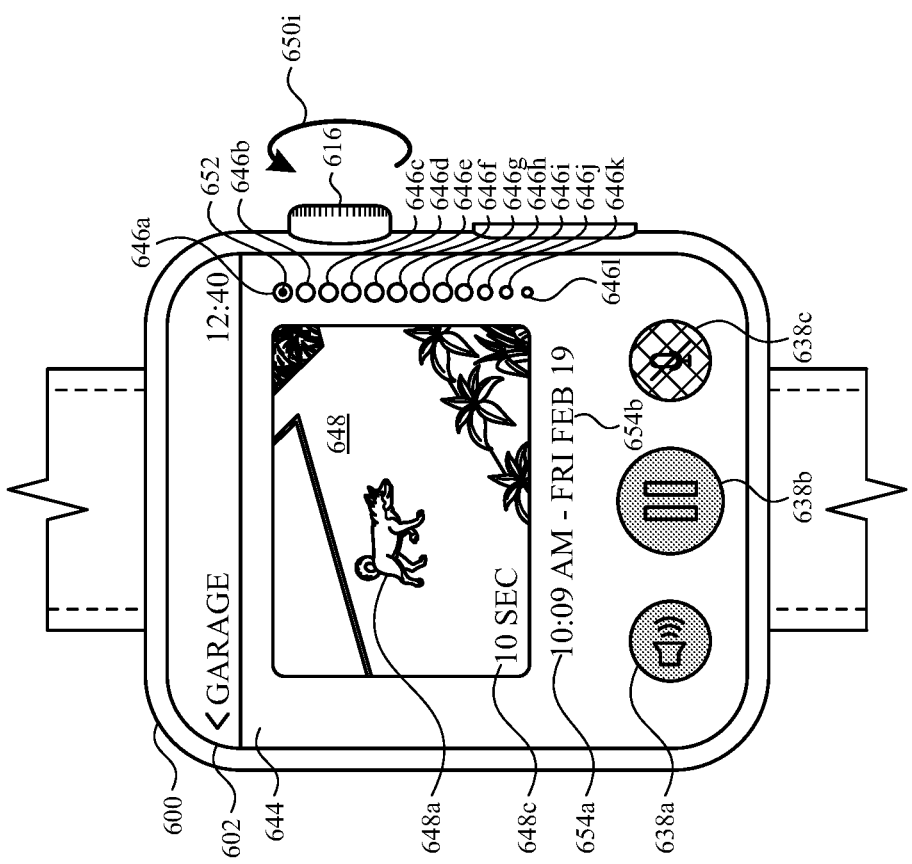

At FIG. 6E, electronic device 600 detects user input 650f (e.g., a tap gesture) at position 639 of display 602 and corresponding to selection of visual representation 636a. In response to detecting user input 650f, electronic device 600 displays visual representation 636a in a full screen mode, as shown at FIG. 6F, and/or displays a portion of visual representation 636a in the full screen mode, as shown at FIG. 6G. Alternatively, at FIG. 6E, electronic device 600 detects user input 650g (e.g., a rotational input) on rotatable input mechanism 616. In response to detecting user input 650g, electronic device displays second camera user interface 644, as shown at FIG. 6I.

In some embodiments, the first camera accessory (e.g., "Garage" camera) includes a first aspect ratio that is scalable and/or able to be resized within an entire display area of display 602. In such embodiments, in response to detecting user input 650f, electronic device 600 displays the entire visual representation 636a in the full screen mode, as shown at FIG. 6F. For instance, at FIG. 6F, visual representation 636a is displayed to cover an entire display area 640 of display 602 (e.g., the full screen mode). Accordingly, electronic device 600 enlarges visual representation 636a and displays visual representation 636a in the full screen mode in response to detecting user input 650f. At FIG. 6F, display area 640 of display 602 includes height 602a (e.g., a height dimension) and width 602b (e.g., a width dimension). In addition, the first aspect ratio of the first camera accessory includes a first height portion and a first width portion. At FIG. 6F, the first height portion of the first aspect ratio is able to be scaled to height 602a (e.g., a dimension of the first height portion of the first aspect ratio is divisible by a dimension of height 602a and/or equal to the dimension of height 602a). Similarly, the first width portion of the first aspect ratio is able to be scaled to width 602b (e.g., a dimension of the first width portion of the first aspect ratio is divisible by a dimension of width 602b and/or equal to the dimension of width 602b). In accordance with a determination that the first aspect ratio is scalable to a size corresponding to display area 640, electronic device 600 displays the entire visual representation 636a in the full screen mode in response to detecting user input 650f.

In contrast, in some embodiments, the first camera accessory (e.g., "Garage" camera) includes a second aspect ratio that is not scalable and/or able to be resized within the entire portion of display area 640 of display 602. In such embodiments, in response to detecting user input 650f, electronic device 600 displays first portion 642a of visual representation 636a in the full screen mode, as shown at FIG. 6G. For instance, at FIG. 6G, first portion 642a of visual representation 636a is displayed to entirely cover display area 640 of display 602 (e.g., the full screen mode). However, first portion 642a of visual representation 636a is less than an entire portion of visual representation 636a (e.g., a second portion (e.g., second portion 642b) of visual representation 636a is not displayed via display 602 of electronic device 600). Accordingly, electronic device 600 enlarges a portion of visual representation 636a and displays first portion 642a of visual representation 636a in the full screen mode in response to detecting user input 650f. In some embodiments, first portion 642a of visual representation 636a corresponds to a portion of visual representation 636a associated with location 639 of user input 650f. In other words, in accordance with a determination that the first camera accessory includes the second aspect ratio, which is not scalable to the entire portion of display portion 640 of display 602, electronic device 600 displays a portion of visual representation 636a that corresponds to location 639 of user input 650f (e.g., a user selects a particular portion of visual representation 636a to enlarge and/or zoom). In some embodiments, in accordance with a determination that the first camera accessory includes the second aspect ratio, electronic device 600 displays a central portion of visual representation 636a in response to detecting user input 650f (e.g., the central portion does not correspond to location 639 of user input 650f).

As set forth above, display area 640 of display 602 includes height 602a (e.g., a height dimension) and width 602b (e.g., a width dimension). In addition, the second aspect ratio of the first camera accessory includes a second height portion and a second width portion. At FIG. 6G, the second height portion of the second aspect ratio is able to be scaled to height 602a (e.g., a dimension of the second height portion of the second aspect ratio is divisible by a dimension of height 602a and/or equal to the dimension of height 602a). However, at FIG. 6G, the second width portion of the second aspect ratio is not able to be scaled to width 602b (e.g., a dimension of the second width portion of the second aspect ratio is not divisible by a dimension of width 602b and/or equal to the dimension of width 602b). Therefore, electronic device 600 cannot display the entire portion of visual representation 636a because the second width portion is not able to be scaled to width 602b and electronic device 600 displays first portion 642a of visual representation 636a (e.g., without displaying a second portion (e.g., second portion 642b) of visual representation 636a).

Figure 6H:
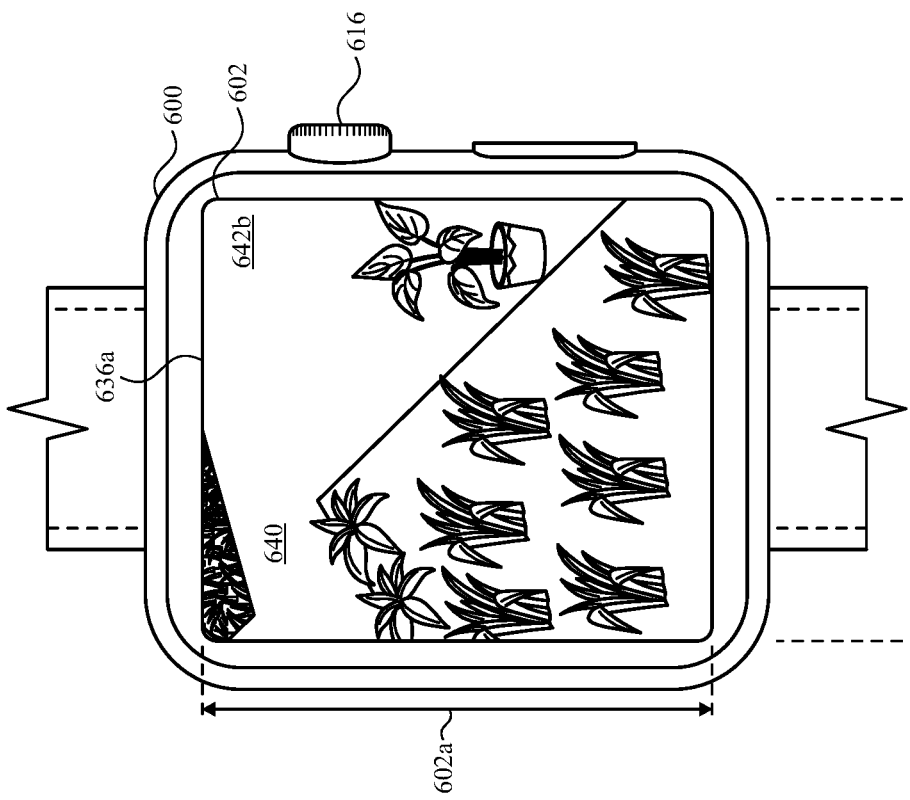

At FIG. 6G, electronic device 600 detects user input 650h (e.g., a swipe gesture on display 602) on first portion 642a of visual representation 636a. In response to detecting user input 650h, electronic device 600 displays second portion 642b of visual representation 636a, where second portion 642b is different from first portion 642a of visual representation 636a, as shown at FIG. 6H. Accordingly, electronic device 600 is configured to pan, translate, and/or otherwise display different portions of visual representation 636a even though the entire portion of visual representation 636a cannot be displayed in the full screen mode (e.g., when the first camera accessory includes the second aspect ratio).

At FIG. 6H, the second height portion of the second aspect ratio is able to be scaled to height 602a (e.g., a dimension of the second height portion of the second aspect ratio is divisible by a dimension of height 602a and/or equal to the dimension of height 602a). However, at FIG. 6H, the second width portion of the second aspect ratio is not able to be scaled to width 602b (e.g., a dimension of the second width portion of the second aspect ratio is not divisible by a dimension of width 602b and/or equal to the dimension of width 602b). Therefore, electronic device 600 cannot display the entire portion of visual representation 636a because the second width portion is not able to be scaled to width 602b and electronic device 600 displays first portion 642b of visual representation 636a (e.g., without displaying a third portion (e.g., first portion 642a) of visual representation 636a).

As set forth above, in response to detecting user input 650g, electronic device 600 displays second camera user interface 644, as shown at FIG. 6I. At FIG. 6I, electronic device 600 displays event indicators 646a-646l on second camera user interface 644. Event indicators 646a-646l correspond to images and/or videos associated with events detected by the first camera accessory. For instance, the first camera accessory can include one or more sensors that detect predefined events, such as a motion detection sensor, a facial recognition sensor, an object detection sensor, and/or an audio sensor (e.g., microphone). The first camera accessory can record and/or store (e.g., in memory of the first camera accessory, in memory of electronic device 600, in memory of a server, and/or in the cloud) images and/or videos in response to detecting the predefined events (e.g., detecting motion, detecting a person, detecting a vehicle, detecting a pet and/or animal, detecting sound, detecting a doorbell, and/or detecting a package). In response to detecting a predefined event, the first camera accessory can record and/or store images and/or videos via the camera of the first camera accessory and transmit data associated with the recorded images and/or videos (e.g., to a server and/or to electronic device 600). Electronic device 600 can receive the data transmitted via the first camera accessory from the first camera accessory and/or indirectly via an external device (e.g., via a server and/or another external device). As such, electronic device 600 can access the data and display representations of the images and/or videos recorded and/or stored by the first camera accessory in response to detecting the predefined event.

At FIG. 6I, event indicators 646a-646l include dots and/or circles displayed adjacent to visual representation 648 of a first event on second camera user interface 644. Accordingly, event indicators 646a-646l themselves do not include a visual representation of the events for which they correspond. In some embodiments, event indicators 646a-646l include other suitable user interface objects, such as other shapes and/or alphanumeric characters.

At FIG. 6I, electronic device 600 displays visual representation 648 corresponding to a first event detected via the first camera accessory. In particular, visual representation 648 includes an image and/or video of the first event detected via the first camera accessory, where the first event is associated with first event indicator 646a of the event indicators 646a-646l. At FIG. 6I, electronic device 600 displays first event indicator 646a with emphasis 652, such as displaying first event indicator 646a with a filled-in portion (e.g., event indicators 646b-646l do not include the filled-in portion), an increased size (e.g., as compared to event indicators 646*b*-646*l*), and/or with a different color than event indicators 646*b*-646*l*. Electronic device 600 displays first event indicator 646*a* with emphasis 652 to indicate that visual representation 648 corresponds to an event represented by first event indicator 646*a* (e.g., and not represented by event indicators 646*b*-646*l*).

At FIG. 6I, the first event detected via the first camera accessory is detection of motion of animal 648*a* and/or detection of animal 648*a*. At FIG. 6I, second camera user interface 644 includes time indicator 654*a* (e.g., 10:09 AM) and date indicator 654*b* (e.g., Fri February 19) corresponding to a respective time and date at which the first event (e.g., motion of animal 648*a* and/or detection of animal 648*a*) was detected via the first camera accessory. Accordingly, a user of electronic device 600 can quickly and easily determine when the first event detected via the first camera accessory occurred.

In addition, second camera user interface 644 includes audio user interface object 638*a*, playback user interface object 638*b*, and intercom user interface object 638*c*. At FIG. 6I, intercom user interface object 638*c* includes an inactive appearance, such as a reduced size (e.g., as compared to audio user interface object 638*a* and/or playback user interface object 638*b*), a reduced brightness (e.g., as compared to audio user interface object 638*a* and/or playback user interface object 638*b*), a grey-scale color scheme, and/or an increased amount of blur. Electronic device 600 displays intercom user interface object 638*c* with the inactive appearance to indicate that intercom user interface object 638*c* cannot be selected to perform an intercom function (e.g., detecting a voice of a user of electronic device 600 and broadcasting the detected voice via a speaker of the first camera accessory). In some embodiment, electronic device 600 displays intercom user interface object 638*c* with the inactive appearance in response to detecting user input 650*g* because second camera user interface 644 does not correspond to a live and/or real-time image and/or video feed of the first camera accessory. In other words, when electronic device 600 displays visual representation 648 of an event that previously occurred (e.g., at a time prior to the current time), electronic device 600 disables the intercom function because the user cannot view a live and/or real-time image captured via the first camera accessory (e.g., the user cannot determine whether an entity is proximate to the first camera accessory, and thus, that broadcasting the voice of the user via the microphone of the first camera accessory would be heard by an entity).

At FIG. 6I, audio user interface object 638*a* and playback user interface object 638*b* include an active appearance, such as an increased size (e.g., as compared to intercom user interface object 638*c*), an increased brightness (e.g., as compared to intercom user interface object 638*c*), a non-grey-scale color scheme, and/or a reduced amount of blur. As such, electronic device 600 indicates that audio user interface object 638*a* and playback user interface object 638*b* are active and enabled for selection (e.g., to perform the respective functions of audio user interface object 638*a* and playback user interface object 638*b*). At FIG. 6I, visual representation 648 is a video as indicated by indicator 648*c* (e.g., 10 sec). In some embodiments, electronic device 600 causes playback of the video in response to detecting user input 650*g*, such that visual representation 648 includes a sequence of images captured via the first camera accessory. In some embodiments, in response to detecting user input 650*g*, electronic device 600 displays visual representation 648 as a snapshot of an image of the video represented by visual representation 648 (e.g., a first image in a sequence of images that form the video). In such embodiments, electronic device 600 begins playback of the video represented by visual representation 648 in response to user input (e.g., user input corresponding to selection of visual representation 648 and/or user input corresponding to selection of playback user interface object 638*b*).

When electronic device 600 is causing playback of the video represented by video representation 648, in response to detecting user input corresponding to selection of audio user interface object 638*a*, electronic device 600 is configured to adjust a volume of audio (e.g., output via a speaker of electronic device 600 and/or an external device in communication with electronic device 600) associated with the video (e.g., in response to additional user input, such as a swipe gesture on a volume slider and/or a rotational input detected via rotatable input mechanism 616). Similarly, when electronic device 600 is causing playback of the video represented by video representation 648, in response to detecting user input corresponding to selection of playback user interface object 638*b*, electronic device 600 pauses the video and displays visual representation 648 as a snapshot of the video (e.g., a snapshot at a time corresponding to a time when electronic device 600 detects the user input corresponding to selection of playback user interface object 638*b*).

In some embodiments, visual representation 648 is not a video, but instead includes one or more images (e.g., one or more still images and/or one or more snapshots) captured via the first camera accessory. In such embodiments, electronic device 600 also displays audio user interface object 638*a* and/or playback user interface object 638*b* with the inactive appearance (e.g., instead of the active appearance).

At FIG. 6I, electronic device 600 detects user input 650*i* (e.g., a rotational input) via rotatable input mechanism 616. In response to detecting user input 650*i*, electronic device 600 displays second camera user interface 644 with visual representation 656, as shown at FIG. 6J.

Figure 6J:
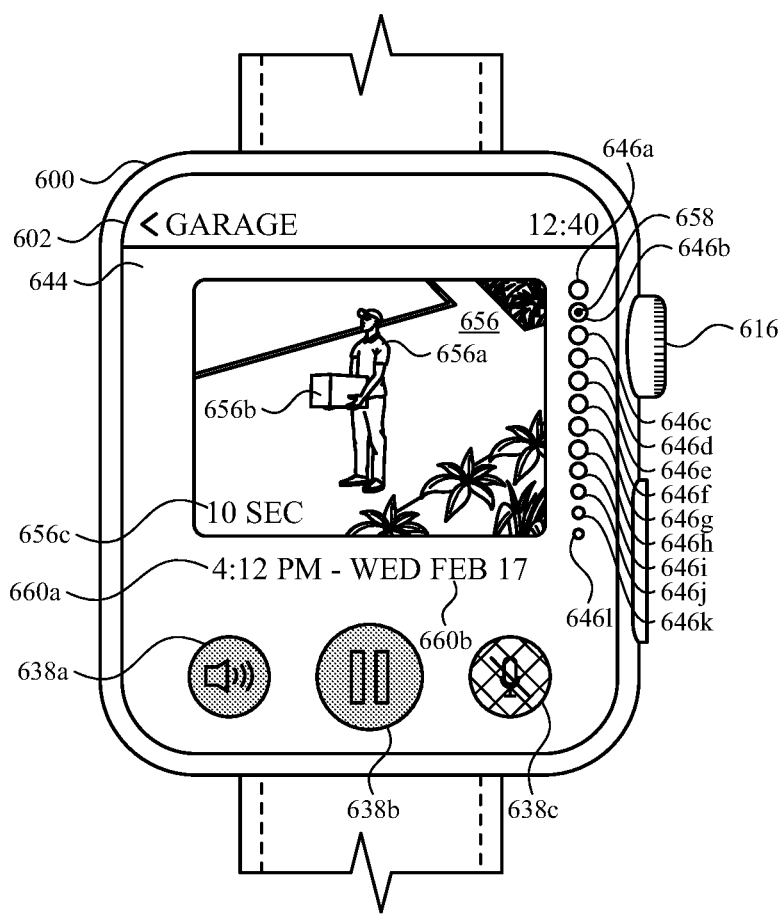

At FIG. 6J, visual representation 656 includes an image and/or video of a second event detected via the first camera accessory. Visual representation 656 corresponds to second event indicator 646*b* of the event indicators 646*a*-646*l*. In particular, at FIG. 6J, electronic device 600 displays second event indicator 646*b* with emphasis 658, such as displaying second event indicator 646*b* with a filled-in portion (e.g., event indicators 646*a* and 646*c*-646*l* do not include the filled-in portion), an increased size (e.g., as compared to event indicators 646*a* and 646*c*-646*l*), and/or with a different color than event indicators 646*a* and 646*c*-646*l*. Electronic device 600 displays second event indicator 646*b* with emphasis 658 to indicate that visual representation 656 corresponds to an event represented by second event indicator 646*b* (e.g., and not represented by event indicators 646*a* and 646*c*-646*l*).

At FIG. 6J, the second event detected via the first camera accessory is detection of motion of person 656*a*, detection of person 656*a*, and/or detection of package 656*b*. At FIG. 6J, second camera user interface 644 includes time indicator 660*a* (e.g., 4:12 PM) and date indicator 660*b* (e.g., Wed February 19) corresponding to a respective time and date at which the second event was detected via the first camera accessory. Accordingly, a user of electronic device 600 can quickly and easily determine when the second event detected via the first camera accessory occurred.

At FIG. 6J, the second event detected via the first camera accessory occurred at a time before the first event detected via the first camera accessory. Thus, at FIGS. 6I and 6J, electronic device 600 displays event indicators 646*a*-646*l* in chronological order from the most recent event (e.g., the first event associated with first event indicator 646a) to the least recent event (e.g., the event associated with event indicator 646l) with respect to a current time (e.g., 12:40 pm on Friday, February 19$^{th}$). In some embodiments, electronic device 600 displays event indicators 646a-646l in chronological order from the least recent event to the most recent event. In some embodiments, electronic device 600 displays event indicators 646a-646l based on a type of event (e.g., doorbell detection events are displayed before motion detection events). In some embodiments, electronic device 600 displays event indicators 646a-646l based whether a visual representation associated with the event is a video or an image.

In addition, second camera user interface 644 includes audio user interface object 638a, playback user interface object 638b, and intercom user interface object 638c. At FIG. 6J, visual representation 656 corresponds to a video as indicated by indicator 656c. As such, audio user interface object 638a and playback user interface object 638b include the active appearance, while intercom user interface object 638c includes the inactive appearance.

While FIGS. 6I and 6J correspond to events detected via the first camera accessory, in some embodiments, event indicators 646a-646l can correspond to events detected by other camera accessories, different from the first camera accessory. In such embodiments, second camera user interface 644 enables a user to view visual representations of events detected by one or more camera accessories that are in communication with electronic device 600.

FIG. 7 is a flow diagram illustrating a method for displaying images corresponding to events detected by one or more camera accessories using a computer system in accordance with some embodiments. Method 700 is performed at a computer system (e.g., 100, 300, 500, 600) (e.g., an electronic device; a smart device, such as a smartphone or a smartwatch; a mobile device; a wearable device) that is in communication with a display generation component and a rotatable input mechanism (e.g., 616) (e.g., a digital crown; ISE the rotatable input mechanism is further depressible). Some operations in method 700 are, optionally, combined, the orders of some operations are, optionally, changed, and some operations are, optionally, omitted.

As described below, method 700 provides an intuitive way for displaying images corresponding to events detected by one or more camera accessories. The method reduces the cognitive burden on a user for accessing images corresponding to events detected by the one or more camera accessories, thereby creating a more efficient human-machine interface. For battery-operated computing devices, enabling a user to access images corresponding to events detected by the one or more camera accessories faster and more efficiently conserves power and increases the time between battery charges.

While displaying, via the display generation component, a camera user interface (e.g., 636 and/or 644) (e.g., a user interface of an application of the computer system (e.g., a home application) including visual representations of one or more images captured by one or more cameras that are in communication with the computer system), the computer system (e.g., 600) concurrently displays (702), via the display generation component (e.g., 602), a first image (704) (e.g., 636a, 648, and/or 656) captured via a first camera that is in communication with the computer system (e.g., 600) (e.g., a real-time image captured via the first camera, a real-time video feed captured via the first camera, and/or a previous image and/or series of images captured via the first camera, where the first camera is in communication with the computer system (e.g., the first camera is connected to the same network as the computer system, the computer system has been authorized to view images captured via the first camera, the first camera has been added to an account for which the computer system has access and/or authorization, and/or the computer system and the first camera are in communication with one another via a short-range communication connection (e.g., a Bluetooth connection, a Wi-Fi connection, and/or a Zigbee connection))) and a plurality of event indicators (706) (e.g., 646a-646l) (e.g., a plurality of visual representations, such as dots, squares, circles, rectangles, and/or other suitable shapes, corresponding to one or more events detected by the first camera and/or other cameras in communication with the computer system, the plurality of event indicators are displayed adjacent to the first image captured via the first camera, and/or the plurality of event indicators are displayed so that the plurality of event indicators do not overlap with and/or otherwise obstruct the first image captured via the first camera).

While concurrently displaying the first image (e.g., 636a, 648, and/or 656) captured via the first camera and the plurality of event indicators (e.g., 646a-646l), the computer system (e.g., 600) detects (706), via the rotatable input mechanism (e.g., 616), a first user input (e.g., 650g and/or 650i) (e.g., a rotational input).

In response to detecting the first user input (e.g., 650g and/or 650i) via the rotatable input mechanism (e.g., 616), the computer system (e.g., 600) replaces (708) display of the first image (e.g., 636a and/or 648) captured via the first camera with display of a second image (e.g., 648 and/or 656) captured via the first camera (e.g., the computer system ceases displaying the first image of the first camera and displays the second image of the first camera in place of the first image of the first camera). The second image (e.g., 648 and/or 656) of the first camera corresponds a first event indicator (e.g., 646a and/or 646b) of the plurality of event indicators (e.g., 646a-646l), and the second image (e.g., 648 and/or 656) captured via the first camera corresponds to one or more images captured via the first camera at a first time prior to a current time (e.g., the second image of the first camera corresponds to a previously captured image and/or series of images that are saved in memory of the computer system and/or an external memory (e.g., a cloud, a server, and/or memory of an external computer system)).

In some embodiments, the second image (e.g., 648 and/or 656) of the first camera corresponds to an event detected via a sensor of the first camera, such as a motion sensor, sound sensor, a doorbell sensor, and/or a facial recognition sensor. In some embodiments, the event detected via the sensor of the first camera includes motion detection, detection of a package delivery, detection of a person, detection of a doorbell associated with the first camera ringing, and/or a detection of a car.

In some embodiments, in response to detecting the input via the rotatable input mechanism, the computer system (e.g., 600) updates the plurality of event indicators (e.g., 646a-646l). For instance, the computer system (e.g., 600) emphasizes (e.g., 652 and/or 658) the first event indicator (e.g., 646a and/or 646b) of the plurality of event indicators (e.g., 646a-646l) to indicate that the second image (e.g., 648 and/or 656) captured via the first camera corresponds to the first event indicator (e.g., 646a and/or 646b) of the plurality of event indicators (e.g., 646a-646l). In addition, the computer system (e.g., 600) can move and/or adjust a position of the plurality of event indicators (e.g., 646a-646l) in response to detecting the input (e.g., 650g and/or 650i) to indicate that other images corresponding to the remaining event indicators of the plurality of event indicators (e.g., 646a-646l) can be viewed in response to additional inputs (e.g., rotational inputs on the rotatable input mechanism).

Replacing display of the first image captured via the camera with display of the second image captured via the camera in response to detecting the first user input via the rotatable input mechanism enables a user to view previously captured images from the first camera without navigating away from the camera user interface to another user interface and/or another application. Reducing the number of inputs need to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) replaces display of the first image (e.g., 636a and/or 648) captured via the first camera with display of the second image (e.g., 648 and/or 656) captured via the first camera and displays, via the display generation component (e.g., 602) and concurrently with the second image (e.g., 648 and/or 656) captured via the first camera, a time indicator (e.g., 654a, 654b, 660a, and/or 660b) (e.g., a time stamp that includes a time of day, a date, a month, and/or a year; the time indicator is positioned adjacent to the second image captured via the first camera such that the time indicator does not overlap with and/or partially overlap with the second image captured via the first camera) corresponding to the first time prior to the current time.

Displaying the time indicator concurrently with the second image captured via the first camera provides improved feedback related to when the second image was captured via the first camera. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the computer system (e.g., 600) concurrently displays the second image (e.g., 648) captured via the first camera and the plurality of event indicators (e.g., 646a-646l), the computer system (e.g., 600) detects, via the rotatable input mechanism (e.g., 616), a second user input (e.g., 650i) (e.g., a rotational input). In response to detecting the second user input (e.g., 650i) via the rotatable input mechanism (e.g., 616), the computer system (e.g., 600) replaces display of the second image (e.g., 648) captured via the first camera with display of a third image (e.g., 656) captured via the first camera (e.g., the computer system ceases displaying the second image captured via the first camera and displays the third image captured via the first camera in place of the second image of the first camera). The third image (e.g., 656) of the first camera corresponds a second event indicator (e.g., 646b), different from the first event indicator (e.g., 646a), of the plurality of event indicators (e.g., 646a-646l), and the third image (e.g., 656) captured via the first camera corresponds to one or more images captured via the first camera at a second time, different from the first time, prior to the current time (e.g., the third image captured via the first camera corresponds to a previously captured image and/or series of images that are saved in memory of the computer system and/or an external memory (e.g., a cloud, a server, and/or memory of an external computer system)).

Replacing display of the second image captured via the camera with display of the third image captured via the camera in response to detecting the second user input via the rotatable input mechanism enables a user to view previously captured images from the first camera without navigating away from the camera user interface to another user interface and/or another application. Reducing the number of inputs need to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to the computer system (e.g., 600) displaying the camera user interface (e.g., 636 and/or 644), the computer system (e.g., 600) displays, via the display generation component (e.g., 602), a home user interface (e.g., 608) (e.g., a default user interface that is displayed in response to launching an application that includes the camera user interface) that includes a first camera user interface object (e.g., 626a) corresponding to the first camera (e.g., a tile and/or platter displayed on the home user interface that corresponds to the first camera and/or the tile and/or platter displayed on the home user interface does not correspond to other cameras that are different from the first camera). While the computer system (e.g., 600) displays the home user interface (e.g., 608) that includes the first camera user interface object (e.g., 626a) corresponding to the first camera, the computer system (e.g., 600) detects a third user input (e.g., 650d) (e.g., a tap gesture and/or a press gesture) corresponding to selection of the first camera user interface object (e.g., 626a) corresponding to the first camera. In response to detecting the third user input (e.g., 650d) corresponding to selection of the first camera user interface object (e.g., 626a) corresponding to the first camera, the computer system (e.g., 600) displays, via the display generation component (e.g., 602), the camera user interface (e.g., 636 and/or 644) (e.g., a user of the computer system can navigate to the camera user interface from the home user interface via the first camera user interface object).

Displaying the camera user interface in response to detecting the third user input corresponding to selection of the first camera user interface object reduces a number of inputs needed for a user to navigate to the camera user interface from a home user interface of an application. Reducing the number of inputs need to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to the computer system (e.g., 600) displaying the camera user interface (e.g., 636 and/or 644), the computer system (e.g., 600) displays, via the display generation component (e.g., 602), a home user interface (e.g., 608) (e.g., a default user interface that is displayed in response to launching an application that includes the camera user interface) that includes a second camera user interface object (e.g., 620) (e.g., a tile and/or platter displayed on the home user interface that corresponds to a group of cameras that are in communication with the computer system, where the group of cameras include the first camera). While the computer system (e.g., 600) displays the home user interface (e.g., 608) that includes the second camera user interface object (e.g., 620), the computer system (e.g., 600) detects a fourth user input (e.g., 650*c*) (e.g., a tap gesture and/or a press gesture) corresponding to selection of the second camera user interface object (e.g., 620). In response to detecting the fourth user input (e.g., 650*c*) corresponding to selection of the second camera user interface object (e.g., 620), the computer system (e.g., 600) displays a second camera user interface (e.g., 628) (e.g., a user interface that includes a plurality of user interface objects corresponding to respective cameras of the group of cameras that are in communication with the computer system) that includes a third camera user interface object (e.g., 630) corresponding to the first camera (e.g., a tile and/or platter displayed on the third camera user interface that corresponds to the first camera and/or the tile and/or platter displayed on the third camera user interface does not correspond to other cameras, different from the first camera, that are part of the group of cameras that are in communication with the computer system). While the computer system (e.g., 600) displays the second camera user interface (e.g., 628) that includes the third camera user interface object (e.g., 630) corresponding to the first camera, the computer system (e.g., 600) detects a fifth user input (e.g., 650*e*) (e.g., a tap gesture and/or a press gesture) corresponding to selection of the third camera user interface object (e.g., 63) corresponding to the first camera. In response to detecting the fifth user input (e.g., 650*e*) corresponding to selection of the third camera user interface object (e.g., 630) corresponding to the first camera, the computer system (e.g., 600) displays, via the display generation component (e.g., 602), the camera user interface (e.g., 636 and/or 644) (e.g., the user of computer system can navigate to the camera user interface object via the home user interface by selecting a user interface object that corresponds to a group of cameras and then selecting a user interface object that corresponds to the first camera).

Displaying the camera user interface in response to detecting the fifth user input corresponding to selection of the third camera user interface object provides the user with multiple different options for navigating to the camera user interface, thereby improving a flexibility of the device. Improving a flexibility of the device enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of event indicators (e.g., 646*a*-646*l*) correspond to respective events detected by the first camera (e.g., the first camera includes one or more sensors, such as a motion detection sensor and/or a facial detection sensor, that enable the first camera to detect motion, people, objects, cars, and/or animals), and the respective events occurred prior to the current time (e.g., the plurality of event indicators correspond to events that were detected via the first camera in the past (e.g., not real-time and/or currently detected events)).

In some embodiments, the respective events are selected from the group consisting of: a motion detection event (e.g., motion of an object, device, person, and/or animal detected within a field of view of the first camera), a person detection event (e.g., a persona and/or identity of a person that is detected within the field of view of the camera), an object detection event (e.g., an object was moved into and/or placed into the field of view of the camera), an animal detection event (e.g., a pet and/or other animal was present within the field of view of the camera), an audio detection event (e.g., audio detected via a microphone of the camera) and a vehicle detection event (e.g., a vehicle and/or transportation device (e.g., a bicycle) moved into a field of view of the camera (e.g., temporarily and/or for a predefined period of time)).

In some embodiments, the plurality of event indicators (e.g., 646*a*-646*l*) are arranged in chronological order based on respective times at which the respective events were detected by the first camera (e.g., the plurality of event indicators are arranged from the most current to the least current and/or from the least current to the most current based on a time at which the respective events were recorded/detected via the first camera).

Arranging the plurality of event indicators in chronological order provides improved feedback to the user when searching for a particular event. In addition, arranging the plurality of event indicators in chronological order enables a user to find a particular event more quickly and efficiently, thereby reducing a number of inputs needed to find the particular event. Providing improved feedback and reducing the number of inputs need to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of event indicators (e.g., 646*a*-646*l*) do not include a visual indication of an image captured via the first camera (e.g., the plurality of event indicators include graphical user interface objects (e.g., dots, circles, squares, and/or other suitable shapes) that do not include a visual representation of an image corresponding the respective events detected via the first camera).

In some embodiments, the computer system (e.g., 600) concurrently displays the first image (e.g., 636*a* and/or 648) captured via the first camera and the plurality of event indicators (e.g., 646*a*-646*l*) and the computer system (e.g., 600) displays, concurrently with the first image (e.g., 636*a* and/or 648) captured via the first camera and the plurality of event indicators (e.g., 646*a*-646*l*), a first control user interface object (e.g., 638*a*, 638*b*, and/or 638*c*) (e.g., a volume control user interface object, a playback control user interface object (e.g., a play button and/or a pause button), and/or an intercom control user interface object (e.g., a user interface object that, when selected via user input, enables a user to speak into a microphone and project audio from a speaker of the first camera)) and a second control user interface object (e.g., 638*a*, 638*b*, and/or 638*c*) (e.g., a volume control user interface object, a playback control user interface object (e.g., a play button and/or a pause button), and/or an intercom control user interface object (e.g., a user interface object that, when selected via user input, enables a user to speak into a microphone and project audio from a speaker of the first camera)). The first control user interface object (e.g., 638*a*, 638*b*, and/or 638*c*) and the second control user interface object (e.g., 638*a*, 638*b*, and/or 638*c*) have a first appearance (e.g., an active appearance, such as a normal and/or full brightness, a non-greyscale color scheme, and/or another visual indication that the first and second control user interface objects can be selected to perform a respective function). In response to detecting the first user input (e.g., 650g and/or 650i) via the rotatable input mechanism (e.g., 616), the computer system (e.g., 600) displays, via the display generation component (e.g., 602) the first control user interface object (e.g., 638a, 638b, and/or 638c) with the first appearance (e.g., the first control user interface object maintains the first appearance and/or the active appearance) and the second control user interface object (e.g., 638a, 638b, and/or 638c) with a second appearance (e.g., an inactive appearance, such as reduced brightness, a greyscale color scheme, and/or another visual indication that the second control user interface object cannot be selected to perform a respective function), different from the first appearance.

Displaying the second control user interface object with the second appearance in response to detecting the first user input provides improved feedback to the user as to a status of the second control user interface object and whether the second control user interface object can be interacted with by the user. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 700 (e.g., FIG. 7) are also applicable in an analogous manner to the methods described below. For example, methods 800 and 1000 optionally includes one or more of the characteristics of the various methods described above with reference to method 700. For example, the computer system of method 700 can be used for displaying an image captured via a camera accessory in a full screen mode and/or for causing a group of accessories to transition between states. For brevity, these details are not repeated below.

FIG. 8 is a flow diagram illustrating a method for displaying an image captured by a camera accessory in a full screen mode using a computer system in accordance with some embodiments. Method 800 is performed at a computer system (e.g., 100, 300, 500, 600) (e.g., an electronic device; a smart device, such as a smartphone or a smartwatch; a mobile device; a wearable device) that is in communication with a display generation component and one or more input devices (e.g., 602, 616) (e.g., a touch-sensitive display, such as a touch screen, one or more physical buttons, such as depressible buttons incorporated into a housing of the computer system, and/or a digital crown). Some operations in method 800 are, optionally, combined, the orders of some operations are, optionally, changed, and some operations are, optionally, omitted.

As described below, method 800 provides an intuitive way for displaying an image captured via a camera accessory in a full screen mode. The method reduces the cognitive burden on a user for viewing an image captured via a camera accessory in a full screen mode, thereby creating a more efficient human-machine interface. For battery-operated computing devices, enabling a user to view an image captured via a camera accessory in a full screen mode faster and more efficiently conserves power and increases the time between battery charges.

While displaying, via the display generation component (e.g., 602), a camera user interface (e.g., 636) of a first application (e.g., a user interface associated with a particular camera that is paired to and/or otherwise in communication with the computer system), the camera user interface (e.g., 636) including an image (e.g., 636a) (e.g., a real-time image, a real-time video feed, and/or an image previously captured at a time prior to a current time) captured via a camera (e.g., a camera paired and/or otherwise in communication with the computer system), the computer system (e.g., 600) detects (802), via the one or more input devices (e.g., 602 and/or 616), a first user input (e.g., 650f) (e.g., a tap gesture and/or a press gesture) corresponding to the image (e.g., 636a) captured via the camera.

In response to detecting the first user input (704) (e.g., 650f) and in accordance with a determination that the image (e.g., 636a) captured via the camera satisfies a first set of criteria (e.g., the image captured via the camera has a landscape aspect ratio (e.g., 16 units by 9 units) and/or the image captured via the camera has an aspect ratio that does not fit within and/or scale to an aspect ratio of an entire display area of the display generation component (e.g., 4 units by 5 units)), the first set of criteria including a criterion that is met when the image (e.g., 636a) captured via the camera includes a first aspect ratio (e.g., a landscape aspect ratio (e.g., 16 units by 9 units) and/or an aspect ratio that does not fit within and/or scale to an aspect ratio of an entire display area of the display generation component (e.g., 4 units by 5 units)), the computer system (e.g., 600) displays (706), via the display generation component (e.g., 602), a first portion (e.g., 642a) (e.g., a portion of the image captured via the camera that is less than an entire portion of the image captured via the camera, a portion of the image captured via the camera that does not include at least a second portion of the image captured via the camera, a portion of the image captured via the camera that includes an entire height of the image captured via the camera but not an entire width of the image captured via the camera, and/or a portion of the image captured via the camera that corresponds to the user input) of the image (e.g., 636a) captured via the camera in a full screen mode (e.g., displaying the first portion of the image captured via the camera within an entire display area of the display generation component). The first portion of the image (e.g., 642a) is less than the entire image (e.g., 636a) captured via the camera (e.g., a second portion of the image, different from the first portion of the image, is not displayed in response to detecting the first user input).

In response to detecting the first user input (704) (e.g., 650f) and in accordance with a determination that the image captured via the camera does not satisfy the first set of criteria (e.g., the image captured via the camera includes an aspect ratio that fits within and/or can be scaled to an aspect ratio of an entire display area of the display generation component), the computer system (e.g., 600) displays (708), via the display generation component (e.g., 602), the entire image (e.g., 636a) (e.g., no portion of the image captured via the camera is not displayed, all portions of the image captured via the camera are displayed, the image captured via the camera is not cropped) captured via the camera in the full screen mode (e.g., the entire image captured via the camera is displayed within the entire display area of the display generation component).

Displaying the first portion of the image captured via the camera in the full screen mode or displaying the entire image captured via the camera in the full screen mode in response to detecting the first user input provides additional controls for enlarging the image captured via the camera without cluttering the user interface with additional controls. Providing additional control options without cluttering the user interface with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the computer system (e.g., 600) displays the first portion (e.g., 642a) of the image (e.g., 636a) captured via the camera in the full screen mode, the computer system (e.g., 600) detects, via the one or more input devices (e.g., 602), a second user input (e.g., 650h) (e.g., a swipe gesture and/or a tap and drag gesture) corresponding to the first portion (e.g., 642a) of the image (e.g., 636a). In response to detecting the second user input (e.g., 650h) corresponding to the first portion (e.g., 642a) of the image (e.g., 636a), the computer system (e.g., 600) translates the first portion (e.g., 642a) of the image (e.g., 636a) (e.g., moving the first portion of the image) so that a second portion (e.g., 642b) of the image (e.g., 636a) (e.g., a portion of the image captured via the camera that is different from the first portion of the image captured via the camera, a portion of the image that includes at least a first part of the first portion of the image but not a second part of the first portion of the image, a portion of the image that includes at least some part of the image captured via the camera that is not included in the first portion of the image), different from the first portion (e.g., 642a) of the image (e.g., 636a), replaces display of the first portion (e.g., 642a) of the image (e.g., 636a) (e.g., fully replaces display of the first portion of the image and/or partially replaces display of the first portion of the image).

Translating the first portion of the image so that the second portion of the image replaces display of the first portion of the image provides additional controls for enlarging and/or viewing the image captured via the camera without cluttering the user interface with additional controls. Providing additional control options without cluttering the user interface with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first portion (e.g., 642a) of the image (e.g., 636a) corresponds to a location (e.g., 639) of the first user input (e.g., 650f) (e.g., the first user input is detected at a location on the image captured via the camera and the first portion of the image corresponds to the location on the image captured via the camera, the first portion of the image does not include a second portion of the image captured via the camera is at a location different from the location of the first user input).

Displaying the first portion of the image as a portion of the image captured via the camera corresponding to a location of the first user input reduces a number of inputs needed by the user to view a particular portion of the image captured via the camera. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first portion (e.g., 642a) of the image (e.g., 636a) is displayed in the full screen mode with a first dimension (e.g., a height dimension) that is maximized (e.g., the first dimension of the first portion of the image is the same as the first dimension of the entire image captured via the camera). A second dimension of the image (e.g., a width dimension), different from the first dimension, is not maximized and/or is reduced when compared to the entire image (e.g., 636a) captured via the camera (e.g., the second dimension of the first portion of the image is less than the second dimension of the entire image captured via the camera, such that a second portion of the image is not displayed).

In some embodiments, the image (e.g., 636a) captured via the camera is a real-time image (e.g., a snapshot) captured via the camera. In other words, the image (e.g., 636a) captured via the camera was captured at a time that is the current time and/or shortly before (e.g., less than 1 second, less than 2 seconds, and/or less than 5 seconds from) the current time.

In some embodiments, the computer system (e.g., 600) displays the camera user interface (e.g., 636) of the first application and the computer system (e.g., 600) concurrently displays a volume control user interface object (e.g., 638a) (e.g., a user interface object that, when selected via user input, initiates a process to adjust a volume (e.g., increase and/or decrease the volume) of audio that is detected via a microphone of the camera and played back through a speaker of the computer system), an intercom user interface object (e.g., 638c) (e.g., a user interface object that, when selected via user input, initiates a process to detect audio via a microphone of the computer system and playback the detected audio via a speaker of the camera), and a playback user interface object (e.g., 638b) (e.g., a user interface object that, when selected via user input, causes a video feed (e.g., a real-time video feed and/or a previously recorded video feed) of the camera to be paused and/or resumed).

In some embodiments, in response to detecting the first user input (e.g., 650f), the computer system (e.g., 600) ceases display of at least one of the volume control user interface object (e.g., 638a), the intercom user interface object (e.g., 638c), and the playback user interface object (e.g., 638b) (e.g., ceasing to display the volume control user interface object, the intercom user interface object, and/or the playback user interface object to enable the first portion of the image captured via the camera or the entire image captured via the camera to be displayed on an entire display area of the display generation component of computer system).

Note that details of the processes described above with respect to method 800 (e.g., FIG. 8) are also applicable in an analogous manner to the methods described above/below. For example, methods 700 and 1000 optionally includes one or more of the characteristics of the various methods described above with reference to method 800. For example, the computer system of method 800 can be used for displaying images corresponding to events detected by one or more camera accessories and/or for causing a group of accessories to transition between states. For brevity, these details are not repeated below.

FIGS. 9A-9L illustrate exemplary user interfaces for displaying status indicators associated with one or more accessories, in accordance with some embodiments. The user interfaces in these figures are used to illustrate the processes described below, including the processes in FIG. 10.

FIGS. 9A-9L include diagram 900, illustrating a physical structure and an exemplary set of devices, in accordance with some embodiments. At FIGS. 9A-9L, diagram 900 is provided for a more complete understanding, but is not part of the user interfaces displayed via electronic device 600.

Diagram 900 includes home 902 and a set of devices. The set of devices include garage door 904 (e.g., garage door actuator that is configured to adjust a position of a garage door), bedroom fan 906, dining room fan 908, front door 910 (e.g., an actuator that is configured to adjust a lock mechanism of front door 910), temperature control device 912 (e.g., a thermostat), living room speakers 914, hallway chandelier 916a, living room light 916b, dining room light 916c, and bedroom light 916d. As set forth below, electronic device 600 displays user interfaces that provide statuses for one or more devices of the set of devices as well as user interfaces that include user interface objects that enable electronic device 600 to control a state (e.g., on/off, locked, unlocked, open/closed, position, brightness level, color temperature, volume level, temperature level, and/or speed level) of one or more devices of the set of devices.

At FIGS. 9A-9L, home 902 includes kitchen 902a, dining room 902b, bedroom 902c, living room 902d, sunroom 902e, and garage 902f. Kitchen 902a is in the upper left portion of home 902 and dining room 902b is between kitchen 902a and bedroom 902c, where bedroom 902c is to the right of dining room 902b. Garage 902f is in a top portion of home 902 above dining room 902b and bedroom 902c (e.g., a portion of bedroom 902c). Living room 902d is in the bottom left portion of home 902 and sunroom 902e is in the bottom right portion of home 902. In some embodiments, home 902 includes other rooms than those depicted in FIGS. 9A-9L and/or excludes rooms that are depicted in FIGS. 9A-9L. While diagram 900 depicts a home, it should be recognized that this is merely an example and techniques described herein can work with other types of physical structures, such as an office building, a hotel, an apartment, etc.

At FIGS. 9A-9L, garage door 904 is included in garage 902f. Bedroom fan 906 and bedroom light 916d are included in bedroom 902c. Dining room fan 908 and dining room light 916c are included in dining room 902a. Front door 910 and hallway chandelier 916a are included in an area of home 902 between living room 902d and sunroom 902e (e.g., a hallway and/or foyer). Temperature control device 912, living room speakers 914, and living room light 916b are included in living room 902d. In some embodiments, each device of the set of devices are assigned to (e.g., designated to) a room in which it is included. For example, living room speakers 914 and living room light 916b are assigned to (e.g., programmatically mapped to a group that corresponds to) living room 902d. In some embodiments, a respective device of the set of devices cannot be assigned to two different rooms of home 902. Further, in some embodiments, each group of devices that correspond to each room are also assigned to home 902. Thus, devices that are mapped to a room of home 902 are also concurrently mapped to home 902.

In some embodiments, each of the devices of the set of devices are smart devices that are directly connected to each other or indirectly connected to each other via one or more networks (e.g., wireless networks (e.g., Bluetooth, NFC, Wi-Fi, 4G, etc.)). In some embodiments, each of the devices of the set of devices are directly connected to electronic device 600 and/or are indirectly connected to electronic device 600 via one or more networks (e.g., wireless networks (e.g., Bluetooth, NFC, Wi-Fi, 4G, etc.)).

FIG. 9A illustrates electronic device 600 displaying, via display 602, first user interface 608. As set forth above, first user interface 608 includes home indicator 610 (e.g., "Jackson St."), status indicator region 612 including status indicators 612a, 612b, and 612d-612f, and suggested operations region 614 including first scene user interface object 614a and second scene user interface object 614b. In some embodiments, electronic device 600 displays first user interface 608 as a default user interface and/or a home user interface in response to user input requesting to launch the first application (e.g., user input 650a corresponding to selection of first application user interface object 606a, as shown at FIG. 6A).

At FIG. 9A, electronic device 600 displays status indicators 612a, 612b, and 612d-612f in status indicator region 612 in response to detecting that an accessory and/or a group of accessories are in a predefined state (e.g., an active state, such as an on state, an open state, an unlocked state, and/or an activated state). At FIG. 9A, status indicator region 612 includes five status indicators and does not include status indicator 612c. As such, status indicator region 612 of first user interface 608 at FIG. 9A includes display of more than three status indicators. As set forth below, status indicator region 612 can include display of up to six status indicators. In response to detecting that more than six accessories and/or groups of accessories are in the predefined state, electronic device 600 displays status indicator 612c (e.g., as shown at FIG. 9C).

First status indicator 612a visually indicates that two lighting accessories (e.g., devices) in communication with electronic device 600 are in the predefined state (e.g., an on state and/or turned on). At FIG. 9A, diagram 900 illustrates that hallway chandelier 916a and bedroom light 916d are in an on state, whereas living room light 916b and dining room light 916c are in an off state (e.g., as represented by a slash through indicators associated with living room light 916b and dining room light 916c, respectively). Accordingly, first status indicator 612a includes accessory indicator 918 (e.g., the number "2") indicating the number of lighting accessories associated with first status indicator 612a (e.g., the number of lighting accessories that are currently in the predefined state). As set forth below, electronic device 600 is configured to cause adjustment of the state of the accessories associated with first status indicator 612a in response to one or more user inputs.

In addition, second status indicator 612b visually indicates that temperature control device 912 is in the predefined state (e.g., an on state and/or temperature control device 912 is causing a temperature control system (e.g., a heating, air conditioning, and/or ventilation system) of home 902 to adjust a temperature within home 902 and/or a portion of home 902 to 75 degrees Fahrenheit). Second status indicator 612b includes mode indicator 920 (e.g., a down arrow) indicating that temperature control device 912 is currently in a cooling mode while in the on state. In some embodiments, mode indicator 920 can also indicate that temperature control device 912 is in a heating mode (e.g., an up arrow) and/or a ventilation mode (e.g., a fan icon).

Third status indicator 612d visually indicates that a sensor of home 902 (e.g., a camera accessory and/or motion sensor) detected a person and/or movement. Fourth status indicator 612e visually indicates that electronic device 600 is currently having issues with an account associated with home 902, such as electronic device 900 not being currently logged into the account associated with home 902 or electronic device 600 having issues connecting to one or more devices of home 902. Fifth status indicator 612f visually indicates that dining room fan 908 is in the predefined state (e.g., an on state and/or a state where power is being supplied to cause dining room fan 908 to operate (e.g., spin and/or otherwise direct a flow of air)).

As such, status indicators 612*a*, 612*b*. and 612*d*-612*f* provide information to a user of electronic device 600 related to states of devices that are associated with home 902. Electronic device 600 removes display of status indicators 612*a*, 612*b*, and 612*d*-612*f* in response to detecting that accessories represented by status indicators 612*a*, 612*b*, and 612*d*-612*f* are no longer in the predefined state (e.g., an inactive state and/or a non-error state). Further, electronic device 600 displays additional status indicators in status indicator region 612 in response to detecting that additional accessories associated with home 902 are in the predefined state (e.g., an additional accessory and/or device of home 902 is adjusted to an active state via manual adjustment by a person and/or adjustment caused via electronic device 600 and/or another electronic device).

At FIG. 9A, electronic device 600 displays suggested operations region 614 after (e.g., below) status indicator region 612. As set forth above, in some embodiments, electronic device 600 displays first scene user interface object 614*a* and second user interface object 614*b* based on a time of day (e.g., a first control scheme corresponding to first scene control user interface object 614*a* and a second control scheme corresponding to second scene control user interface object 614*b* include identifiers and/or information associated with a particular time of day) and/or based on usage patterns (e.g., a first control scheme corresponding to first scene control user interface object 614*a* and a second control scheme corresponding to second scene control user interface object 614*b* are frequently used and/or activated, frequently used and/or activated at a particular time of day, and/or recently used and/or activated). As such, electronic device 600 determines that the first control scheme associated with first scene user interface object 614*a* and the second control scheme associated with second scene user interface object 614*b* are likely to be interacted with and/or used by a user. Electronic device 600 therefore displays first scene control user interface object 614*a* and second scene control user interface object 614*b* in suggested operations region 614, which is positioned toward a top portion of first user interface 608, because first scene control user interface object 614*a* and second scene control user interface object 614*b* are likely to be selected by the user of electronic device 600.

Figure 9B:
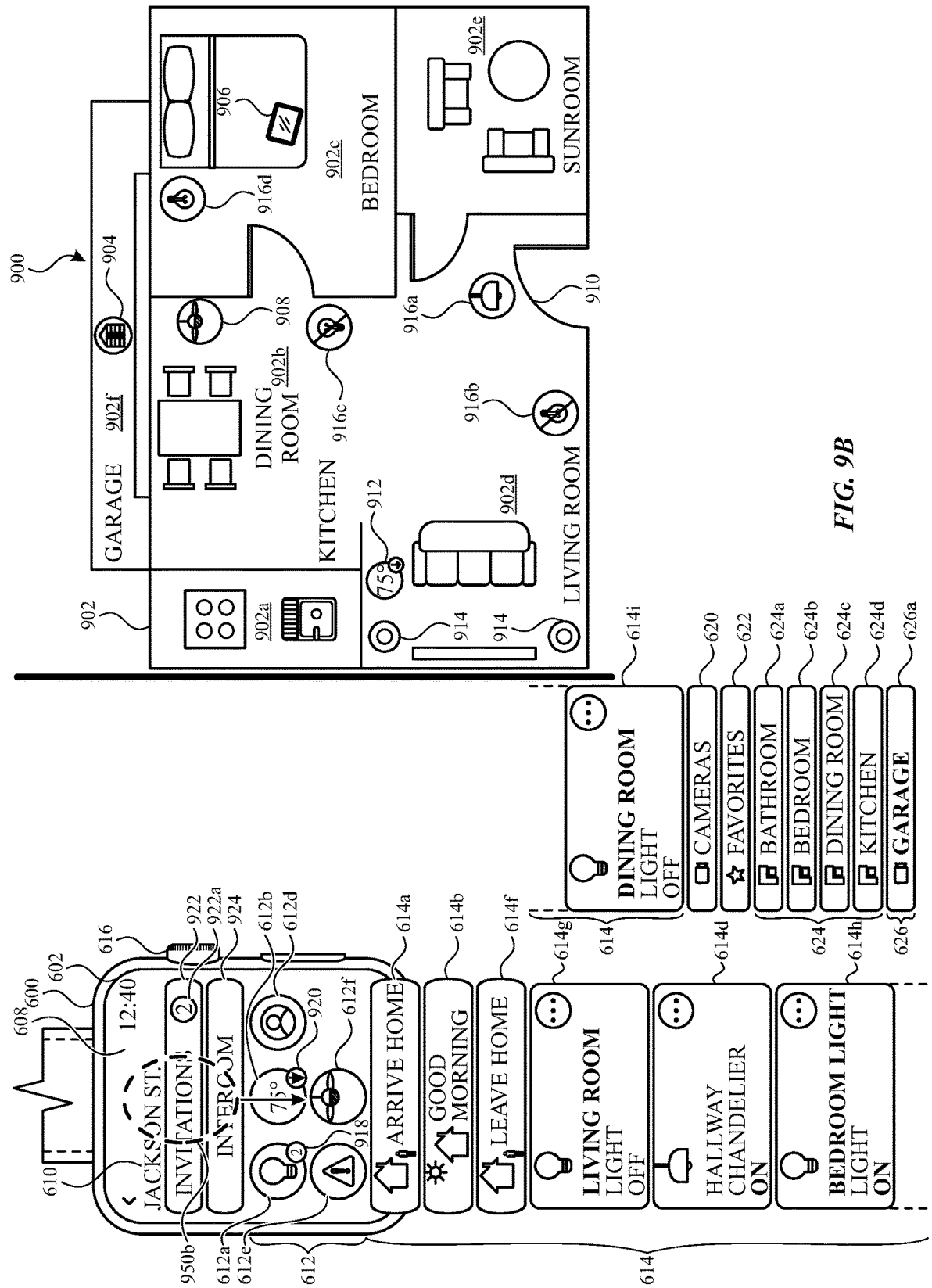

At FIG. 9A, electronic device 600 detects user input 950*a* (e.g., a swipe gesture and/or a rotational gesture detected via rotational input mechanism 616). In response to detecting user input 950*a*, electronic device 600 translates first user interface 608 to display additional user interface objects and regions of first user interface 608, as shown at FIG. 9B.

At FIG. 9B, electronic device 600 displays first user interface 608 including status indicator region 612 and suggested operations region 614. Suggested operations region 614 includes first scene user interface object 614*a*, second scene user interface object 614*b*, third scene user interface object 614*f*, and accessory user interface objects 614*d* and 614*g*-614*i*. In addition, at FIG. 9B, first user interface 608 includes invitations user interface object 922, intercom user interface object 924, cameras user interface object 620, favorites user interface object 622, rooms region 624 including room user interface objects 624*a*-624*d*, and accessory region 626 including first camera accessory user interface object 626*a*.

At FIG. 9B, invitations user interface object 922 corresponds to one or more invitations an account associated with the user of electronic device 600 received to provide authorization for electronic device 600 to control devices and/or accessories of one or more structures (e.g., one or more structures different from home 902). Invitations user interface object 922 includes invitations indicator 922*a* (e.g., the number two) corresponding to a number of invitations in which the account associated with the user of electronic device 600 received. In response to detecting user input corresponding to invitations user interface object 922, electronic device 600 enables a user to accept and/or decline the invitations (e.g., authorize electronic device 600 to cause control of devices associated with one or more other structures and/or decline authorization for electronic device 600 to cause control of devices associated with one or more structures). In some embodiments, when electronic device 600 detects that no invitations have been received and/or that all invitations have been accepted and/or declined, electronic device 600 ceases display of invitations user interface object 922 and/or otherwise does not display invitations user interface object 922.

Intercom user interface object 924 corresponds to a broadcast function of electronic device 600. For instance, in response to detecting user input corresponding to intercom user interface object 924, electronic device 600 prompts a user to speak and/or otherwise provide audio. In response to detecting audio, via a microphone of electronic device 600, electronic device 600 transmits data corresponding to the detected audio and causes one or more devices and/or accessories (e.g., speakers and/or devices that include speakers of home 902) to output audio corresponding to the detected audio. As such, a user can communicate with entities within home 902 via the broadcast function corresponding to intercom user interface object 924.

As set forth above, scene control user interface objects 614*a*, 614*b*, and 614*f*, as well as accessory user interface objects 614*d* and 614*g*-614*i*, included in suggested operations region 614 are displayed based on a determination by electronic device 600 that the corresponding scenes, accessories, and/or groups of accessories are relevant to the user of electronic device 600 (e.g., based on a time of day and/or usage patterns of electronic device 600 and/or one or more other electronic devices).

Cameras user interface object 620 corresponds to camera accessories that are in communication with electronic device 600 (e.g., camera accessories that have been paired to electronic device 600, camera accessories that have been added to an account for which electronic device 600 has authorization, and/or otherwise in communication with electronic device 600 (e.g., via a Bluetooth connection, a Wi-Fi connection, and/or another network connection)). Favorites user interface object 622 corresponds to one or more accessories that have been designated (e.g., via user input) as favorite accessories. In addition, rooms region 624 includes room user interface objects 624*a*-624*d* corresponding to different areas and/or portions of home 902. Accessory region 626 includes first camera accessory user interface object 626*a*, which corresponds to a first camera that is in communication with electronic device 600 (e.g., "Garage" camera). As set forth above, in some embodiments, electronic device 600 displays first camera accessory user interface object 626*a* in accessory region 626 of first user interface 608 in response to one or more user inputs designating the first camera as a favorite accessory. In some embodiments, electronic device 600 displays first camera accessory user interface object 626*a* in accessory region 626 of first user interface 608 in accordance with a determination that the first camera satisfies a set of criteria (e.g., the first camera is likely to be interacted with via user input detected by electronic device 600, the first camera is newly in communication with electronic device 600 (e.g., the first camera was recently paired to and/or added to the structure associated with home indicator 610), and/or the first camera detected, via a sensor of the first camera, an event within a threshold time from the current time).

At FIG. 9B, electronic device 600*d* detects user input 950*b* (e.g., a swipe gesture and/or a rotational gesture detected via rotational input mechanism 616). In response to detecting user input 950*b*, electronic device 600 displays status indicator region 612 and suggested operations region 614 of first user interface 608, as shown at FIG. 9C. In addition, at FIG. 9B, electronic device detects that garage door 904 has been adjusted from a closed state (e.g., as indicated by diagram 900 at FIG. 9B) to an open state (e.g., as indicated by diagram 900 at FIG. 9C), that front door 910 has been adjusted from a locked state to an unlocked state (e.g., as indicated by diagram 900 at FIG. 9C), and that living room speakers 914 have been adjusted from an off state to an on state (e.g., as indicated by diagram 900 at FIG. 9C).

At FIG. 9C, status indicator region 612 includes status indicator 612*c* (e.g., adjacent to fifth status indicator 612*f*) indicating that more than six accessories and/or groups of accessories are in the predefined state (e.g., an active state (e.g., on, open, unlocked, and/or activated) and/or an error state). As set forth above, electronic device 600 detects that garage door 904 is open, front door 910 is unlocked, and living room speakers 914 are on. At FIG. 9C, electronic device 900 determines that garage door 904, front door 910, and living room speakers 914 are in the predefined state, which causes electronic device 600 to generate a status indicator associated with garage door 904, front door 910, and living room speakers 914. Therefore, eight accessories and/or groups of accessories are determined to be in the predefined state at FIG. 9C. However, because electronic device 600 is configured to display up to six status indicators in status indicator region 612, electronic device 600 maintains display of status indicators 612*a*, 612*b*, and 612*d*-612*f* and displays status indicator 612*c* to indicate that additional accessories and/or groups of accessories are in the predefined state (e.g., and that electronic device 600 is not configured to display the additional status indicators corresponding to the additional accessories and/or groups of accessories that are in the predefined state).

In some embodiments, electronic device 600 arranges status indicators displayed in status indicator region 612 based on a length of time at which each accessory and/or group of accessories corresponding to respective status indicators have been in the predefined state (e.g., status indicators corresponding to accessories and/or groups of accessories that have been in the predefined state for longer amounts of time are displayed in status indicator region 612 (and/or first in status indicator region 612), whereas status indicators corresponding to accessories and/or groups of accessories that have been in the predefined state for shorter amounts of time are associated with status indicator 612*c* (and/or displayed at lesser priority positions in status indicator region 612)). In some embodiments, electronic device 600 arranges status indicators displayed in status indicator region 612 based on a type of accessory for which the status indicators correspond. For instance, electronic device 600 can display status indicators corresponding to accessories of a first type (e.g., alarms and/or security accessories) before (e.g., in status indicator region 610 and/or at higher priority positions in status indicator region 612) status indicators corresponding to accessories of a second type (e.g., non-security related accessories). In some embodiments, electronic device 600 arranges status indicators displayed in status indicator region 612 based on the predefined states of the respective accessories and/or groups of accessories corresponding to the status indicators. For instance, an accessory and/or group of accessories can include more than one predefined state that, when detected by electronic device 600, causes electronic device to generate a status indicator. As such, electronic device 600 can determine that a first predefined state of a first accessory is a higher priority than a second predefined state of a second accessory and display a status indicator corresponding to the first accessory in status indicator region 612 and display status indicator 612*c* representing the status indicator for the second accessory.

At FIG. 9C, electronic device 600 detects user input 950*c* (e.g., a tap gesture) corresponding to selection of first status indicator 612*a*. In response to detecting user input 950*c*, electronic device 600 displays lighting accessory user interface 926, as shown at FIG. 9D. Alternatively, electronic device 600 detects user input 950*d* (e.g., a tap gesture) corresponding to selection of status indicator 612*c*. In response to detecting user input 950*d*, electronic device 600 displays accessories user interface 934, as shown at FIG. 9H.

At FIG. 9D, electronic device 600 displays lighting accessory user interface 926, which corresponds to first status indicator 612*a*. In particular, lighting accessory user interface 926 includes first lighting accessory user interface object 926*a* corresponding to hallway chandelier 916*a* and second lighting accessory user interface object 926*b* corresponding to bedroom light 916*d*. As set forth above and as represented by diagram 900 at FIG. 9D, hallway chandelier 916*a* and bedroom light 916*d* are in the on state, and thus, lighting accessory user interface 926 includes lighting accessory user interface objects 926*a* and 926*b* corresponding to hallway chandelier 916*a* and bedroom light 916*d*. In contrast, living room light 916*b* and dining room light 916*c* are in the off state (e.g., as represented by slashes through living room light 916*b* and dining room light 916*c* in diagram 900) and lighting accessory user interface 926 does not include lighting accessory user interface objects for living room light 916*b* and dining room light 916*c* (e.g., because living room light 916*b* and dining room light 916*c* are not in the predefined state).

Electronic device 600 is configured to cause hallway chandelier 916*a* and/or bedroom light 916*d* to adjust from the on state to the off state in response to one or more user inputs corresponding to lighting accessory user interface 926. In some instances, such as when a user of electronic device 600 is leaving home 902, the user of electronic device 600 wishes to turn off all lighting accessories associated with home 902. In some instances, the user of electronic device 600 wishes to turn off and/or otherwise adjust a state of a particular lighting accessory associated with home 902. Lighting accessory user interface 926 includes selectable options for both turning off all lighting accessories associated with home 902 and for adjusting a state of a particular lighting accessory associated with home 902.

For instance, at FIG. 9D, when the user of electronic device 600 wishes to turn off all lighting accessories associated with home 902, electronic device 600 detects user input 950*e* corresponding to selection of all off user interface object 926*c* of lighting accessory user interface 926. In response to detecting user input 950*e* (e.g., a tap gesture), electronic device 600 displays state adjustment user interface 928, as shown at FIG. 9E. In some embodiments, lighting accessory user interface 926 does not include all off user interface object 926*c*. In such embodiments, when the user of electronic device 600 wishes to turn off all lighting accessories associated with home 902, electronic device 600 initiates a process to adjust all lighting accessories associated with home 902 to the off state (and, optionally, displays state adjustment user interface 928, as shown at FIG. 9E) in response to detecting user input 950*f* (e.g., a rotational input) detected via rotatable input mechanism 616.

Alternatively, when the user of electronic device 600 wishes to adjust a state of a particular lighting accessory associated with home 902 (e.g., hallway chandelier 916*a*), electronic device 600 detects user input 950*g* (e.g., a tap gesture) corresponding to control user interface object 930*a* of first lighting accessory user interface object 926*a*. In response to detecting user input 950*g*, electronic device displays hallway chandelier user interface 932, as shown at FIG. 9G. Similarly, in some embodiments, electronic device 600 displays bedroom light user interface in response to detecting user input corresponding to selection of control user interface object 930*b* of second lighting accessory user interface object 926*b*, where bedroom light user interface enables electronic device 600 to cause adjustments to a state of bedroom light 916*d* independently of other lighting accessories.

At FIG. 9E, electronic device 600 displays state adjustment user interface 928, which includes state adjustment user interface object 928*a* in an on position 928*b*. As set forth above, state adjustment user interface 928 enables electronic device 600 to transition both hallway chandelier 916*a* and bedroom light 916*d* (and, in some embodiments, additional lighting accessories that are in the on state) from the on state to the off state. At FIG. 9E, electronic device detects user input 950*h* (e.g., a swipe gesture corresponding to state adjustment user interface object 928*a* and/or a rotational input detected via rotatable input mechanism 616 (in some embodiments, a continuation of user input 950*f*)). In response to detecting user input 950*h*, electronic device 600 causes hallway chandelier 916*a* and bedroom light 916*d* to transition from the on state to the off state, as shown at FIG. 9F.

At FIG. 9F, electronic device 600 displays state adjustment user interface 928, which includes state adjustment user interface object 928*a* in an off position 928*c*. In addition, diagram 900 illustrates that hallway chandelier 916*a* and bedroom light 916*d* are in the off state, as represented by slashes through hallway chandelier 916*a* and bedroom light 916*d* on diagram 900. Accordingly, electronic device 600 causes multiple lighting accessories to transition between states in response to detecting user input 950*h*. Electronic device 600 thus facilitates a user's ability to cause multiple accessories (e.g., lighting accessories and/or another group of accessories) to transition between different states with a reduced number of user inputs.

Alternatively, at FIG. 9G, electronic device 600 displays hallway chandelier user interface 932 in response to detecting user input 950*g*. At FIG. 9G, diagram 900 illustrates that hallway chandelier 916*a* and bedroom light 916*d* are in the on state (e.g., as represented by no slash through hallway chandelier 916*a* and bedroom light 916*d* in diagram 900). Hallway chandelier user interface 932 includes brightness user interface object 932*a*, first control indicator 932*b*, and second control indicator 932*c*. Second control indicator 932*c* corresponds to a first portion of hallway chandelier user interface 932 that enables electronic device 600 to cause adjustments of a brightness level of hallway chandelier 916*a*. At FIG. 9G, second control indicator 932*c* is emphasized (e.g., an increased size) when compared to first control indicator 932*b* (e.g., a reduced size) indicating that a user can control other states of hallway chandelier 916*a*. For instance, in response to detecting user input, such as a swipe gesture, electronic device 600 displays a second portion of hallway chandelier user interface 932 that enables electronic device 600 to cause control of a second function and/or state of hallway chandelier 916*a* (e.g., cause hallway chandelier 916*a* to transition between the on state and the off state, cause hallway chandelier 916*a* to transition from a first color temperature to a second color temperature, and/or cause hallway chandelier 916*a* to operate in the on state for a predefined period of time).

In response to detecting user input corresponding to brightness user interface object 932*a*, electronic device 600 is configured to cause hallway chandelier 916*a* to adjust a brightness level of (e.g., an amount of light intensity output by) hallway chandelier 916*a*. For instance, in response to detecting a swipe up gesture and/or a clockwise rotational input on rotatable input mechanism 616, electronic device 600 causes hallway chandelier 916*a* to transition to an increased brightness level (e.g., a brightness level above 32%). Similarly, in response to detecting a swipe down gesture and/or a counter-clockwise rotational input on rotatable input mechanism 616, electronic device 600 causes hallway chandelier 916*b* to transition to a reduced brightness level (e.g., a brightness level below 32%). At FIG. 9G, electronic device 600 causes adjustments to hallway chandelier 916*a*, but no other lighting accessories and/or devices of home 902. Thus, hallway chandelier user interface 932 enables electronic device 600 to cause individual adjustment of hallway chandelier 916*a*, whereas state adjustment user interface 928 enables electronic device 600 to cause adjustment of multiple accessories and/or devices of home 902.

As set forth above, in response to detecting user input 950*d*, electronic device 600 displays accessories user interface 934, as shown at FIG. 9H. At FIG. 9H, accessories user interface 934 includes garage door user interface object 934*a*, front door user interface object 934*b*, and living room speakers user interface object 934*c*. As set forth above, electronic device 600 detects that garage door 904 is open, front door 910 is unlocked, and living room speakers 914 are on (e.g., garage door 904, front door 910, and living room speakers 914 are in the predefined state), and thus, generates status indicators corresponding to garage door 904, front door 910, and living room speakers 914, respectively. However, because electronic device 600 displays up to six status indicators in status indicator region 612 of first user interface 608, status indicators for garage door 904, front door 910, and living room speakers 914 are represented by status indicator 612*c*. As such, in response to detecting user input (e.g., user input 950*d*) corresponding to selection of status indicator 612*c*, electronic device 600 displays accessories user interface 934 that includes garage door user interface object 934*a*, front door user interface object 934*b*, and living room speakers user interface object 934*c*, which correspond to the generated status indicators for garage door 904, front door 910, and living room speakers 914, respectively. When electronic device 600 displays three or fewer status indicators in status indicator region 612, electronic device 600 displays status indicators corresponding to garage door 904, front door 910, and living room speakers 914, respectively (e.g., instead of representing status indicators for garage door 904, front door 910, and living room speakers 914 via status indicator 912*c*).

In some embodiments, electronic device 600 is configured to cause garage door 904 to transition from the open state to the closed state in response to detecting user input corresponding to garage door user interface object 934*a* (e.g., while displaying accessories user interface 934). Similarly, in some embodiments, electronic device 600 is configured to cause front door 910 to transition from the unlocked state to the locked state in response to detecting user input corresponding to front door user interface object 934b (e.g., while displaying accessories user interface 934). Further, in some embodiments, electronic device 600 is configured to cause living room speakers 914 to transition from the on state to the off state (or, optionally, cause an adjustment of a volume level of living room speakers 914) in response to (and/or after) detecting user input corresponding to living room speakers user interface object 934c (e.g., while displaying accessories user interface 934).

At FIG. 9H, electronic device 600 detects user input 950i (e.g., a tap gesture) corresponding to selection of home user interface object 934d of accessories user interface 934. In response to detecting user input 950i, electronic device 600 displays first user interface 608, as shown at FIG. 9I. In addition, prior to and/or while detecting user input 950i, electronic device 600 detects that hallway chandelier 916a and bedroom light 916d have been adjusted from the on state to the off state (e.g., via manual adjustment and/or via user input 950h).

As such, at FIG. 9I, electronic device 600 ceases displaying first status indicator 612a corresponding to hallway chandelier 916a and bedroom light 916d. At FIG. 9I, electronic device 600 detects that hallway chandelier 916a and bedroom light 916d are no longer in the predefined state (e.g., the on state) and replaces first status indicator 612a with sixth status indicator 612g corresponding to garage door 904 (e.g., sixth status indicator 612g indicates that garage door 904 is in the predefined state (e.g., an open state)). In addition, electronic device 600 detects that front door 910 and living room speakers 914 are in and/or remain in the predefined state (e.g., the unlocked state and the on state, respectively). As such, electronic device 600 detects that seven accessories and/or groups of accessories are in the predefined state. Because electronic device 600 displays up to six status indicators in status indicator region 612, electronic device 600 displays status indicator 612c corresponding to status indicators associated with front door 910 and living room speakers 914.

At FIG. 9I, electronic device 600 detects user input 950j (e.g., a tap gesture) corresponding to selection of sixth status indicator 612g. In response to detecting user input 950j, electronic device 600 initiates a process for causing garage door 904 to transition from the open state to the closed state, as shown at FIG. 9J.

At FIG. 9J, electronic device 600 displays first user interface 608, which includes sixth status indicator 612g corresponding to garage door 904. Electronic device 600 also displays progress indicator 936 in response to detecting user input 950j and initiating the process to cause garage door 904 to transition from the open state to the closed state. At FIG. 9J, progress indicator 936 visually indicates a progress of the transition of garage door 904 from the open state to the closed state. Progress indicator 936 includes an emphasized portion (e.g., bold portion, a first portion having an increased thickness as compared to a second portion, and/or a first portion having a different color as compared to a second portion) of border 936a of sixth status indicator 612g. As the transition of garage door 904 from the open state to the closed state occurs, progress indicator 936 moves and/or is otherwise animated to appear to outline border 936a of sixth status indicator. In other words, at a beginning of the transition of garage door 904 from the open state to the closed state, electronic device 600 displays progress indicator 936 as outlining a first portion of border 936a of sixth status indicator. When the transition of garage door 904 from the open state to the closed state nears completion, electronic device 600 displays progress indicator 936 as outlining a second portion of border 936a (e.g., a second portion that includes the first portion), where the second portion of border 936a is greater than the first portion of border 936a.

At FIG. 9K, electronic device 600 detects that the transition of garage door 904 from the open state to the closed state is completed and ceases displaying progress indicator 936. In addition, electronic device 600 maintains display of sixth status indicator 612g for a predefined period of time (e.g., 0.5 seconds, 1 second, 2 seconds, and/or 5 seconds). After detecting that the transition of garage door 904 from the open state to the closed state is completed and that the predefined period of time has passed, electronic device 600 ceases displaying sixth status indicator 612g, as shown at FIG. 9L.

While FIGS. 9I-9K illustrate electronic device 600 displaying sixth status indicator 612g with progress indicator 936 in response to detecting user input corresponding to selection of sixth status indicator 612g (e.g., user input 950j), in some embodiments, electronic device 600 displays progress indicator 936 for other status indicators in response to detecting user input corresponding to selection of a respective status indicator (e.g., a status indicator associated with an actuatable device and/or accessory).

At FIG. 9L, electronic device 600 ceases displaying sixth status indicator 612g and displays seventh status indicator 612h corresponding to living room speakers 914 and eighth status indicator 612i corresponding to front door 910. In addition, electronic device 600 detects that no additional accessories and/or groups of accessories are in the predefined state. As such, electronic device 600 detects that six accessories and/or groups of accessories are in the predefined state. Because electronic device 600 displays up to six status indicators in status indicator region 612, electronic device 600 does not display status indicator 612c and instead displays status indicators 612b, 612d, 612e, 612f, 612h, and 612i.

FIG. 10 is a flow diagram illustrating a method for causing a group of accessories to transition between states using a computer system in accordance with some embodiments. Method 1000 is performed at a computer system (e.g., 100, 300, 500, 600) (e.g., an electronic device; a smart device, such as a smartphone or a smartwatch; a mobile device; a wearable device) that is in communication with a display generation component and a rotatable input mechanism (e.g., 616) (e.g., a digital crown). Some operations in method 1000 are, optionally, combined, the orders of some operations are, optionally, changed, and some operations are, optionally, omitted.

As described below, method 1000 provides an intuitive way for causing a group of accessories to transition between states. The method reduces the cognitive burden on a user for causing multiple accessories to transition between states, thereby creating a more efficient human-machine interface. For battery-operated computing devices, enabling a user to cause multiple accessories to transition between states faster and more efficiently conserves power and increases the time between battery charges.

In response to a request (e.g., 650a) to display a first user interface (e.g., 608) (e.g., a tap gesture corresponding to selection of an icon and/or user interface object associated with a first application (e.g., a home application)), the computer system (e.g., 600) displays (1002) the first user interface (e.g., 608) (e.g., a main screen user interface of the first application and/or a default user interface of the first application).

In accordance with a determination that at least two accessories of a first type (e.g., 916a, 916b, 916c, and/or 916d) (e.g., lighting accessories) that are in communication with the computer system (e.g., 600) (e.g., the one or more accessories are connected to the same network as the computer system, the one or more accessories have been paired to the computer system, the computer system has been authorized to control the one or more accessories, the one or more accessories have been added to an account for which the computer system has authorization and/or access, the one or more accessories are connected to and/or otherwise in communication with the computer system via a short range communication connection (e.g., a Bluetooth connection, a Wi-Fi connection, and/or a Zigbee connection)) satisfy a first set of criteria (e.g., each of the at least two accessories of the first type is turned on and/or is receiving power), the first set of criteria including a first criterion that is met when the at least two accessories of the first type (e.g., 916a and 916d) include a first status (e.g., an on status and/or an active status), the computer system (e.g., 600) includes a first status indicator (1004) (e.g., 612a) (e.g., a visual indication that indicates at least two accessories of the first type, a visual indication of the number of the at least two accessories of the first type that satisfy the first set of criteria, and/or a visual indication of the first status of the at least two accessories of the first type) corresponding to the at least two accessories of the first type (e.g., 916a and 916d) on the first user interface (e.g., 608).

While displaying the first status indicator (e.g., 612a), the computer system (e.g., 600) detects (1006) a first user input (e.g., 950c) (e.g., a tap gesture and/or a press gesture) corresponding to the first status indicator (e.g., 612a)

In response to detecting the first user input (e.g., 950c), the computer system (e.g., 600) displays (1008), via the display generation component (e.g., 602), a second user interface (e.g., 926) (e.g., a user interface that corresponds to the at least two accessories of the first type and does not correspond to other accessories of a second type that are different from the at least two accessories of the first type) including at least two control user interface objects (e.g., 926a and/or 926b) corresponding to respective accessories of the first type of the at least two accessories of the first type (e.g., 916a and/or 916d) (e.g., platters and/or user interface objects visually indicating and/or identifying a particular accessory of the at least two accessories of the first type; a first control user interface object of the at least two control user interface objects corresponds to a first accessory of the first type of the at least two accessories of the first type and a second control user interface object of the at least two control user interface objects corresponds to a second accessory of the first type, different from the first accessory of the first type, of the at least two accessories of the first type).

After the computer system (e.g., 600) displays the second user interface (e.g., 926) including the at least two control user interface objects (e.g., 926a and/or 926b), the computer system (e.g., 600) detects (1010), via the rotatable input mechanism (e.g., 616), a second user input (e.g., 950e and/or 950f) (e.g., a rotational input).

In response to detecting the second user input (e.g., 950e and/or 950f), the computer system (e.g., 600) causes (1012) (e.g., sending data and/or one or more signals that is ultimately received by each of the at least two accessories and/or a controller of each of the at least two accessories) the at least two accessories of the first type (e.g., 916a and/or 916d) to transition from the first status (e.g., the on status and/or the active status) to a second status (e.g., an off status and/or an inactive status), different from the first status.

Causing the at least two accessories of the first type to transition from the first status to the second status in response to detecting the second user input reduces a number of inputs needed by the user to cause multiple accessories to transition between statuses. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the computer system (e.g., 600) displays the first user interface (e.g., 908) including the first status indicator (e.g., 912a) corresponding to the at least two accessories of the first type (e.g., 916a, 916b, 916c, and/or 916d), the computer system (e.g., 600) displays, via the display generation component (e.g., 602) and concurrently with the first status indicator (e.g., 612a) (e.g., adjacent to the first status indicator and/or within a same region of the first user interface as the first status indicator without overlapping with the first status indicator), one or more second status indicators (e.g., 612b, 612d, 612e, 612f, 612g, 612h, and/or 612i) (e.g., a visual indication that indicates a type of accessory, a visual indication of the number of accessories of the second type, and/or a visual indication of the status of the one or more accessories of the second type) corresponding to one or more accessories of a second type (e.g., 904, 906, 908, 910, 912, and/or 914) (e.g., accessories that are not lighting accessories, such as doors, locks, windows, blinds, garage doors, cars, speakers, fans, and/or playback devices), different from the at least two accessories of the first type (e.g., 916a, 916b, 916c, and/or 916d).

Displaying the first status indicator concurrently with one or more second status indicators provides improved feedback to the user about the various status of multiple different accessories and/or multiple different types of accessories. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the computer system (e.g., 600) displays the first user interface (e.g., 608) including the first status indicator (e.g., 612a) corresponding to the at least two accessories of the first type (e.g., 916a, 916b, 916c, and/or 916d), the computer system (e.g., 600) displays, via the display generation component (e.g., 602) and concurrently with the first status indicator (e.g., 612a) (e.g., adjacent to the first status indicator and/or within a same region of the first user interface as the first status indicator without overlapping with the first status indicator), a third status indicator (e.g., 612b, 612d, 612e, 612f, 612g, 612h, and/or 612i) (e.g., a visual indication that indicates a type of accessory, a visual indication of the number of accessories associated with the third status indicator, and/or a visual indication of the status of the accessory or accessories) corresponding to an accessory selected from the group consisting of: a climate control accessory (e.g., 912) (e.g., a thermostat), an actuatable accessory (e.g., 904, 906, 908, and/or 910) (e.g., a device and/or object that can moved via an actuator, such as a door, a garage door, blinds, and/or a lock), and a speaker accessory (e.g., 914) (e.g., a speaker and/or speaker system that is configured to communicate with computer system and/or another external computer system via a wireless connection).

Displaying the first status indicator concurrently with the third status indicator provides the user with multiple selectable options for causing different accessories to transition between statues without having to navigate to additional user interfaces, thereby reducing a number of inputs needed to cause an accessory to transition between statuses. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the third status indicator (e.g., 612*b*) corresponds to the climate control accessory (e.g., 912). While the computer system (e.g., 600) concurrently displays the first status indicator (e.g., 612*a*) corresponding to the at least two accessories of the first type (e.g., 916*a*, 916*b*, 916*c*, and/or 916*c*) and the third status indicator (e.g., 612*b*) corresponding to the climate control accessory (e.g., 912) (e.g., a thermostat), the computer system (e.g., 600) detects a third user input (e.g., a tap gesture and/or a press gesture) corresponding to selection of the third status indicator (e.g., 612*b*). In response to detecting the third user input corresponding to selection of the third status indicator (e.g., 612*b*), the computer system (e.g., 600) displays, via the display generation component (e.g., 602), a climate control user interface (e.g., a user interface corresponding to the climate control accessory and/or a user interface of a same application as the first user interface) including a temperature control user interface object (e.g., a digital dial, a digital slider, one or more user interface objects that enable a representation of a temperature setting to be moved up and/or down, one or more user interface objects that enable a user to input a temperature setting, one or more user interface objects that enable a user to turn on and/or turn off a heating system, a cooling system, and/or a ventilation system) that includes a temperature setting user interface object that, when selected via user input, is configured to adjust a temperature setting of the climate control accessory (e.g., adjust a value of a temperature setting, adjust a temperature setting to a higher temperature, adjust a temperature setting to a lower temperature, and/or turn off and/or turn on a heating system, a cooling system, and/or a ventilation system).

Displaying the first status indicator concurrently with the third status indicator provides the user with multiple selectable options for causing different accessories to transition between statues without having to navigate to additional user interfaces, thereby reducing a number of inputs needed to cause an accessory to transition between statuses. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the third status indicator (e.g., 612*g*) corresponds to the actuatable accessory (e.g., 904) (e.g., a device and/or object that can moved via an actuator, such as a door, a garage door, blinds, and/or a lock). The third status indicator (e.g., 612*g*) is configured to, when selected via user input (e.g., 950*j*), cause an adjustment of a position (e.g., open, closed, locked, unlocked, up, and/or down) of the actuatable accessory (e.g., 904).

Displaying the first status indicator concurrently with the third status indicator provides the user with multiple selectable options for causing different accessories to transition between statues without having to navigate to additional user interfaces, thereby reducing a number of inputs needed to cause an accessory to transition between statuses. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the computer system (e.g., 600) concurrently displays the first status indicator (e.g., 612*a*) corresponding to the at least two accessories of the first type (e.g., 916*a*, 916*b*, 916*c*, and/or 916*d*) and the third status indicator (e.g., 612*g*) corresponding to the actuatable accessory (e.g., 904) (e.g., a device and/or object that can moved via an actuator, such as a door, a garage door, blinds, and/or a lock), the computer system (e.g., 600) detects a fourth user input (e.g., 950*j*) (e.g., a tap gesture and/or a press gesture) corresponding to selection of the third status indicator (e.g., 612*g*). In response to detecting the fourth user input (e.g., 950*j*) corresponding to selection of the third status indicator (e.g., 612*g*) and in accordance with a determination that the actuatable accessory (e.g., 904) satisfies a second set of criteria (e.g., the actuatable accessory is in a predefined position (e.g., open and/or unlocked), the actuatable accessory includes a predefined number of positions (e.g., two positions or three positions), and/or the actuatable accessory is not grouped with other accessories of the same type), the computer system (e.g., 600) initiates a process to adjust the position of the actuatable accessory (e.g., 904) from a first position to a second position (e.g., from open to closed, from closed to open, from on to off, from off to on, from locked to unlocked, from unlocked to locked, from up to down, and/or from down to up). The computer system (e.g., 600) displays, via the display generation component (e.g., 602), a progress indicator (e.g., 936) (e.g., a ring that is filled, bolded, and/or changed over time to show a level of completion for transitioning from the first position to the second position) corresponding to a level of completion (e.g., a real-time status indicative of a position of the actuatable accessory) associated with a transition of the position of the actuatable accessory (e.g., 904) from the first position to the second position.

Displaying the progress indicator corresponding to the level of completion associated with the transition of the position of the actuatable accessory from the first position to the second position provides the user with improved feedback about the timing of the transition. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first status indicator (e.g., 612*a*) includes a visual indication (e.g., 918) (e.g., a digital number) of a number of accessories of the at least two accessories of the first type (e.g., 916*a*, 916*b*, 916*c*, and/or 916*d*).

Displaying the first status indicator with a visual indication of the number of accessories of the at least two accessories of the first type provides the user with improved feedback about how many accessories of the first type can be caused to transition between statuses. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first status indicator (e.g., 612*a*) is displayed at a first position (e.g., within a status region of the first user interface that is at and/or near a top portion of the display generation component) on the first user interface (e.g., 608). The computer system (e.g., 600) displays the first user interface (e.g., 608) (e.g., a main screen user interface of the first application and/or a default user interface of the first application) including the first status indicator (e.g., 612*a*) and displays (e.g., concurrently and/or in response to user input), via the display generation component (e.g., 602) a first user interface object (e.g., 614*a* and/or 614*b*) (e.g., a user interface object corresponding to predefined settings of one or more first accessories) at a second position on the first user interface (e.g., 608) that, when selected via user input corresponding to selection of the first user interface object (e.g., 614*a* and/or 614*b*), is configured to cause one or more first accessories (e.g., 904, 906, 908, 910, 912, 914, 916*a*, 916*b*, 916*c*, and/or 916*d*) (e.g., a group of accessories designated and/or selected by a user of computer system and/or a group of accessories selected based on a pattern of usage by the user of computer system) to change from a first status to a second status (e.g., transition from a first state to a second state, transition between on and off, transition between brightness levels, transition between positions, transition between color temperatures, transition between temperature settings, transition between speed levels, and/or transition between volume levels). The second position is below the first position (e.g., with respect to the display generation component). In addition, the computer system (e.g., 600) displays a second user interface object (e.g., 614*d*, 614*g*, 614*h*, and/or 614*i*) (e.g., a user interface object corresponding to a particular accessory) at a third position on the first user interface (e.g., 608) that, when selected via user input corresponding to selection of the second user interface object (e.g., 614*d*, 614*g*, 614*h*, and/or 614*i*), is configured to display a third user interface (e.g., a user interface that enables computer system to control and/or adjust settings of the second accessory) corresponding to a second accessory (e.g., 904, 906, 908, 910, 912, 914, 916*a*, 916*b*, 916*c*, and/or 916*d*) (e.g., a light, a door, a lock, a speaker, a playback device, a fan, a climate control system, and/or an outlet), where the third position is below the first position (e.g., with respect to the display generation component). In some embodiments, the second user interface object corresponds to the second accessory, which is selected based on a usage pattern of a user of the computer system. For instance, the second user interface object can correspond to an accessory that the user frequently controls and/or adjusts settings of at a predefined time of day.

In some embodiments, the first user interface object (e.g., 614*a* and/or 614*b*) (e.g., a user interface object corresponding to predefined settings of one or more first accessories) is displayed at the second position of the first user interface (e.g., 608) and the second user interface object (e.g., 614*d*, 614*g*, 614*h*, and/or 614*i*) (e.g., a user interface object corresponding to a particular accessory) is displayed at the third position of the first user interface based on a third set of criteria that includes a criterion selected from the group consisting of: a current time of day (e.g., settings of the one or more first accessories and/or the second accessory are frequently adjusted at a particular time of day and/or the computer system determines that settings of the one or more first accessories and/or the second accessory are likely to be adjusted at a particular time of day), a usage pattern of a user associated with the computer system (e.g., 600) (e.g., settings of the one or more first accessories and/or the second accessory are frequently adjusted at a particular time of day, settings of the one or more first accessories and/or the second accessory are most frequently adjusted by the user via the computer system, and/or settings of the one or more first accessories and/or the second accessory have been adjusted most recently by the user of the computer system), and a usage pattern of another user associated with an external computer system that is authorized to control the one or more first accessories (e.g., 904, 906, 908, 910, 912, 914, 916*a*, 916*b*, 916*c*, and/or 916*d*) (e.g., settings of the one or more first accessories and/or the second accessory are frequently adjusted by another user having authorization to control the one or more first accessories and/or the second accessory at a particular time of day, settings of the one or more first accessories and/or the second accessory are most frequently adjusted by another user having authorization to control the one or more first accessories and/or the second accessory, and/or settings of the one or more first accessories and/or the second accessory have been adjusted most recently by another user having authorization to control the one or more first accessories and/or the second accessory).

In some embodiments, the first status indicator (e.g., 612*a*) is displayed at a fourth position (e.g., within a status region of the first user interface that is at and/or near a top portion of the display generation component) on the first user interface (e.g., 608) The computer system (e.g., 600) displaying the first user interface (e.g., 608) (e.g., a main screen user interface of the first application and/or a default user interface of the first application) including the first status indicator (e.g., 612*a*) includes the computer system (e.g., 600) displaying (e.g., concurrently and/or in response to user input), via the display generation component (e.g., 602) a third user interface object (e.g., 614*d*, 614*g*, 614*h*, and/or 614*i*, and/or 626*a*) at a fifth position on the first user interface (e.g., 608). The third user interface object (e.g., 614*d*, 614*g*, 614*h*, and/or 614*i*, and/or 626*a*) corresponds to a user-selected accessory (e.g., an accessory selected via one or more user inputs to designate the user-selected accessory as a favorite and/or frequently used accessory) and the fifth position is below the fourth position (e.g., with respect to the display generation component).

In some embodiments, the first status indicator (e.g., 612*a*) is displayed at a sixth position (e.g., within a status region of the first user interface that is at and/or near a top portion of the display generation component) on the first user interface (e.g., 608). The computer system (e.g., 600) displaying the first user interface (e.g., 608) (e.g., a main screen user interface of the first application and/or a default user interface of the first application) including the first status indicator (e.g., 612*a*) includes the computer system (e.g., 600) displaying (e.g., concurrently and/or in response to user input), via the display generation component (e.g., 602) a fourth user interface object (e.g., 620) at a seventh position on the first user interface (e.g., 608). The fourth user interface object (e.g., 620) corresponds to one or more camera accessories (e.g., camera accessories that are in communication with the computer system and/or authorized for use via the computer system) and the seventh position is below the sixth position (e.g., with respect to the display generation component).

In some embodiments, the first status indicator (e.g., 612a) is displayed at an eighth position (e.g., within a status region of the first user interface that is at and/or near a top portion of the display generation component) on the first user interface (e.g., 608). The computer system (e.g., 600) displaying the first user interface (e.g., 608) (e.g., a main screen user interface of the first application and/or a default user interface of the first application) including the first status indicator (e.g., 612a) includes the computer system (e.g., 600) displaying (e.g., concurrently and/or in response to user input), via the display generation component (e.g., 602) a fifth user interface object (e.g., 624a, 624b, 624c, and/or 624d) at a ninth position on the first user interface (e.g., 608). The fifth user interface object (e.g., 624a, 624b, 624c, and/or 624d) corresponds to a first group of accessories located in a portion (e.g., 902a, 902b, 902c, 902d, 902e, and/or 902f) (e.g., a room, a hallway, an outdoor area, and/or a user-defined portion of a structure) of a structure (e.g., 902) associated with the first user interface (e.g., 608) (e.g., a home, an office, and/or an apartment that includes and/or has been designated to include the one or more accessories) and the ninth position is below the eighth position (e.g., with respect to the display generation component).

In some embodiments, the first status indicator (e.g., 612a) is displayed at a tenth position (e.g., within a status region of the first user interface that is at and/or near a top portion of the display generation component) on the first user interface (e.g., 608). The computer system (e.g., 600) displaying the first user interface (e.g., 608) (e.g., a main screen user interface of the first application and/or a default user interface of the first application) including the first status indicator (e.g., 612a) includes the computer system (e.g., 600) displaying (e.g., concurrently and/or in response to user input), via the display generation component (e.g., 602) a sixth user interface object (e.g., 924) at an eleventh position on the first user interface (e.g., 608). The sixth user interface object (e.g., 924) corresponds to an intercom function that causes a voice input to be transmitted to one or more speaker accessories (e.g., 914) (e.g., a user interface object that, when selected via user input, prompts a user to provide a voice input, and, after receiving the voice input, transmits the voice input to one or more speaker accessories that are in communication with the computer system) and the eleventh position is above the tenth position (e.g., with respect to the display generation component).

In some embodiments, the first status indicator (e.g., 612a) is displayed at a twelfth position (e.g., within a status region of the first user interface that is at and/or near a top portion of the display generation component) on the first user interface (e.g., 608). The computer system (e.g., 600) receives a request to authorize the computer system (e.g., 600) for communication with a second group of accessories (e.g., receiving a request from an external computer system to authorize the computer system to control and/or adjust settings of the group of accessories (e.g., a group of accessories designated as being located at, positioned within, and/or part of a particular structure)). In response to receiving the request to authorize the computer system (e.g., 600) for communication with the second group of accessories, the computer system displays, via the display generation component (e.g., 602), a seventh user interface object (e.g., 922) at a thirteenth position on the first user interface (e.g., 608) (e.g., a main screen user interface of the first application and/or a default user interface of the first application). The seventh user interface object (e.g., 922) corresponds to the request received to authorize the computer system (e.g., 600) for communication with the second group of accessories (e.g., a user interface object that, when selected via user input, enables a user to accept the request (e.g., and authorize the computer system for communication with the group of accessories) and/or to reject the request (e.g., and forgo authorization of the computer system for communication with the group of accessories)) and the thirteenth position is above the twelfth position (e.g., with respect to the display generation component).

In some embodiments, the computer system (e.g., 600) receives a request to display a user interface (e.g., 608) associated with a plurality of accessories (e.g., 904, 906, 908, 910, 912, 914, 916a, 916b, 916c, and/or 916d) that are in communication with the computer system (e.g., 600) (e.g., a user interface that enables the computer system to control and/or otherwise adjust settings of accessories of a home and/or other structure). In response to receiving the request to display the user interface (e.g., 608), the computer system (e.g., 600) receives information related to a status (e.g., a state and/or setting, such as on, off, open, closed, locked, unlocked, brightness, color temperature, speed, temperature, and/or volume) of one or more first accessories of the plurality of accessories (e.g., 904, 906, 908, 910, 912, 914, 916a, 916b, 916c, and/or 916d). In accordance with a determination that the status of the one or more first accessories meets a set of criteria (e.g., the status corresponds to an on state, an open state, and/or an unlocked state), the computer system (e.g., 600) displays a first user interface object (e.g., 612a, 612b, 612c, 612d, 612e, 612f, 612g, 612h, and/or 612i) on the user interface (e.g., 608) corresponding to the status of the one or more first accessories. Displaying the first user interface object (e.g., 612a, 612b, 612c, 612d, 612e, 612f, 612g, 612h, and/or 612i) includes, in accordance with a determination that a number of status user interface objects (e.g., 612a, 612b, 612c, 612d, 612e, 612f, 612g, 612h, and/or 612i) displayed on the user interface (e.g., 608) is less than or equal to a threshold number, displaying the first user interface object (e.g., 612a, 612b, 612c, 612d, 612e, 612f, 612g, 612h, and/or 612i) as a first status user interface object (e.g., 612a, 612b, 612d, 612e, 612f, 612g, 612h, and/or 612i) that indicates the status of the one or more first accessories. Further, displaying the first user interface object (e.g., 612a, 612b, 612c, 612d, 612e, 612f, 612g, 612h, and/or 612i) includes, in accordance with a determination that the number of status user interface objects (e.g., 612a, 612b, 612c, 612d, 612e, 612f, 612g, 612h, and/or 612i) displayed on the user interface (e.g., 608) is greater than the threshold number, displaying the first user interface object (e.g., 612a, 612b, 612c, 612d, 612e, 612f, 612g, 612h, and/or 612i) as a non-status user interface object (e.g., 612c) that does not indicate the status of the one or more first accessories.

In some embodiments, the threshold number of status user interface objects displayed on the user interface is three status user interface objects.

In some embodiments, the threshold number of status user interface objects displayed on the user interface is six status user interface objects.

In some embodiments, the user interface (e.g., 608) includes concurrent display of the first user interface object (e.g., 612*a*, 612*b*, 612*c*, 612*d*, 612*e*, 612*f*, 612*g*, 612*h*, and/or 612*i*) and a second user interface object (e.g., 614*d*, 614*g*, 614*h*, 614*i*, and/or 626*a*), where the second user interface object (e.g., 614*d*, 614*g*, 614*h*, 614*i*, and/or 626*a*) corresponds to a user-selected accessory of the plurality of accessories (e.g., 904, 906, 908, 910, 912, 914, 916*a*, 916*b*, 916*c*, and/or 916*d*) (e.g., an accessory selected via one or more user inputs to designate the user-selected accessory as a favorite and/or frequently used accessory).

In some embodiments, the status of the one or more first accessories is selected from the group consisting of: on, off, a brightness setting, a color temperature setting, a position, locked, unlocked, a temperature setting, a heating setting, and a cooling setting.

In some embodiments, the set of criteria include a criterion that is met when the status of the one or more first accessories is selected from the group consisting of: on, open, and unlocked.

Note that details of the processes described above with respect to method 1000 (e.g., FIG. 10) are also applicable in an analogous manner to the methods described above/below. For example, methods 700 and 800 optionally includes one or more of the characteristics of the various methods described above with reference to method 1000. For example, the computer system of method 1000 can be used for displaying images corresponding to events detected by one or more camera accessories and/or for displaying an image captured by a camera accessory in a full screen mode. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve a user's ability to cause an electronic device to control one or more accessories of a home. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide suggested accessories of a home to adjust. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of suggesting home accessories for a user to adjust, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, home accessories suggested for a user to adjust can be based on non-personal information data or a bare minimum amount of personal information, such as the content being requested by the device associated with a user, other non-personal information available to the a device, or publicly available information.

What is claimed is:

1. A computer system that is in communication with a display generation component and a rotatable input mechanism, comprising:
   one or more processors; and
   memory storing one or more programs configured to be executed by the one or more processors, the one or more programs including instructions for:
      while displaying, via the display generation component, a camera user interface, concurrently displaying, via the display generation component:
         a first image captured via a first camera that is in communication with the computer system;
         a plurality of event indicators;
         a first control user interface object having a first appearance characteristic; and
         a second control user interface object having the first appearance characteristic, wherein the second control user interface object corresponds to an intercom function between the computer system and the first camera;
      while concurrently displaying the first image captured via the first camera and the plurality of event indicators, detecting, via the rotatable input mechanism, a first user input; and
      in response to detecting the first user input via the rotatable input mechanism:
         replacing display of the first image captured via the first camera with display of a second image captured via the first camera, wherein the second image of the first camera corresponds a first event indicator of the plurality of event indicators, and wherein the second image captured via the first camera corresponds to one or more images captured via the first camera at a first time prior to a current time; and
         displaying, via the display generation component:
            the first control user interface object with the first appearance characteristic; and
            the second control user interface object with a second appearance characteristic, different from the first appearance characteristic, wherein the second appearance characteristic includes an inactive appearance characteristic indicating that the second control user interface object is not selectable.

2. The computer system of claim 1, wherein replacing display of the first image captured via the first camera with display of the second image captured via the first camera includes displaying, via the display generation component and concurrently with the second image captured via the first camera, a time indicator corresponding to the first time prior to the current time.

3. The computer system of claim 1, wherein the one or more programs further include instructions for:
   while concurrently displaying the second image captured via the first camera and the plurality of event indicators, detecting, via the rotatable input mechanism, a second user input; and
   in response to detecting the second user input via the rotatable input mechanism, replacing display of the second image captured via the first camera with display of a third image captured via the first camera, wherein the third image of the first camera corresponds a second event indicator, different from the first event indicator, of the plurality of event indicators, and wherein the third image captured via the first camera corresponds to one or more images captured via the first camera at a second time, different from the first time, prior to the current time.

4. The computer system of claim 1, wherein the one or more programs further include instructions for:
   prior to displaying the camera user interface, displaying, via the display generation component, a home user interface that includes a first camera user interface object corresponding to the first camera;
   while displaying the home user interface that includes the first camera user interface object corresponding to the first camera, detecting a third user input corresponding to selection of the first camera user interface object corresponding to the first camera; and
   in response to detecting the third user input corresponding to selection of the first camera user interface object corresponding to the first camera, displaying, via the display generation component, the camera user interface.

5. The computer system of claim 1, wherein the one or more programs further include instructions for:
   prior to displaying the camera user interface, displaying, via the display generation component, a home user interface that includes a second camera user interface object;
   while displaying the home user interface that includes the second camera user interface object, detecting a fourth user input corresponding to selection of the second camera user interface object;
   in response to detecting the fourth user input corresponding to selection of the second camera user interface object, displaying a second camera user interface that includes a third camera user interface object corresponding to the first camera;
   while displaying the second camera user interface that includes the third camera user interface object corresponding to the first camera, detecting a fifth user input corresponding to selection of the third camera user interface object corresponding to the first camera; and
   in response to detecting the fifth user input corresponding to selection of the third camera user interface object corresponding to the first camera, displaying, via the display generation component, the camera user interface.

6. The computer system of claim 1, wherein the plurality of event indicators correspond to respective events detected by the first camera, wherein the respective events occurred prior to the current time.

7. The computer system of claim 6, wherein the respective events are selected from the group consisting of: a motion detection event, a person detection event, an object detection event, an animal detection event, an audio detection event and a vehicle detection event.

8. The computer system of claim 6, wherein the plurality of event indicators are arranged in chronological order based on respective times at which the respective events were detected by the first camera.

9. The computer system of claim 1, wherein the plurality of event indicators do not include a visual indication of an image captured via the first camera.

10. A non-transitory computer-readable storage medium storing one or more programs configured to be executed by one or more processors of a computer system that is in communication with a display generation component and a rotatable input mechanism, the one or more programs including instructions causing the computer system to perform:
  while displaying, via the display generation component, a camera user interface, concurrently displaying, via the display generation component:
    a first image captured via a first camera that is in communication with the computer system;
    a plurality of event indicators;
    a first control user interface object having a first appearance characteristic; and
    a second control user interface object having the first appearance characteristic, wherein the second control user interface object corresponds to an intercom function between the computer system and the first camera;
  while concurrently displaying the first image captured via the first camera and the plurality of event indicators, detecting, via the rotatable input mechanism, a first user input; and
  in response to detecting the first user input via the rotatable input mechanism:
    replacing display of the first image captured via the first camera with display of a second image captured via the first camera, wherein the second image of the first camera corresponds a first event indicator of the plurality of event indicators, and wherein the second image captured via the first camera corresponds to one or more images captured via the first camera at a first time prior to a current time; and
    displaying, via the display generation component:
      the first control user interface object with the first appearance characteristic; and
      the second control user interface object with a second appearance characteristic, different from the first appearance characteristic, wherein the second appearance characteristic includes an inactive appearance characteristic indicating that the second control user interface object is not selectable.

11. A method, comprising:
  at a computer system that is in communication with a display generation component and a rotatable input mechanism:
    while displaying, via the display generation component, a camera user interface, concurrently displaying, via the display generation component:
      a first image captured via a first camera that is in communication with the computer system;
      a plurality of event indicators;
      a first control user interface object having a first appearance characteristic; and
      a second control user interface object having the first appearance characteristic, wherein the second control user interface object corresponds to an intercom function between the computer system and the first camera;
    while concurrently displaying the first image captured via the first camera and the plurality of event indicators, detecting, via the rotatable input mechanism, a first user input; and
    in response to detecting the first user input via the rotatable input mechanism:
      replacing display of the first image captured via the first camera with display of a second image captured via the first camera, wherein the second image of the first camera corresponds a first event indicator of the plurality of event indicators, and wherein the second image captured via the first camera corresponds to one or more images captured via the first camera at a first time prior to a current time; and
      displaying, via the display generation component:
        the first control user interface object with the first appearance characteristic; and
        the second control user interface object with a second appearance characteristic, different from the first appearance characteristic, wherein the second appearance characteristic includes an inactive appearance characteristic indicating that the second control user interface object is not selectable.

12. The non-transitory computer-readable storage medium of claim 10, wherein replacing display of the first image captured via the first camera with display of the second image captured via the first camera includes displaying, via the display generation component and concurrently with the second image captured via the first camera, a time indicator corresponding to the first time prior to the current time.

13. The non-transitory computer-readable storage medium of claim 10, wherein the one or more programs further include instructions for:
  while concurrently displaying the second image captured via the first camera and the plurality of event indicators, detecting, via the rotatable input mechanism, a second user input; and
  in response to detecting the second user input via the rotatable input mechanism, replacing display of the second image captured via the first camera with display of a third image captured via the first camera, wherein the third image of the first camera corresponds a second event indicator, different from the first event indicator, of the plurality of event indicators, and wherein the third image captured via the first camera corresponds to one or more images captured via the first camera at a second time, different from the first time, prior to the current time.

14. The non-transitory computer-readable storage medium of claim 10, wherein the one or more programs further include instructions for:
  prior to displaying the camera user interface, displaying, via the display generation component, a home user interface that includes a first camera user interface object corresponding to the first camera;
  while displaying the home user interface that includes the first camera user interface object corresponding to the first camera, detecting a third user input corresponding to selection of the first camera user interface object corresponding to the first camera; and in response to detecting the third user input corresponding to selection of the first camera user interface object corresponding to the first camera, displaying, via the display generation component, the camera user interface.

15. The non-transitory computer-readable storage medium of claim 10, wherein the one or more programs further include instructions for:
prior to displaying the camera user interface, displaying, via the display generation component, a home user interface that includes a second camera user interface object;
while displaying the home user interface that includes the second camera user interface object, detecting a fourth user input corresponding to selection of the second camera user interface object;
in response to detecting the fourth user input corresponding to selection of the second camera user interface object, displaying a second camera user interface that includes a third camera user interface object corresponding to the first camera;
while displaying the second camera user interface that includes the third camera user interface object corresponding to the first camera, detecting a fifth user input corresponding to selection of the third camera user interface object corresponding to the first camera; and
in response to detecting the fifth user input corresponding to selection of the third camera user interface object corresponding to the first camera, displaying, via the display generation component, the camera user interface.

16. The non-transitory computer-readable storage medium of claim 10, wherein the plurality of event indicators correspond to respective events detected by the first camera, wherein the respective events occurred prior to the current time.

17. The non-transitory computer-readable storage medium of claim 16, wherein the respective events are selected from the group consisting of: a motion detection event, a person detection event, an object detection event, an animal detection event, an audio detection event and a vehicle detection event.

18. The non-transitory computer-readable storage medium of claim 16, wherein the plurality of event indicators are arranged in chronological order based on respective times at which the respective events were detected by the first camera.

19. The non-transitory computer-readable storage medium of claim 10, wherein the plurality of event indicators do not include a visual indication of an image captured via the first camera.

20. The method of claim 11, wherein replacing display of the first image captured via the first camera with display of the second image captured via the first camera includes displaying, via the display generation component and concurrently with the second image captured via the first camera, a time indicator corresponding to the first time prior to the current time.

21. The method of claim 11, further comprising:
while concurrently displaying the second image captured via the first camera and the plurality of event indicators, detecting, via the rotatable input mechanism, a second user input; and
in response to detecting the second user input via the rotatable input mechanism, replacing display of the second image captured via the first camera with display of a third image captured via the first camera, wherein the third image of the first camera corresponds a second event indicator, different from the first event indicator, of the plurality of event indicators, and wherein the third image captured via the first camera corresponds to one or more images captured via the first camera at a second time, different from the first time, prior to the current time.

22. The method of claim 11, further comprising:
prior to displaying the camera user interface, displaying, via the display generation component, a home user interface that includes a first camera user interface object corresponding to the first camera;
while displaying the home user interface that includes the first camera user interface object corresponding to the first camera, detecting a third user input corresponding to selection of the first camera user interface object corresponding to the first camera; and
in response to detecting the third user input corresponding to selection of the first camera user interface object corresponding to the first camera, displaying, via the display generation component, the camera user interface.

23. The method of claim 11, further comprising:
prior to displaying the camera user interface, displaying, via the display generation component, a home user interface that includes a second camera user interface object;
while displaying the home user interface that includes the second camera user interface object, detecting a fourth user input corresponding to selection of the second camera user interface object;
in response to detecting the fourth user input corresponding to selection of the second camera user interface object, displaying a second camera user interface that includes a third camera user interface object corresponding to the first camera;
while displaying the second camera user interface that includes the third camera user interface object corresponding to the first camera, detecting a fifth user input corresponding to selection of the third camera user interface object corresponding to the first camera; and
in response to detecting the fifth user input corresponding to selection of the third camera user interface object corresponding to the first camera, displaying, via the display generation component, the camera user interface.

24. The method of claim 11, wherein the plurality of event indicators correspond to respective events detected by the first camera, wherein the respective events occurred prior to the current time.

25. The method of claim 24, wherein the respective events are selected from the group consisting of: a motion detection event, a person detection event, an object detection event, an animal detection event, an audio detection event and a vehicle detection event.

26. The method of claim 24, wherein the plurality of event indicators are arranged in chronological order based on respective times at which the respective events were detected by the first camera.

27. The method of claim 11, wherein the plurality of event indicators do not include a visual indication of an image captured via the first camera.

* * * * *